US010375236B1

(12) United States Patent
Leeds et al.

(10) Patent No.: US 10,375,236 B1
(45) Date of Patent: Aug. 6, 2019

(54) COMPUTER CONTROL OF ONLINE SOCIAL INTERACTIONS BASED ON CONVERSATION PROCESSING

(71) Applicant: Computer Products Introductions, Corporation, Bellevue, WA (US)

(72) Inventors: Richard Leeds, Bellevue, WA (US); Elon Gasper, Bellevue, WA (US)

( * ) Notice: Subject to any disclaimer, the term of this patent is extended or adjusted under 35 U.S.C. 154(b) by 0 days.

(21) Appl. No.: 15/374,082

(22) Filed: Dec. 9, 2016

Related U.S. Application Data

(60) Division of application No. 14/106,167, filed on Dec. 13, 2013, now Pat. No. 9,521,252, which is a continuation-in-part of application No. 13/305,686, filed on Nov. 28, 2011, now Pat. No. 8,638,908, which is a continuation-in-part of application No. 12/339,429, filed on Dec. 19, 2008, now Pat. No. 8,068,604, which is a continuation-in-part of application No. 12/039,596, filed on Feb. 28, 2008, now Pat. No. 8,553,852.

(51) Int. Cl.
| | |
|---|---|
| *H04M 19/04* | (2006.01) |
| *H04M 3/42* | (2006.01) |
| *G06Q 30/02* | (2012.01) |
| *G06Q 50/00* | (2012.01) |

(52) U.S. Cl.
CPC .... *H04M 3/42051* (2013.01); *G06Q 30/0207* (2013.01); *G06Q 30/0241* (2013.01); *G06Q 50/01* (2013.01); *H04M 3/42221* (2013.01); *H04M 3/42348* (2013.01); *H04M 2203/2038* (2013.01); *H04M 2250/12* (2013.01)

(58) Field of Classification Search
CPC ................................................ H04M 3/42051
USPC .............. 379/373.02; 705/14.35, 14.1, 14.14
See application file for complete search history.

(56) References Cited

U.S. PATENT DOCUMENTS

| | | | |
|---|---|---|---|
| 7,027,569 B2 | 4/2006 | Price | |
| 7,127,238 B2 | 10/2006 | Vandermeijden et al. | |
| 7,304,983 B2 | 12/2007 | Simpson et al. | |
| 7,310,416 B1 | 12/2007 | Henderson | |
| 7,805,740 B2 | 9/2010 | Gilboa | |
| 7,860,449 B1 * | 12/2010 | Bowman ................ | H04H 60/91 455/3.06 |

(Continued)

OTHER PUBLICATIONS

"Programming Flash Communication Server" by Brian Lesser, et al. (O'Reilly Media, Inc. 2005; ISBN:0596005040).

(Continued)

*Primary Examiner* — Md S Elahee
(74) *Attorney, Agent, or Firm* — JRG Attorneys at Law

(57) ABSTRACT

A method for computer control of online social interactions based on conversation processing. A portion of a conversation with a given user is recorded, stored in memory, and processed so as to influence subsequent interactions. These may include audio or other contextualized annunciations of subsequent telephone calls. Other modes addressing conversational processing for social purposes can result in interwoven conversation guided among threads of interest, advertising and incented participation of conversational content and placement. The invention is capable of implementation in telecommunications systems such as cellular, local exchange, and VOIP, and in combination with other forms of internet-based telecommunication, including smart phones and adaptive forums chat rooms.

11 Claims, 28 Drawing Sheets

(56) References Cited

U.S. PATENT DOCUMENTS

| | | | |
|---|---|---|---|
| 9,269,097 B2 | 2/2016 | Freeman et al. | |
| 2003/0026416 A1 | 2/2003 | Fusco | |
| 2004/0067751 A1 | 4/2004 | Vandermeijden et al. | |
| 2004/0235520 A1 | 11/2004 | Cadiz et al. | |
| 2006/0003814 A1 | 1/2006 | Moody et al. | |
| 2006/0111085 A1 | 5/2006 | Lee | |
| 2006/0148459 A1 | 7/2006 | Wolfman et al. | |
| 2006/0199575 A1 | 9/2006 | Moore et al. | |
| 2006/0215827 A1 | 9/2006 | Pfleging et al. | |
| 2006/0282317 A1* | 12/2006 | Rosenberg | G06Q 30/02 705/14.35 |
| 2007/0117554 A1 | 5/2007 | Arnos | |
| 2007/0162339 A1* | 7/2007 | Arning | G06Q 10/107 705/14.1 |
| 2007/0264978 A1 | 11/2007 | Stoops | |
| 2008/0070697 A1 | 3/2008 | Robinson et al. | |
| 2009/0220067 A1 | 9/2009 | Leeds | |

OTHER PUBLICATIONS

"Macromedia® Flash™ MX 2004 for Rich Internet Applications" by Phillip Kerman (New Riders 2003, Print ISBN-10: 0-7357-1366-9).

"Flash 8: Projects for Learning Animation and Interactivity" by Rich Shupe, et al. (O'Reilly 2006, Print ISBN-10: 0-596-10223-2, Print ISBN-13: 978-0-59-610223-4).

"Linux Multimedia Hacks" by Kyle Rankin (O'Reilly Pub 2005, Print ISBN-10: 0-596-10076-0, Print ISBN-13: 978-0-59-610076-6).

"Get a Human on the Line", Wall Street Journal article May 6, 2007.

* cited by examiner

Basic system plus calendaring with sound processing shown explicitly

Example individual database record structure for the Private ID Mapping Database shown in figure 13

| Explanation | Label |
|---|---|
| *RR Key ID record based fields:* <br> Unique identifier (number or text string) for person (or equivlent: see text). | RR Key ID |
| Name of 'person' | Name |
| Address <br> Other <br> Current general rr_filename ringtone to use for him/her (like rr_username ID; might be a key to database, not an actual filename) | Address <br> Other <br> rr_filename |
| Phone info for standard reminderRings; possibly different from different phones; with dates for possible rotations | Phone |
| Calandar reminders and info needed to work with external calendar program(s) | Calendar |
| For annunciations of email, possibly through speech synthesis, as reminderRings based on other (probably prior) communications with that person | email |
| For text messages | Text |
| For all other types of telecomm the user engages in | Other telecomm |
| *Other fields:* <br> Disambiguation data, to resolve cases of multiple persons at one CallerID, for example | Disambiguation guidance |
| Sharing - as individual record notes and/or special records outside the main RR key ID list | Sharing |
| Parameters to govern picking up a new reminder ring - such as duration, volume, user keying, speech recognition of key words (such as for automated appointment making, etc.) | Hurdles |
| A list of mappings of locally used rr_filenames to those utilized from outside the private db, to deal with collisions, may be stored here (or could be in Sharing). For the sake of robustness, diagnostics, and efficiency in the performance-critical phases of rr_filename assignments, a complete list of rr_filenames may be included as well. | RR_filenames map |

*Additional fields that are part of it*

B

A number of standard fields for person's name, nickname, etc

A number of standard address fields

Other optional common contact info, notes, digitized cards, etc.

Latest one and optionally, an alternate backup one, or even more; date each was stored; whether it overrides individual ones (for performance)

Phone number (Caller IDs) each with optional rr_filename(s) and date(s) assigned reminder times, each with optional rr_filename(s) and date(s) assigned; possibly also with data needed to interact with separate personal information manager/calendar/appointment program Email addresses, each with optional rr_filename(s) and dates assigned Also with flags that indicate possible construction of rr_filename(s)

Additional data to validate headers or otherwise guard against spoofing (most likely needed for this medium because email is so easy to spoof; could be present for others, too)

Alias names and/or IP addresses that serve as message identifiers

Also with flags that indicate possible construction of rr_filename(s)

Also with flags and data, such as prior text messaging from this person, that indicates possible construction of rr_filename(s)
indicators of originator in that medium, each with optional rr_filename(s) and date assigned

C globally, at record level, or individually for each possible one

Designations of shared information, such as imported, private or referencable by a group, with necessary access data such as security codes Designations and data needed for parameterized creation of new reminder rings. May be global, at recorded level, or even individually

D

List or RR_filenames in use and possibly some correspondent ones.

FIG. 14B

Example audio-processing extraction method

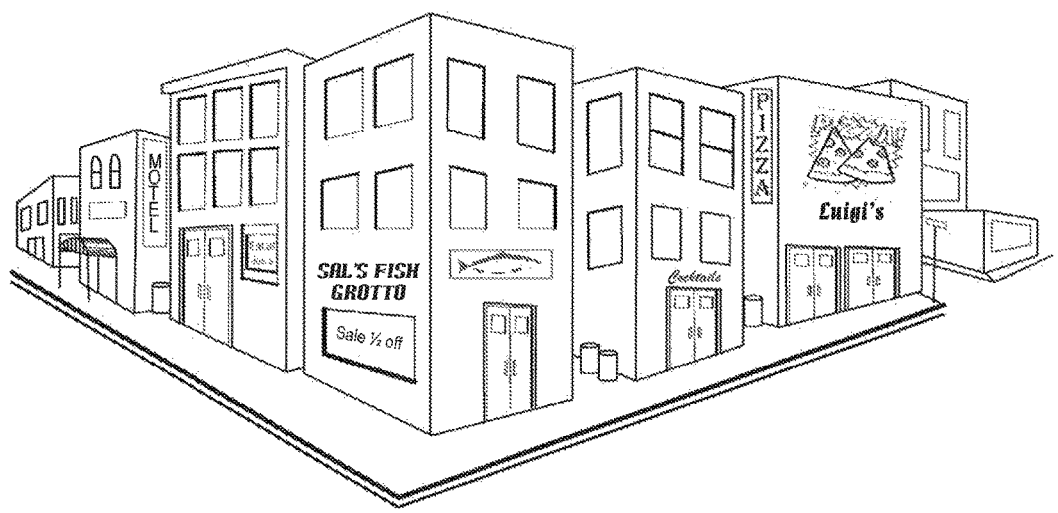
FIG. 22

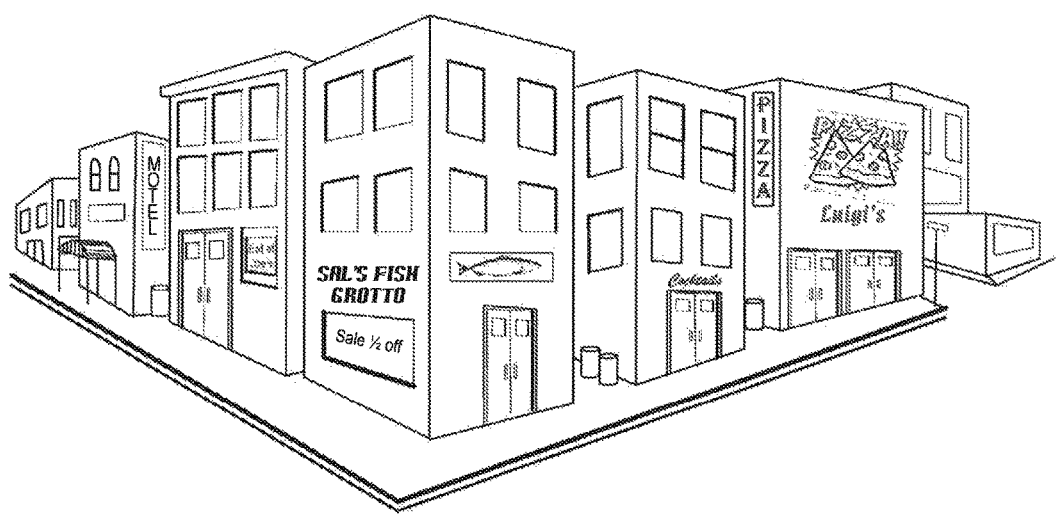
FIG. 23

Shout Box

Please log in or create an account to post shouts.

rick82: Not sure it wold work, bsr, Griffey's production went into a nosedive when the team moved from the Kingdome to Safeco. I think it's a major reason he asked to be traded. By most accounts he hated hitting there. Great place to catch a nap, however. [Posted 11/29/13 at 09:30am by rick82] *2 hours 8 min ago* bsr: On that note, sure would be nice if Griffey would come back into the fold…he'd be a great ambassador for selling the team to hitters. Play the Magic Johnson role. He is really the soul of the M's along w/Edgar and it would be good to have those guys active in cultivating a franchise tradition and countering the current negative vibes. *11 hours 32 min ago* bsr: And btw I don't think there is some permanent disadvantage to the M's as a franchise that winning wouldn't cure quickly. We had Griffey, Edgar, A-Rod, Ichiro, Buhner, etc…plenty of tradition of great hitters to tap into if we can get back on track and out of this current rut. *11 hours 40 min ago* bsr: @Tacoma Rain, it is not just us suffering M's fans doing the woe is us routine…M's were described as "desperate" and "like the poor guy in high school who keeps getting rejected by girls he asks to the prom" by Ken Rosenthal a couple days ago. And that we "always seem to be in some form of disarray". I mean, this portrayal is if anything worse than what we imagine the perception of the M's to be among FA hitters. "Hitters look at Seattle and see the following: Bad team. Pitcher-friendly ballpark. Undesirable geography, particularly for players from Latin America who want to be close to home." I agree that it is our leadership team's job to solve this problem. But let's not undersell the depth of the challenge. (http://msn.foxsports.com/mlb/story/seattle-mariners-desparate-free-agent-options-mike-napoli-nelson-cruz-carlos-beltran-jacoby-ellsbury-shin-soo-choo-112613) *11 hours 47 min ago* bsr: I did not realize the M's bullpen had regressed 90 runs vs the 2012 bullpen. Can we please, please drop some of this new TV money on a stable bullpen for the next few years? I know you ideally "shouldn't" have to spend much on a bullpen per Moneyball roster strategy theory but…this specific offseason, this specific team does need to shore this area up, badly. Just a couple solid vets who won't risk setting themselves on fire weekly, and we'd be good. *12 hours 10 min ago* bsr: Lincoln is The Decider on Chuck's successor."[Lincoln] will handle the search for Armstrong's replacement. It won't be a search by committee. 'I will take care of that,' he said." Also, Lincoln says budget will be higher than the $95M (…that we didn't spend) last year. *13 hours 31 min ago*

Tacoma Rain: Jack and his team need to be creative and be quick. There is no reason Guti has not been re-signed at a few million with incentives. Just make him a DH, and do not let him play more than 250 innings in the field. Or go get an aging starter, like they did with Oliver, and turn him into a bullpen piece. But the big thing is to get started. NOW. No need to make your big splash free agent the first pick up. Just START. *22 hours 6 min ago*

FIG. 27

COMPUTER CONTROL OF ONLINE SOCIAL INTERACTIONS BASED ON CONVERSATION PROCESSING

CROSS-REFERENCE TO RELATED DOCUMENTS

This application is a Divisional of U.S. patent application Ser. No. 14/106,167, filed Dec. 13, 2013, which is a Continuation-in-Part of U.S. patent application Ser. No. 13/305,686, which is based on a Continuation-in-Part and claims priority to U.S. Pat. No. 8,068,604, granted on Nov. 29, 2011 and U.S. Pat. No. 8,553,852, granted on Oct. 8, 2013, all of which are hereby incorporated by reference as if fully set forth herein.

TECHNICAL FIELD

The present invention relates primarily to the field of telecommunications. More specifically, the present invention relates to a system and method for integrating the processing of conversations transmitted over a telecommunications network with other applications of software resident in that network and the computing-capable devices operating in the context of it.

BACKGROUND

As general purpose computing devices have been reduced in size and price, and the mechanisms of connectivity to conversational telecommunication networks have become more open and implementable in them, the stage was set for a unification of their functions with those of telephones. This progressed from both 'sides': first, from the standpoint of implementing telecommunications functionality within simulated 'telephone'-like environments on the PC, then to the addition of standard software applications like games and office apps to handheld phones. Implementation of the present invention in either context is interchangeably described herein, as both serve as equivalent platforms to the ultimate embodiment of it in small, handheld devices capable of both functions, which have become known as 'smartphones', a word which arose in the late 1990s, and has been defined as a phone with additional software functions.

However, despite a vast market and though it's quickly become one word, the currently extant "SmartPhone" products still don't make the leap across the gap, to combine the "Smart" and "Phone" parts significantly. In particular, their 'smart' built-in features and add-on software applications don't significantly utilize the actual conversation content for utility significantly more than other, standard phones (and equivalent telecommunications devices) do. One reason for this is because the technology's heritage has kept a wall in place, or one has been erected on purpose for reasons such as to isolate the phone's mission-critical core telecommunications functionality expected by consumers from the bugs, crashes, security issues and other software vagaries of the more complex software environment of an operating system which hosts a panoply of diverse applications built by various vendors. Barriers to conversation processing in the Apple iPhone, for example, appear to have been purposely placed, with designers cited publically on this point. Smartphone pioneer Steve Jobs was even quoted as explaining the need for limitations as a platform difference: "You don't want your phone to be like a PC. The last thing you want is to have loaded three apps on your phone, and then you go to make a call and it doesn't work anymore."

This dichotomy between the communications channel of the phone and its 'smarts' has inhibited the conceptualization and implementation of a broad range of valuable applications, including social media. This wall can be breached using certain configurations of hardware and software, which applications such as ReminderRing, created to provide customized notifications and other contextualized communications, and related useful embodiments of computer control of online social interactions based on conversation processing, described herein, exemplify. In particular, they realize a functionality in which the content of conversation conducted on a telephone or equivalent communication device including online forums, influences its later functionality, producing changed behavior of that instrument during its subsequent operation and associated adaptive changes to online social interactions. More broadly, they bring both the context and content of a communication to bear in extending the utility of the device through its interface with the user's needs and perceptions.

DESCRIPTION OF THE INVENTION

Human interaction is mediated by the effects of perceiving the presence of other humans. Their verbal and nonverbal cues are of the essence to our nature and function as social animals. Recent psychological experiments and brain MRI results confirm what motivational experts and organizational adepts have always known: that people function both proactively and reactively, the latter particularly in response to stimuli from other folks they are in communication with. Successful business models involve an acknowledgement of this fact, from ADHD coaches to podcasting housework mavens like FlyLady, from squawk-box-driven brokerage boiler rooms to talking-head TV programming.

But as the social web around us has expanded with the aid of electronic communications, the technological limitations of its early implementation have stifled the development of applications of this knowledge to the needs of the end user. Though some relatively feeble attempts to add a bit of face to the interface, such as with programs like Facebook, have succeeded quickly and been imitated by others, most have focused on growing a network faster rather than representing and relating it to each user in a better way. This has further led to a fractured social graph with multiple modes of not just communication, but representation also, with competing networks, identity management and user interfaces. And again, most attempts at improvement have been focused toward the center, not the nodes.

Take, for example, the simple ring tone. A ring tone is an audio segment played to alert the user of a telecommunications device to an incoming phone call or other type of communication. Ring tones are typically stored as digital audio files on a telecommunications device such as a cellular phone. Customizable ring tones have gained in popularity, as they allow users to set a specific ring tone to be played when receiving a call from a specific person recognized by their caller ID. Many carriers (that is, telecommunications service providers) and other businesses offer services whereby users may download specialized ring tones such as songs or other sound effects directly to a device. In the alternative, digital audio files may be uploaded to a telecommunications device and used as a ring tone. Utilities exist which enable users to create their own ring tones based on pre-recorded sounds, allowing mixing of multiple sounds and other forms of audio manipulation.

However, though a diversity of customization options exists for the creation of ring tones, these technologies only facilitate the singular function of identifying the calling party to the user, and that only indirectly through an assigned tone. Other ring tone technologies do not provide the user with any direct, dynamic, or additional information relating to the caller or the probable context of their call. Nor do they take advantage of the proximate source of transmitted vocalizations by the caller, the sound of whose voice can command the user's attention, which is the primary purpose of a call annunciation. Therefore, additional utility would be derived if a ring tone not only aided in identification of the caller, but did so in a more direct fashion, and also provided information as to the probable intent of the caller. [Pretty much everything up until this point probably belonged in the BACKGROUND section, but it's not critical. The fewer changes between this application and its parent, the better.— Matt] The present invention solves this problem through the creation of a ring tone which incorporates the content of previous correspondence with the caller, thus contextualizing the new communication, that is, placing the new call into context for the user.

Moreover, hardly any attempts to help a user associate a call request with his counterparty have penetrated the market, and none have utilized the voice from a prior conversation, which is a natural and effective reminder of the context in which the user will grasp the meaning of the communication.

Furthermore, there is a need in the art for a means for remedying this lack of a humanized, individualized connectivity environment by gathering the separate threads of electronically-mediated connectivity not in their collective cloud, but rather at the individual. By furnishing the user with technology to integrate multimodal streams of communication from other people, and from himself, with representations that are more naturally suited for his sensory and cognitive nature, the current invention furnishes a better system to deal with communication.

In combination with means for conversations to be routed among interested parties, for whom actionable information will be available, it can enable nurturing and instant communication of further utility in social interaction, providing means for collections or even large organizations of people, to engage in interwoven conversation streams. In a business context, those can be corporations or other sets of people. In a commercial context, incentivizing of conversational content can be addressed for advertising and other purposes.

The present invention, referred to henceforward as ReminderRing, can be seen in one mode as a system and method for generating a ring tone or equivalent non-audio annunciation based on one or more prior audio, video, or textual conversation streams. The invention is applicable to communications systems and associated devices, including cellular, local exchange, voice-over-IP, general purpose computers, messaging systems, gaming devices, set-top devices, PDAs, pagers, electronic books, lifestreaming systems, business, medical and other social behavior tracking and management systems, among others.

In one embodiment of the invention, a ring tone is generated from a recorded portion of a conversation with a caller. The ring tone is subsequently played when receiving a call from the same caller, who is identified by caller ID.

In another embodiment of the invention, a ring tone is generated by converting a text message, or portion thereof, to audio speech. The audio speech is then played when receiving a call from the same person, identified by caller ID. Detailed methods are disclosed for implementation of the present invention in both a NetStream-type communications system and a SIP-style communications system.

In another embodiment of the invention, a calendaring system is implemented and integrated into the ReminderRing system. Additional disclosure of this invention's operation demonstrates its even broader use as applied to other telecommunications modalities, with the addition of an integrated personal and/or public private party caller ID system to unify channels of communication by creating an overall system for counterparty identity representation; and in not just for incoming calls and calendared events, but also to announce completion of background tasks, such as for connecting outgoing calls.

This invention discloses a means for remedying this disparate situation by gathering the separate threads of electronically-mediated connectivity not in their collective cloud, as it were, but rather at the individual. By furnishing the user with technology to integrate his multimodal streams of telecommunication from other people, and himself, with representations that are more naturally suited for his sensory and cognitive nature, the current disclosure furnishes a better system to deal with communication.

Part of this system is a breakthrough improvement in annunciation, an idea which has been archetypal to the implementation of communication in the electronic world. For over a century phones have been ringing, alarms chiming, and then speakers chanting 'you've got mail' at the world. Central to the present invention is the means to not only indicate symbolically, as ringtones already do, who is calling, emailing or otherwise partaking in a communication event and what it is about, but directly, by using that person's own voice, recorded from a previous call or other venue, as that 'ring'.

These preferred embodiments of the current invention anchors a comprehensive system, which is herein disclosed, that improves communication by adapting it better to human use at the level of individual connectivity and through that means.

Germane to this is the presentation of alarm and personal reminder and calendaring, and generally communication systems with the storage of portions of relevant conversation streams or communication data streams, or other audible or visual triggers, to enhance them in the fashion herein disclosed, and to obtain the efficiency of integration in a single system. The current embodiments disclose a means by which such personal information management can be effectively integrated with conversation, its monitoring and processing.

BRIEF DESCRIPTION OF THE DRAWINGS

For a better understanding of the present invention, reference is made to the below-referenced accompanying drawings. Reference numbers refer to the same or equivalent parts of the present invention throughout the several figures of the drawings.

FIG. 14A and FIG. 14B combine to form an example table of a database record structure for the Private ID Mapping database utilized by embodiments of the current invention.

FIG. 22 is a first illustrative diagram of a use case example.

FIG. 23 is a second illustrative diagram of a use case example.

FIG. 27 shows an example of a Shout Box displaying adaptive forums text conversation.

MODES FOR CARRYING OUT THE INVENTION

The present invention is drawn to a system and method for creating a customized communication notification event system based on a previous communication, or any other available data, which may supplement future communications.

Figure 1:
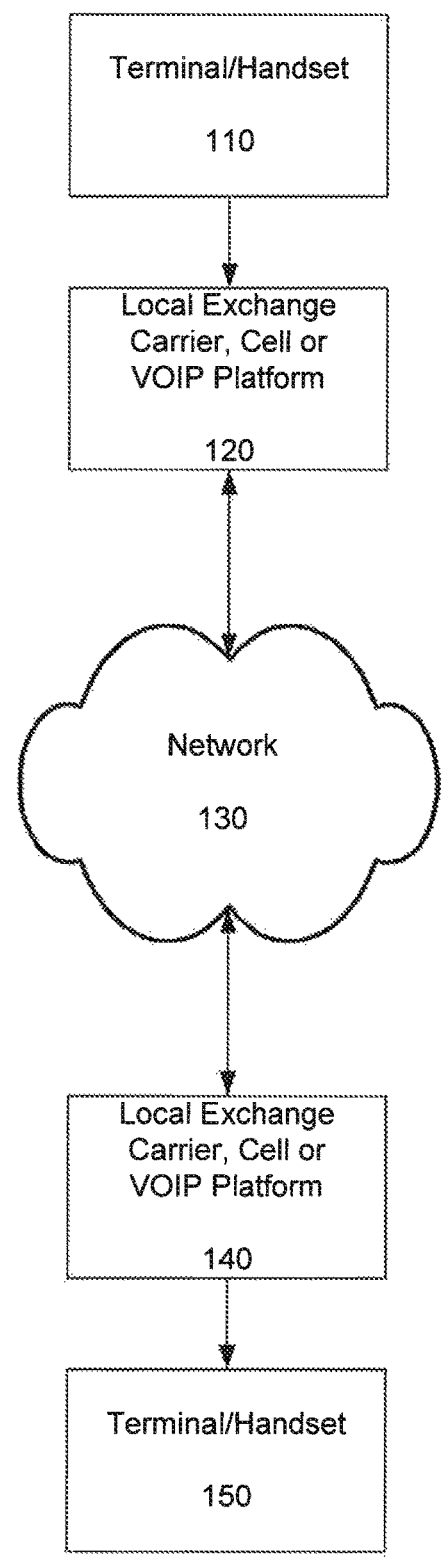
FIG. 1 is a block diagram showing the components of a standard telecommunications system.

With reference to FIG. 1, a diagram of a standard telecommunications system 100, in which an embodiment may be implemented, is shown. A first user (not shown) uses terminal/handset 110 to communicate with a second user (not shown) who uses terminal/handset 150. The terms "terminal" and "handset" as herein disclosed are used interchangeably and generically refer to telecommunications devices such as a cellular phone, pager, PDA, laptop, personal computer, etc. Terminals 110 and 150 transmit and receive data via platforms 120 and 140, respectively, which constitute communications platforms such as a private branch exchange (PBX), local exchange carrier (LEC), cellular platform, voice-over-IP (VOIP) platform, etc. Platforms 120 and 140 each connect to network 130, which may be any network, wired or wireless, ranging from a small private local network to the combined capability of the world's legacy hardwired systems (including the public switched telephone network (PSTN)) and the Internet.

Figure 2:
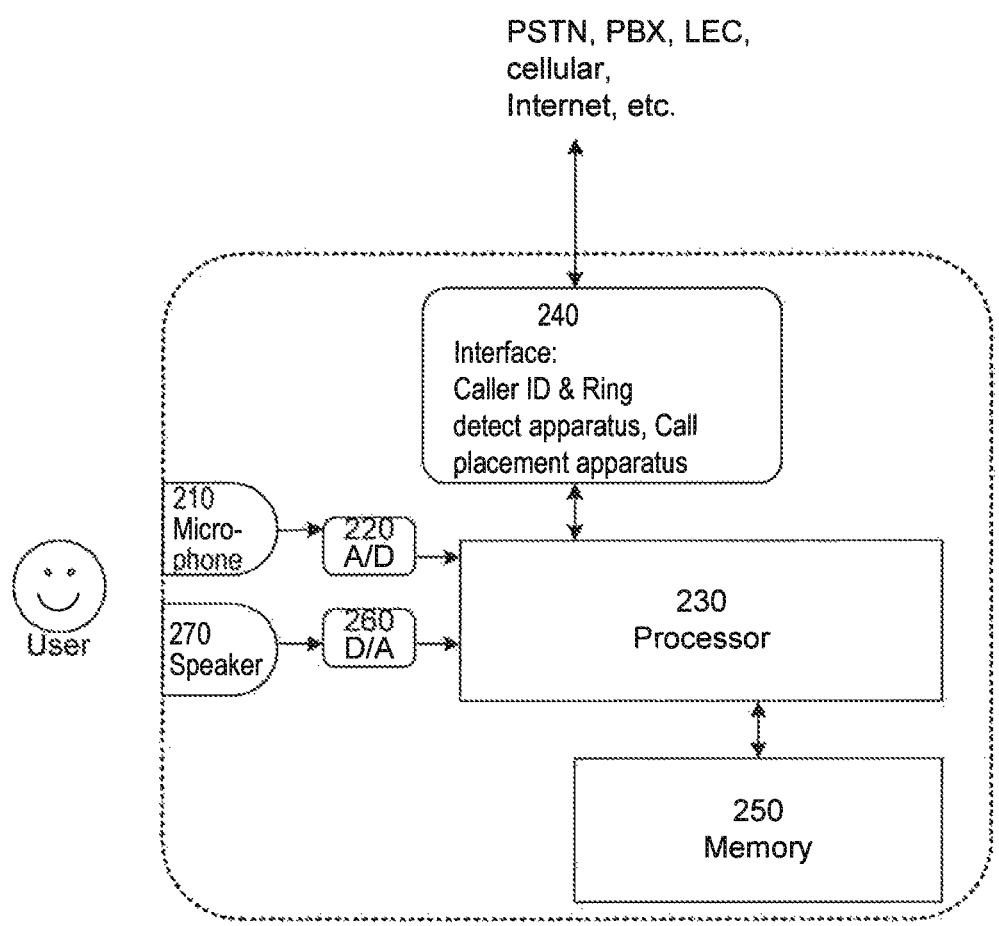
FIG. 2 is a schematic diagram showing the components of a terminal/handset.

With reference to FIG. 2, an exemplary schematic of a terminal/handset 200, in which the present invention may be implemented, is shown. Microphone 210 receives audio input from a user, which is converted to digital format by analog-to-digital converter 220. Similarly, a user listens to audio at speaker 270, the audio signal being produced from digital format by way of digital-to-analog converter 260. Processor 230 performs operations and processing, and is coupled to converters 220 and 260, memory 250, and interface 240. Interface 240 connects to external communications platforms or networks, such as PBX, LEC, PSTN, cellular, or the Internet. Interface 240 also contains electronic circuitry for caller ID, ring detection, and call placement. Memory 250 is coupled to processor 230, and provides storage capacity for data structures and files such as a contacts database, audio files, user settings, applications, data files, etc.

Figure 3:
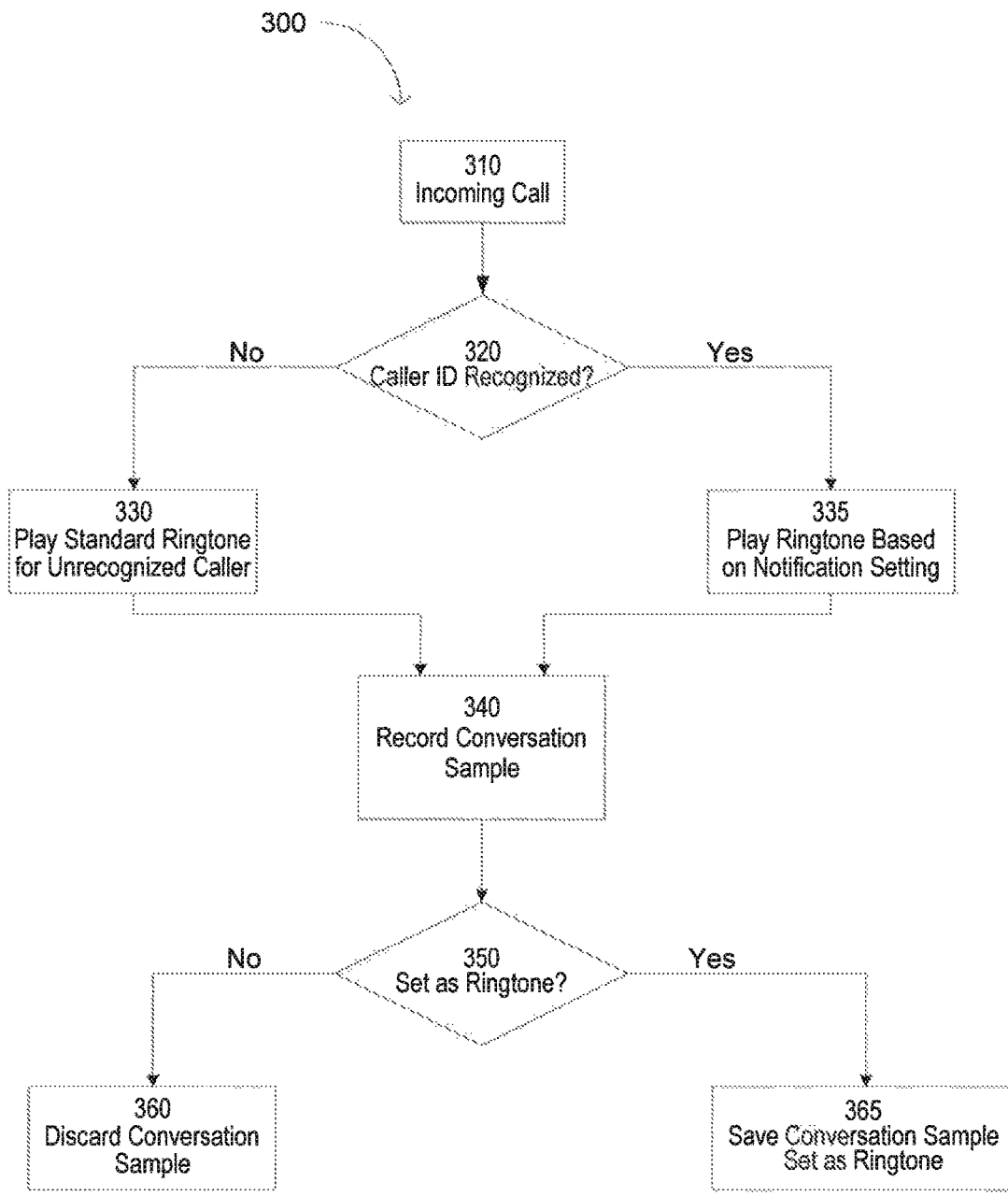
FIG. 3 is a flow diagram illustrating a method of creating and using a conversation-based ringtone.

With reference to FIG. 3, a flow diagram is shown illustrating a method 300 for creating and using a conversation-based ringtone in a terminal/handset in accordance with an embodiment of the present invention. At step 310, a user receives an incoming call from a caller, including caller ID information such as a telephone number. At step 320, it is determined whether the caller ID information of the caller is recognized or not. This is accomplished by checking against a contacts database, in which caller information such as name and phone number is stored. Associated with each contact in the contacts database is a notification setting indicating what ringtone to play when receiving a call from the contact. If the caller ID is not recognized in the contacts database, then at step 330, the standard ringtone for an unrecognized caller is played. On the other hand, if the caller ID is recognized in the contacts database, then at step 335, a ringtone is played based upon the ringtone setting associated with the contact. This may be a standard ringtone or some form of customized ringtone, such as a conversation-based ringtone, as is herein described. Assuming that the user answers the call, then a conversation stream will ensue.

At step 340, a sample from this conversation stream is recorded. The recording of the sample may be initiated fully automatically, or automatically as determined by a user-selected setting, or triggered manually in response to a user command. The particular sample recorded may vary in scope and duration, in accordance with various embodiments of the present invention. By way of example, various options for the recorded sample might include the following:

the first or last moments of the conversation, a randomly selected portion of the conversation, a concatenated and/or merged stream consisting of portions of the conversation recorded from one or more of the parties at different times during the conversation (e.g. 5 seconds of the conversation every 30 seconds), a portion of the conversation that varies depending upon the time of day, or a portion determined to be the most relevant portion by other analysis and/or human participation. The sample may be assembled from various components of the conversation stream, and/or prior conversation streams, and/or related sources. The selection process may vary for different contexts, and may be adjusted with automatic mechanisms and/or by the user and other humans, including using community and network-based heuristics. Without prejudice to the above generalities, more specific examples of methods of choosing, extracting and processing the sample will be taught later in this disclosure. The sample may include video or any other kind of sampled data from during the conversation, or any previous communication or other data concerning that person, such as unacknowledged emails sent to him. It may be mapped to text by speech recognition algorithms and displayed that way, or vice versa, the conversation may have been in text and be later mapped to speech by a text-to-speech component, and displayed instead of or in addition to being played back in its original mode. Multiple samples may be presented at varying times, both as annunciation rings or as augmentative displays during a voice or other communication. They may be based on only the last conversation, or on many prior communications in a variety of modes such as audio, video and text. In this preferred embodiment, the conversation sample is preferably recorded in a digital audio format, such as MP3, WMA, or AAC, and stored as a file and/or in a call conversation database.

At step 350, in this embodiment, after the conclusion of the conversation, the user has the option to save and/or set the recorded conversation sample as the ringtone for that caller. If the user decides not to save the recorded sample, then at step 360, the sample is discarded. Whereas, if the user decides to set it as the ringtone, that is, for potential later playback, in whole or in part, as an annunciation, then at step 365, the notification option for the caller is set to play the recorded sample as a ringtone when a subsequent call is received from the same caller ID. In additional embodiments of the present invention, the recorded sample may be further processed—such as by applying sound effects, or by combining it with other sounds or music—either before or concurrently as it is used as a ringtone. Additionally, in that potential playback it may be further processed and/or subsequently utilized to annunciate related events, such as the time of an appointment, a missed call or voicemail in a list of such missed calls or voicemails, the need to finish part or all of a project, the need to perform a health-related action, such as exercising or taking a prescribed drug, or the completion of a background task, in particular the completion of an outgoing call to that or a related party, or any other task, activity or event where such utilization could be accomplished.

Figure 4:
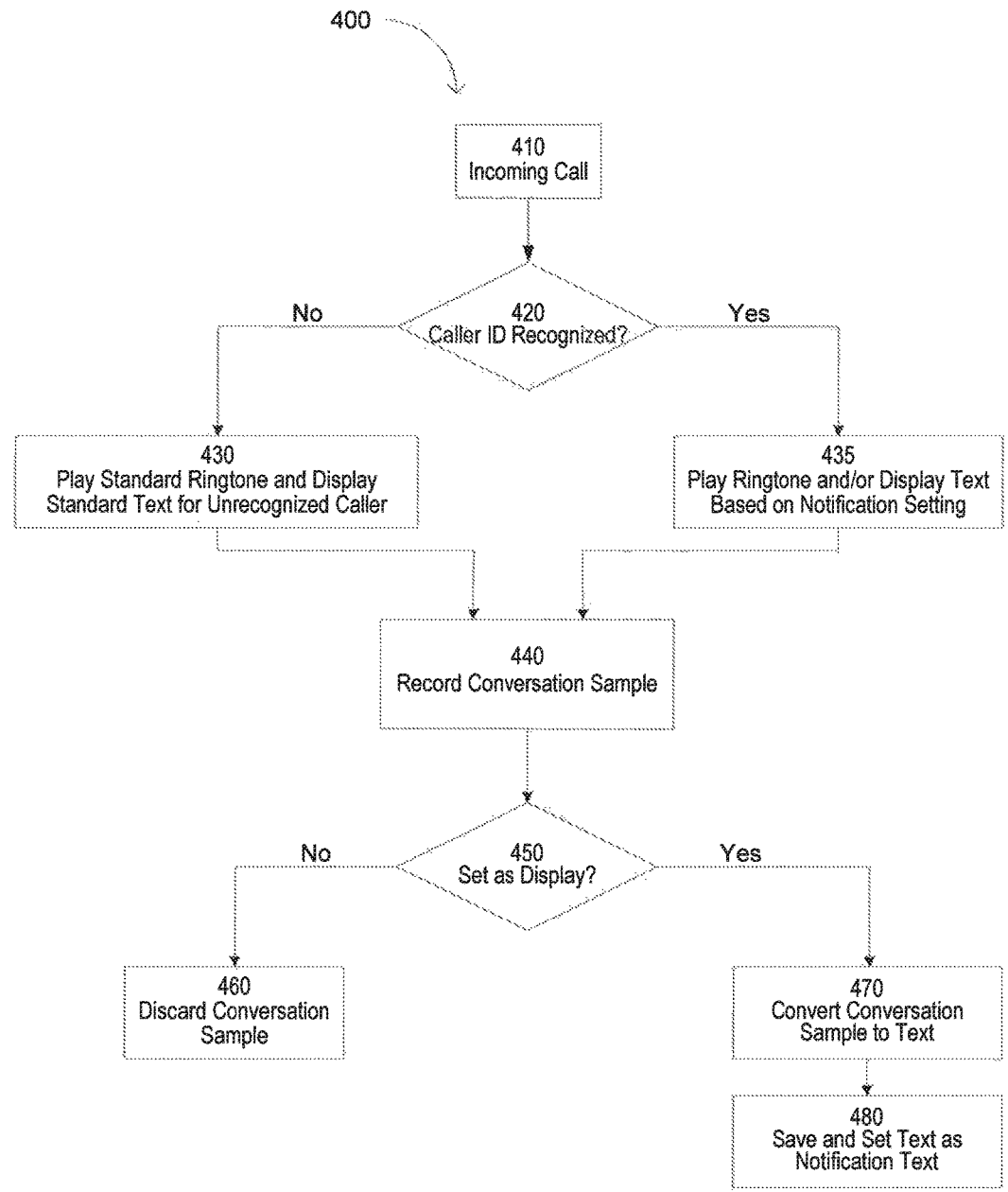
FIG. 4 is a flow diagram illustrating a method of creating and using a conversation-based textual display notification.

With reference to FIG. 4, a flow diagram is shown illustrating a method 400 of creating and using a conversation-based textual display notification, in accordance with an alternative embodiment of the present invention. At step 410, the user receives an incoming call from a caller, including caller ID information. At step 420, it is determined whether the caller ID information is recognized, by reference to a database. If the caller ID is not recognized, then at step 430, a standard ringtone and standard text is displayed for the unrecognized caller. If the caller ID is recognized, then at step 435, a ringtone is played and text is displayed based upon the notification setting associated with the contact. At step 440, a sample of the conversation stream is recorded. At step 450, the user has the option to set the recorded conversation sample as text to be displayed when a subsequent call from the same caller is received. If the user decides not to do so, then at step 460, the conversation sample is discarded. If the user decides yes, then at step 470, the conversation sample is converted to text by a speech-to-text method as is known in the art. At step 480, this text is saved as a file or in a database, and the notification setting for the contact is set so that the text will be displayed when a subsequent call is received from the caller, or to annunciate related events.

Figure 5:
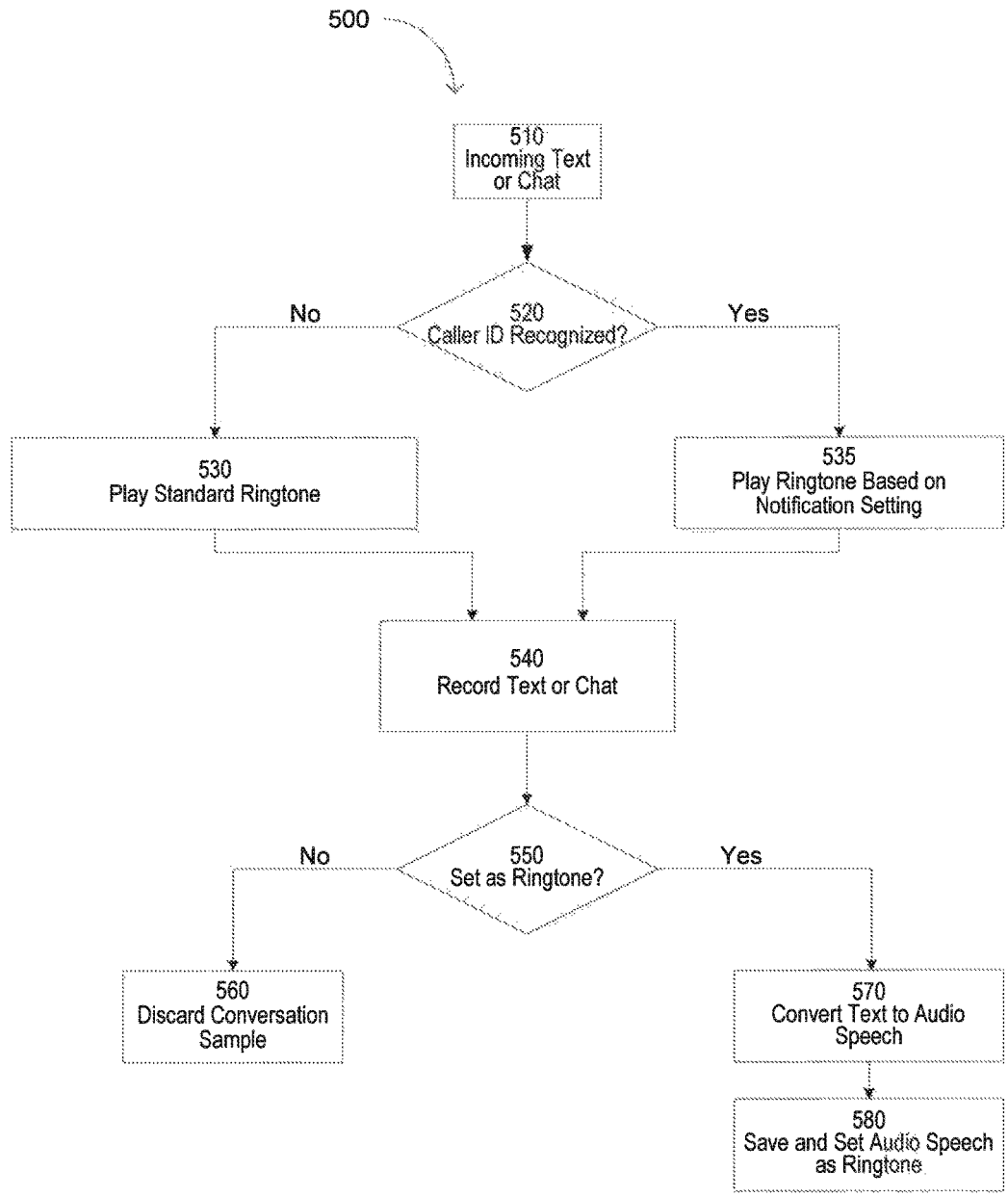
FIG. 5 is a flow diagram illustrating a method of creating and using a text-based ringtone.

With reference to FIG. 5, a flow diagram is shown illustrating a method 500 of creating and using a text-based ringtone, in accordance with an alternative embodiment of the present invention. At step 510, the user receives an incoming text message or text chat request from a caller, including caller ID information. At step 520, it is determined whether the caller ID information is recognized, by reference to a database. If the caller ID is not recognized, then at step 530, a standard ringtone is played for the unrecognized caller. If the caller ID is recognized, then at step 535, a ringtone is played based upon the notification setting associated with the contact. At step 540, the text is recorded. In the case of a text message, the text will already be saved so it is likely that no additional recording is required. However, in the case of a chat, then the text will be captured as a chat log. Furthermore, it may be desirable to select a sample from the captured text. At step 550, the user has the option to set the recorded text as a ringtone to be played when a subsequent call from the same caller is received. If the user decides not to do so, then at step 560, the user has the option to discard the recorded text. If the user decides yes, then at step 570, the conversation sample is converted to audio speech by a text-to-speech method as is known in the art. At step 580, this audio speech is saved as an audio file or in a database, and the notification setting for the contact is set so that the speech will be played when a subsequent call is received from the caller, or to annunciate related events.

Figure 6:
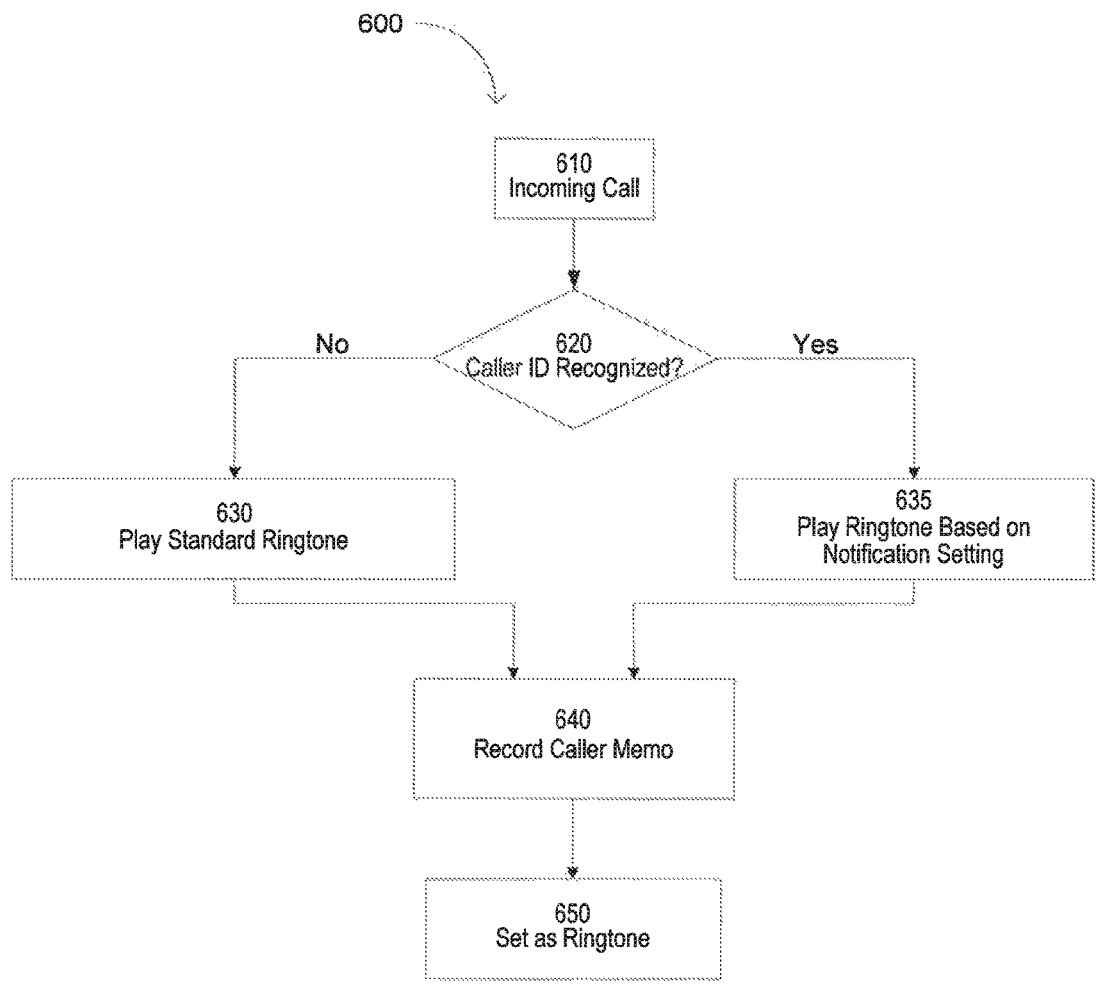
FIG. 6 is a flow diagram illustrating a method of creating and using a caller memo-based ringtone.

With reference to FIG. 6, a flow diagram is shown illustrating a method 600 of creating and using a caller memo-based ringtone, in accordance with an alternative embodiment of the present invention. At step 610, the user receives an incoming call from a caller, including caller ID information. At step 620, it is determined whether the caller ID information is recognized, by reference to a database. If the caller ID is not recognized, then at step 630, a standard ringtone is played for the unrecognized caller. If the caller ID is recognized, then at step 635, a ringtone is played based upon the notification setting associated with the contact. Assuming that the caller is unavailable or otherwise does not take the call, then at step 640, the caller records a memo to be used as a ringtone. At step 650, the recorded memo is saved as an audio file or in a database, and set as a ringtone to be played when a subsequent call from the same caller is received, or to annunciate related events.

Prior art mechanisms exist for establishing voice communications between two computers over the internet. An example of a system that can provide such an ability in a personal computer using standard communication mechanisms is disclosed in the book *Programming Flash Communication Server*, written by Brian Lesser, Giacomo Guilizzoni, Robert Reinhardt, Joey Lott, and Justin Watkins (O'Reilly Media, Inc. 2005; ISBN: 0596005040), incorporated herein by reference. This book, and many systems built using its basic methodology, such as the Ribbit platform, use the Flash standard for conducting the audio stream to computer speakers, in particular by means of the Flash NetConnection and Netstream objects which invoke Adobe Flash proprietary facilities running under a browser such as the open source Firefox. Other books that have covered this topic in detail include *Macromedia® Flash™ MX 2004 for Rich Internet Applications*, by Phillip Kerman, (New Riders 2003, Print ISBN-10: 0-7357-1366-9) incorporated herein by reference, in which it is noted that two NetStream instances are necessary for simultaneous transmission and receipt of audio or video, as in a telephone. Another book, *Flash 8: Projects for Learning Animation and Interactivity*, by Rich Shupe; Robert Hoekman, Jr., (O'Reilly 2006, Print ISBN-10: 0-596-10223-2, Print ISBN-13: 978-0-59-610223-4), incorporated herein by reference, analogizes the NetConnection as the phone call made to a company switchboard, and the NetStream as the conversation. These and many other examples incorporate code that implements dual Netstream instances, each providing the sound (and optionally video) architecture, to provide for varying degrees of convenience in telephonic communication. Platforms such as Ribbit instantiate such methods with industrial scaling, dialing code conveniences and bridges to the general phone networks to provide VOIP connectivity to traditional handsets. Migration routes such as Maemo and WinMo have brought the applications and interfaces into small handsets. Many of these platforms further are open to allow developers to address them by creating applications using the existing phone communications mechanism.

To provide for simultaneous Recording capability on top of telecommunications within, an "Open Source" (Linux-based) project which addresses the same NetStream and NetConnection standards can be used on the client side. Furthermore, by operating under Linux, the entire client-side set up is rendered in Open Source and can be modified at will by any programmer, using the project documentations which are publicly available and known to those in the art. Methods for saving files, processing and working with sounds are quotidian within such an enabled context. In particular, an Open Source project which addresses the same NetStream and NetConnection standards that can be used conveniently on the client side, particularly under Linux, is Gnash.

With a commercial phone platform such as Ribbit or equivalent platform which could be commercial or constructed by a software developer, the Gnash "open source" Gnu Public License project provides a full source code library that replaces the Adobe Flash audio handling implementation in a FireFox plug-in. Thus, the code may be modified to retain in memory a copy of each sound as it is played, along with processing it as desired. Gnash and its source code are incorporated herein by reference, a listing of which is provided in the gnash.txt file included in the computer listing appendix described above.

Figure 7:
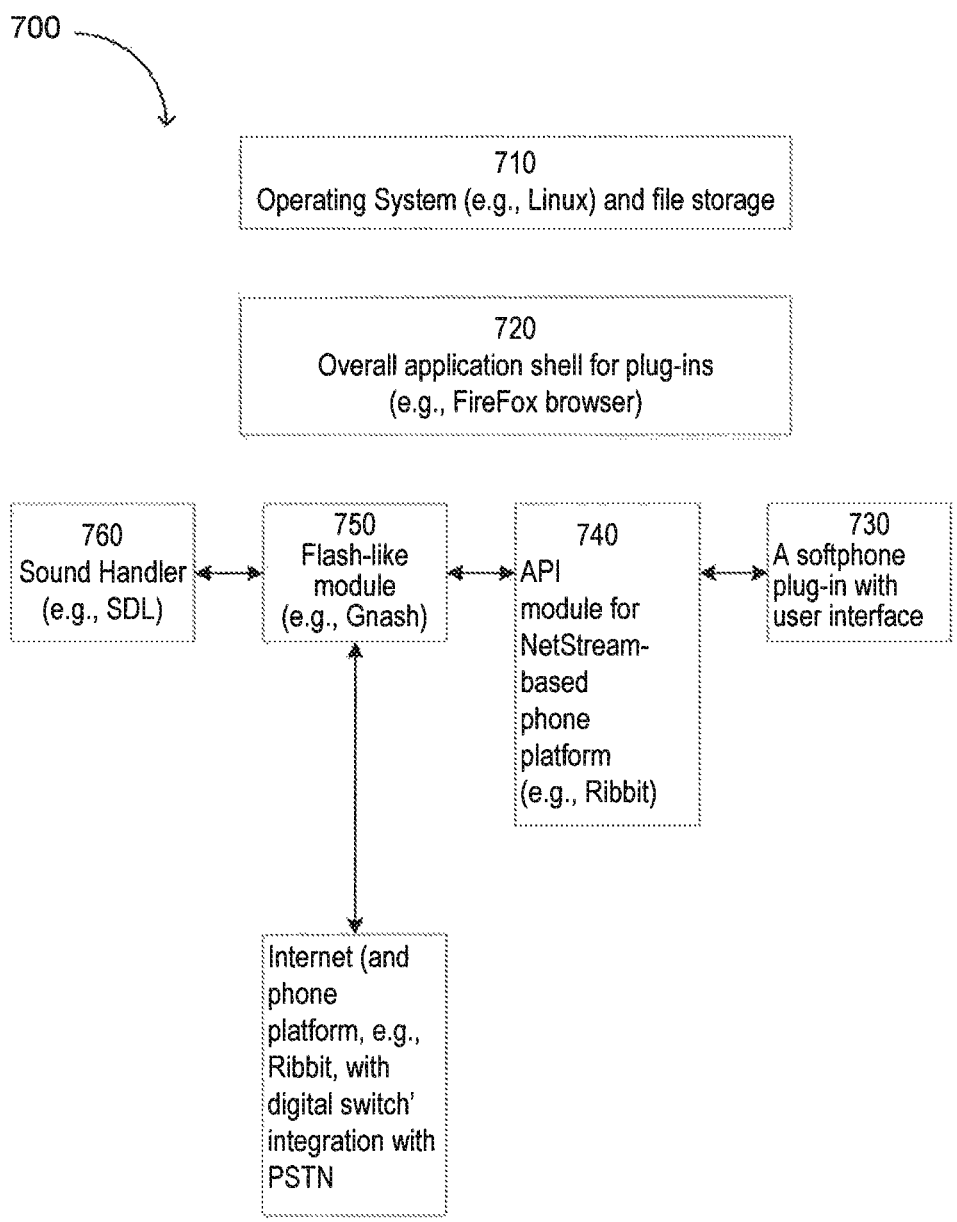
FIG. 7 is a diagram of a Netstream-type communications system, in which the present invention may be implemented.

With reference to FIG. 7, a Netstream-type communications system as presently described is shown, in which the present invention may be implemented. Operating system 710 (e.g. Linux) provides a platform and access to file storage.

Application shell 720, such as a browser (e.g. the open source standard Firefox), provides a shell for plug-ins. Softphone plug-in 730 provides a user interface for a software telephone. API module 740 (for a Netstream-based phone platform such as Ribbit) facilitates interaction with Flash-like module 750 (e.g. Gnash), which handles Net-stream-type telecommunications streams communicated over the internet. Sound handler 760 (e.g. SDL) facilitates production of sound.

In accordance with an embodiment of the present invention, presently disclosed is a set of modifications to Gnash to provide for conversation-based ringtone functionality. The Gnash code's implementation of the NetConnection and NetStream class relies on a pair of "sound_handlers." One sound_handler is designated GST (GStreamer); the other Sound handler of Gnash is designated by SDL, Simple Directmedia Layer.

Either or both sound_handler platforms are modifiable to afford Gnash a recording capability, depending on the additional capabilities desired in a customized ringtone instance. GStreamer is suited for more elaborate sound processing, and required for video; thus, modification of the simpler SDL version suffices for a straightforward telephonic embodiment of the present invention, which clearly can be extended to the video sound handler, too. Four Public Member Functions lie at the crux of the SDL-based Gnash implementation:

1) virtual int create_sound (void *data, int data_bytes, int sample_count, format_type format, int sample_rate, bool stereo) Called to create a sound.

2) virtual long fill_stream_data (void *data, int data_bytes, int sample_count, int handle_id) Called when a stream gets more data.

3) virtual void play_sound (int sound_handle, int loop_count, int offset, long start_position, std:: vector<sound_envelope>*envelopes) Play the indexed sample.

4) virtual void delete_sound (int sound_handle) Called when it is done with a sample.

These functions are implemented, for the SDL case, in the source code, (reproduced in the SDL_source.doc file for convenience, and incorporated by reference as listed above).

The SDL library called by these Gnash facilities performs the actual invocation of the OS and/or hardware sound production audio driver type code to make sound from the speakers. The SDL audio runs independently in a separate thread, filled via a callback mechanism to Gnash. Further detail is publicly available from a variety of sources, known to those in the art, such as the book *Linux Multimedia Hacks* by Kyle Rankin, (O'Reilly Pub 2005, Print ISBN-10: 0-596-10076-0, Print ISBN-13: 978-0-59-610076-6), which will be helpful in tuning the instantiation to a particular specification, and make it clear how to work with sound at this level. Given those teachings, the Gnash sound_play code (a subset of the SDL source code, extracted for convenience in the sound_play.doc file, incorporated by reference as listed above) can be modified; the crux of that mod consists of inserting code at the end, before the close brace and just after the fragment:

if (soundsPlaying=1) {
   SDL_PauseAudio(0);
   } which will thus be invoked as each sound fragment, which has come from the NetStream Flash-like call to GNASH, is passed to the SDL to be played. (Note that the SDL_PauseAudio(0); calling line actually starts the sound fragment playing.) This sound fragment can then be output to longer term memory storage by means readily known in the art, assembling the fragments or further processing them in turn to produce a saved copy of some or all of the input sound stream which will serve as the source for the customized ringtone. Alternately, the SDL library itself can be modified to save such a file from the stream of sound sent to it.

Having those conversation sound files saved by means such as that disclosed above, or other means already known in the art, they may further be associated with keys designating the caller, stored and retrieved from a database on that basis by means well known in the art to enable the production of customized ringtones as described.

Figure 8:
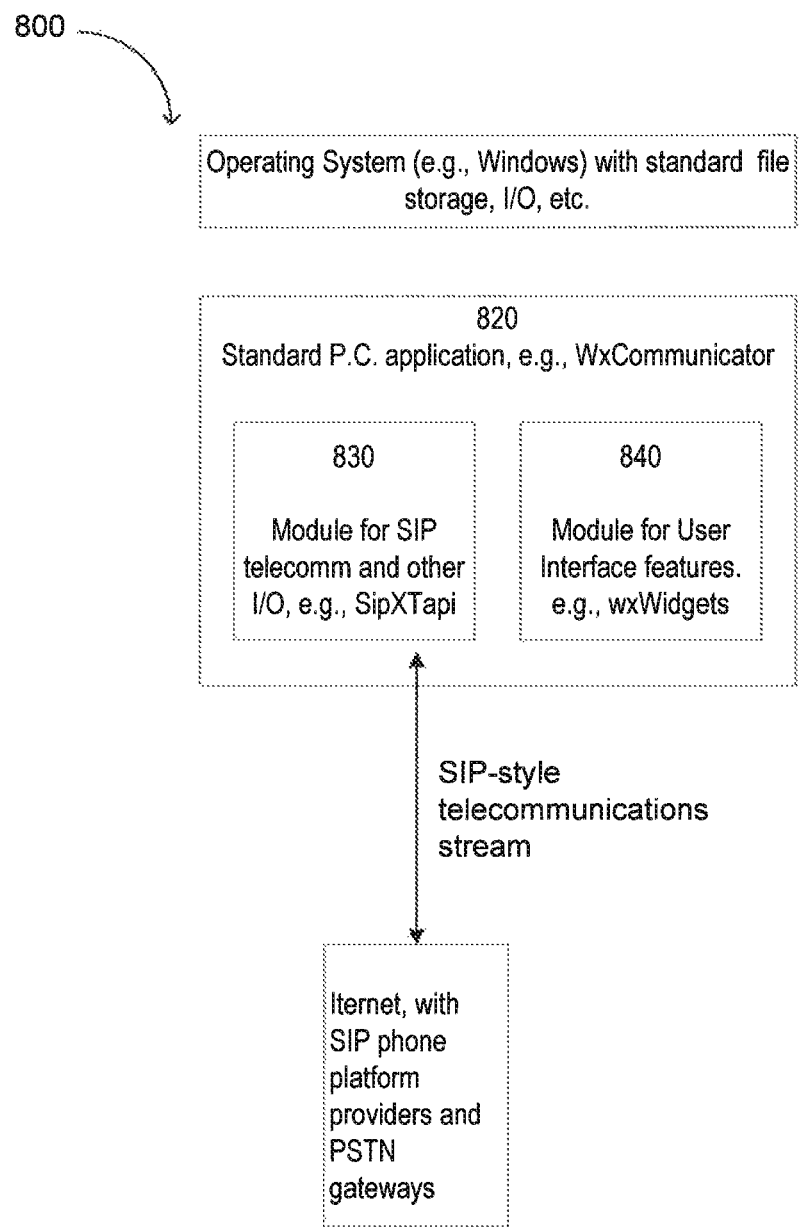
FIG. 8 is a diagram of a SIP-type communications system in which the present invention may be implemented.

Alternatively, any of a number of SIP-type softphones could be modified to provide a basis for practicing the present invention. With reference to FIG. 8, a SIP-type communications system 800 is shown, in which the present invention may be implemented. Operating system 810 (e.g. Windows) provides a platform and access to file storage, I/O, etc. Application 820, such as wxCommunicator, includes module 830 for handling SIP (Session Initiation Protocol) telecommunications and other I/O, and module 840 for user interface features. Application 820 supports a SIP-type telecommunications stream that runs over the internet.

For purposes of implementing the principles of the present invention, wxCommunicator provides an open source project with full source code and documentation that is publicly available and known to those in the art. As it already contains user accessible call record and ringtone functions, one can implement the present invention within its context. In order to facilitate the functions as disclosed herein in accordance with the present invention, wxCommunicator's ringtone function can be modified to retrieve a file selected programmatically instead of by the user, and its recording function changed to record in accordance with an aspect of the invention instead of via a manual start command from the user.

Figure 9:
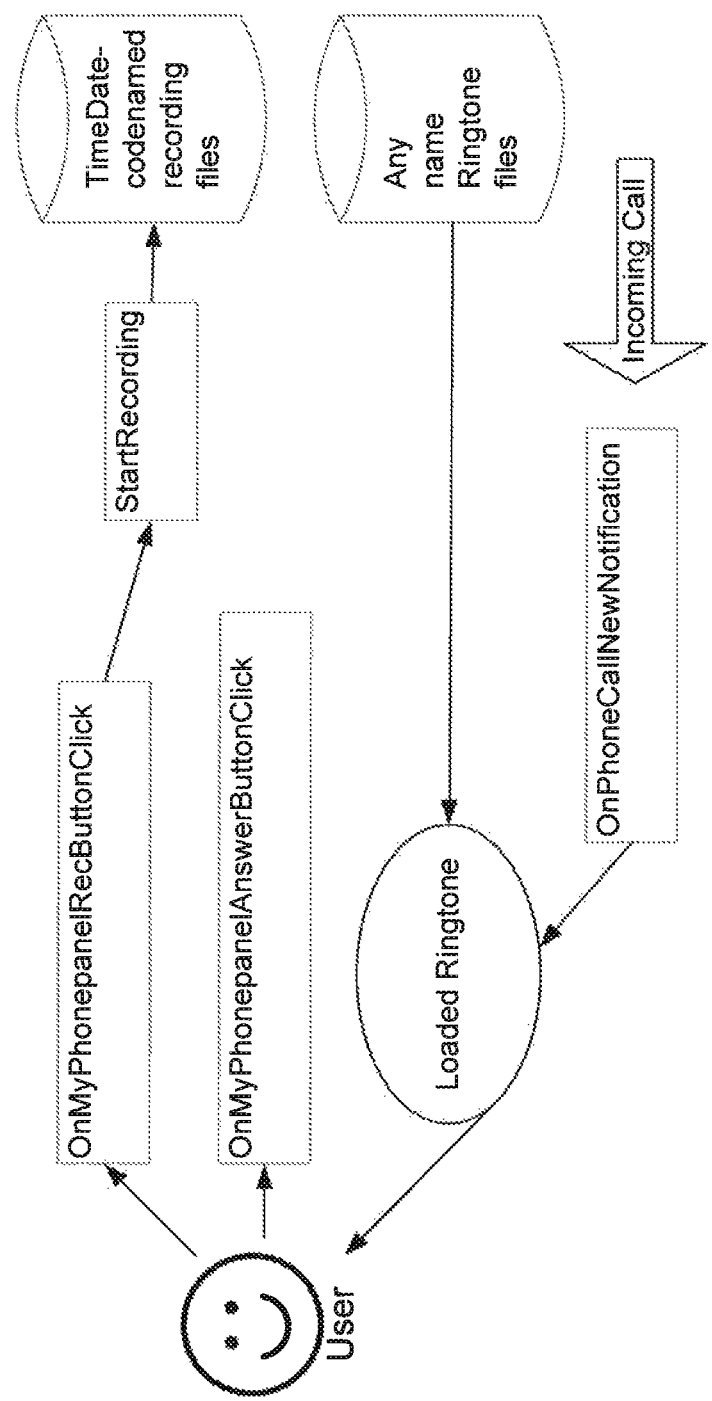
FIG. 9 is a block diagram showing the basic unmodified architecture of wxCommunicator.

Therefore, in accordance with an embodiment of the present invention, presently disclosed is a set of modifications to wxCommunicator that implement the conversation-based ringtone mechanism. These modifications are applied to the standard version of wxCommunicator, (herein incorporated by reference, a listing of which is supplied in the file wxCommunicator.txt in the computer listing appendix, as indicated above), which compiles with Visual Studio 2005 and runs on Windows XP. FIG. 9 illustrates in a block diagram the basic unmodified architecture of wxCommunicator (not all connections shown).

To begin with, it is noted that the line of code in sipxtapiproxy.cpp, in StartRecording:
wxString path=wxString::Format(wxT("% s\\recordings"), wxGetApp( ).m_Configurator.GetDataPath( ));

In the unmodified wxCommunicator source code release specifies the name of the folder in which call recordings are saved as "recordings." This is changed to save in the same folder, "sounds," as the ringtones:
wxString path=wxString::Format(wxT("%s\\sounds"), wxGetApp( ).m_Configurator.GetDataPath( ));

This creates a version of wxCommunicator in which a portion of a phone conversation can be recorded, saved, and manually selected to be subsequently used as a ringtone.

Next, to add functionality the first part of StartRecording's code is changed, so it reads as shown below:

```
/****************************************************************/
/*      start call recording      // mod for reminder-ring              */
/****************************************************************/
bool SipXTapiProxy::StartRecording(PhoneCall *pPhoneCall, wxString call_username) const
{
  if (m_SipXInstance && !m_bSipXCallInProgress)
  {
    if (pPhoneCall)
    {
      //mods for simple starter version of reminder ring:
      // first: replace 'recordings' directory name with the ringtones directory name, 'sounds'
      // previously, the next line was:
      // wxString path = wxString::Format(wxT("%s\\recordings"),
wxGetApp( ).m_Configurator.GetDataPath( ));
      // now changed to:
        wxString path = wxString::Format(wxT("%s\\sounds"),
wxGetApp( ).m_Configurator.GetDataPath( ));
      // previous code, to do user-selected ring; probably want to bring back later for offering
alternative
      // wxDateTime timeNow = wxDateTime::Now( );
      // wxString filename = wxString::Format(wxT("%s\\%s.wav"), path,
timeNow.Format(wxT("%Y-%m-%d %H-%M-%S")));
        /* Next, just create based file name with reminder ring file name */
        // for this prototype, first just map special chars to produce a unique but acceptable file
name for Windows
        // embodied with a simple fix for now just for the two special chars " and ,
        // that show up in SIP bridge caller ids but can't be in file name.
        // more elaborate version later can offer user choice of rr or standard rings, map all
special chars algorithmically
        wxString temp_string = call_username;
        temp_string.Replace(wxT("\""), wxT("-quote-"));
        temp_string.Replace(wxT("\""), wxT("-quote-"));
        temp_string.Replace(wxT(","), wxT("-comma-"), 1);
        call_username = temp_string;
        wxString mapped_call_username = call_username;
      wxString filename = wxString::Format(wxT("%s\\%s.wav"), path, call_username);
      SIPX_RESULT sipxResult;
      sipxResult = sipxCallAudioRecordFileStart(pPhoneCall->m_hCall,
filename.mb_str(wxConvUTF8));
      if (sipxResult != SIPX_RESULT_SUCCESS)
      {
        LOGBASIC(LOG_ERROR, _("sipxCallAudioRecordFileStart failed, error code %i"),
sipxResult);
        return false;
```

```
    }
    else
    {
      LOGBASIC(LOG_VERBOSE, _("sipxCallAudioRecordFileStart call successful"));
      pPhoneCall->m_bIsSoundBeingRecorded = true;
      pPhoneCall->OnChanged( ); // notify observers, maybe they are displaying this info
somewhere
      return true;
    }
  }
  else
  {
    LOGBASIC(LOG_ERROR, _("Wrong parameters in StartRecording"));
    return false;
  }
}
else
{
  LOGBASIC(LOG_ERROR, _("Aborting call, another async sipxtapi call is in progress, or
sipxtapi is not initialized."));
}
  return false;
}
```

Thus, the file name under which a recording is saved is unique to the "caller ID" (often called user name in SIP; the terms are applied interchangeably for purposes of the present disclosure). (It is noted that if a 'bridge' or 'gateway' from PSTN to SIP is used by the caller, instead of a sister SIP phone, the origin PSTN caller-ID code may not be available, or, for instance, will be replaced with a designation of the caller's geographic location such as their city, and thus all calls from that gateway, or through that gateway from a particular city, respectively, may ring the same ringtone; but this example suffices to illustrate the technique that can be applied in other contexts as are described elsewhere in this disclosure.)

Then at the end of phonepanel.h, a declaration is added for rr_username to hold the callerID, making the end of the file read:

```
    wxBitmapButton* m_BlindTransferButton;
    // mod for reminder-ring
    wxString rr_username;
    /// Control identifiers
    enum {
    MYFRAME_PHONEPANEL=10008
////@end MyPhonePanel member variables
    MyBitmapToggleButton*          m_CurActiveLineBtn;
///<pointer to active line button
    MyLineButtonArray m_LineButtonArray;  ///<array of
line buttons
};
#endif
    // _PHONEPANEL_H_
```

And in SipXTApiProxy.h, in order to pass in the caller ID needed to generate a unique reminder ring file name for each 'caller ID' (usually related to username in this SIP-related codebase), a parameter is added to the calling sequence of
bool StartRecording(PhoneCall *pPhoneCall) const;

In its declaration, making it:
bool StartRecording(PhoneCall *pPhoneCall, wxString username_parameter_for_rr) const;

In phonepanel.cpp, OnMyphonepanelRecbuttonClicked call is changed to startRecording to pass in the caller id (i.e., user name), as follows:

```
void    MyPhonePanel::OnMyphonepanelRecbuttonClicked
(wxCommandEvent& event)
{
    // set rec button to previous state, as it will be updated to
correct state by event
    m_RecButton->SetValue(!m_RecButton->GetValue( ));
    PhoneCall* pCall=GetSelectedPhoneCall( );
    if (pCall)
    {
    if(!pCall->m_bIsSoundBeingRecorded)
    {
    // mod for reminder-ring
    //    SipXTapiProxy::getInstance( )->StartRecording
        (pCall);
        SipXTapiProxy::getInstance->StartRecording(pCall,
           rr_username);
    }
    else
    {
        SipXTapiProxy::getInstance(    )->StopRecording
        (pCall);
    }
    }
}
```

Also in that file, OnPhoneCallNewNotification is modified so it saves the caller ID of an incoming call:
```
void    MyPhonePanel::OnPhoneCallNewNotification(wx-
CommandEvent &event)
{
    PhoneCall *pCall=wxDynamicCast(event.GetEventObject( ), PhoneCall);
    if (pCall)
    {
    int pos;
    wxListItem listItem;
    int lineIndex=DataModel::getInstance( )->FindLineIn-
        dexByHandle(pCall->m_hLine);
    wxString statestr=SipXTapiProxy::getInstance( )->Get-
        CallStateString(pCall);
    listItem.SetText(wxString::Format(wxT("%i"),    lineIn-
        dex+1));
    listItem.SetColumn(0);
    listItem.SetData(pCall->m_hCall);
    pos=m_MainCallList->InsertItem(listItem);
```

```
m_MainCallList→SetItem(pos, 1, statestr);
wxString username=SipXTapiProxy::getInstance( )→Ge-
    tUsernameFromSipUri(pCall→m_sRemoteParty);
m_MainCallList→SetItem(pos, 2, username);
// mod for reminder-ring: pass the username on to id the
    recorded call fragment
rr_username=username;
long selectedItemId=GetSelectedCallItemId( );
m_MainCallList→SetItemState(selectedItemId,       0,
    wxLIST_STATE_FOCUSED|wxLIST_STATE_SE-
    LECTED);
m_MainCallList→SetItemState(pos,     6,     wxLIST-
    _STATE_
    FOCUSED|wxLIST_STATE_SELECTED);
    }
}
```

The result is then a version of the wxCommunicator softphone that will allow the user to record conversation and have it automatically saved under a unique identifier as a ringtone, which can be manually chosen from the wxCommunicator ringtone menu. To complete the basic implementation of a conversation-based ringtone one can make the manual choice automatic. A line is added to the end of OnPhoneCallNewNotification, so it is as follows:

```
m_MainCallList→SetItem(pos, 1, statestr);
wxString username=SipXTapiProxy::getInstance( )→Ge-
    tUsernameFromSipUri(pCall→m_sRemoteParty);
m_MainCallList→SetItem(pos, 2, username);
// mod for reminder-ring: pass the username on to id the
    recorded call fragment
rr_username=username;
long selectedItemId=GetSelectedCallItemId( );
m_MainCallList→SetItemState(selectedItemId,       0,
    wxLIST_STATE_FOCUSED|wxLIST_STATE_SE-
    LECTED);
m_MainCallList→SetItemState(pos, 6, wxLIST_STATE-
    _FOCUSED|wxLIST_STATE_SELECTED);
// mod for reminder-ring: grab the sound for this caller
SipXTapiProxy::getInstance(   )→ReloadRingtone(user-
    name);
    }
}
```

And additional code to perform the 'ReloadRingtone' function is inserted into SipXTapiProxy.h:
    bool ReloadRingtone(wxString username_parameter_ for_rr);
and to SipXTapiProxy.cpp, where the temp_string encoding used previously is repeated:

```
/******************************************************************/
/*    reload ringtone    // mod for reminder-ring       */
/******************************************************************/
bool SipXTapiProxy::ReloadRingtone(wxString call_username)
{
    // mods for simple starter version of reminder ring:
        wxString path = wxString::Format(wxT("%s\\sounds"),
    wxGetApp( ).m_Configurator.GetDataPath( ));
        wxString temp_string = call_username;
        temp_string.Replace(wxT("\""), wxT("-quote-"));
        temp_string.Replace(wxT("\'"), wxT("-quote-"));
        temp_string.Replace(wxT(","), wxT("-comma-"), 1);
        call_username = temp_string;
    wxString changeto_filename = wxString::Format(wxT("%s\\%s.wav"), path,
    call_username);
        wxString current_filename =
    ::wxGetApp( ).m_Configurator.GetCurrentRingtonePath( );
        wxString filename = changeto_filename;
        //wxString sRingtone = DataModel::getInstance( )->m_AudioSettings.getRingtone( );
        //wxString sRingtonePath =
    ::wxGetApp( ).m_Configurator.GetCurrentRingtonePath( );
        // mod for reminder-ring prototype
        //m_RingtonePlayer.LoadFile(sRingtonePath);
        m_RingtonePlayer.LoadFile(filename);
        return true;
}
```

```
void    MyPhonePanel::OnPhoneCallNewNotification(wx-
CommandEvent &event)
{
    PhoneCall *pCall=wxDynamicCast(event.GetEventOb-
ject( ), PhoneCall);
    if (pCall)
    {
    int pos;
    wxListItem listItem;
    int lineIndex=DataModel::getInstance( )→FindLineIn-
        dexByHandle(pCall→m_hLine);
    wxString statestr=SipXTapiProxy::getInstance( )→Get-
        CallStateString(pCall);
    listItem.SetText(wxString::Format(wxT("%i"),   lineIn-
        dex+1));
    listItem.SetColumn(0);
    listItem.SetData(pCall→m_hCall);
    pos=m_MainCallList→InsertItem(listItem);
```

The result is the further functionality of playing as a ringtone the last sound recorded by the user of an incoming call from that caller ID. (It is recognized that further refinement of the presently disclosed system may entail addressing the following: various file sizings, error diagnosing, perfect initializations, proper handling of outgoing calls, multiple lines, merging voice streams, conference calls, etc.) To facilitate automatic recording of the line a further modification to phonepanel.cpp is performed:

```
void MyPhonePanel::OnMyphonepanelAnswerbuttonClick
(wxCommandEvent& event)
{
    PhoneCall* pSelectedCall=GetSelectedPhoneCall( );
    // we pick up if call is in ALERTING state, or dial if not
    SipXTapiProxy::getInstance(   )→OnAnswerbuttonClick
(pSelectedCall);
    // mod for reminder-ring prototype: start recording every
call answered
```

```
if (pSelectedCall)
{
    wxCommandEvent dummy_event;
    OnMyphonepanelRecbuttonClicked(dummy_event);
        /* just pretend the user clicked Record */
}
}
```

The open source wxCommunicator SIP softphone is modified by making changes to the code for StartRecording, OnMyphonepanelAnswerbuttonClick, OnMyphonepanelRecbuttonClicked, OnPhoneCallNewNotification; adding a global variable rr_username shared between the latter two; and new code to make ReloadRingtone. (These are shown in final modified form in the computer listing appendix in the file modified_wxCommunicator.txt, herein incorporated by reference as described above.) The modified wxCommunicator architecture is illustrated as a block diagram in FIG. 10 (not all connections shown). The aforementioned modifications to wxCommunicator provide a basic conversation-based ringtone capability: incoming calls ring using a recording of the caller's voice from a prior conversation, creating a reminder ring. Additional capability such as that described elsewhere in this disclosure can be built, by means known in the art, on this foundation or alternatives.

Further extending the current invention, wxCommunicator code is used as a foundation for instantiating extensions applying its technology in a similar fashion for reminding a user of an appointment or other calendar-based event, or any other event. To disclose such a mechanism, yet another open source package, known in the art as Rainlendar, is enlisted as an example framework. Rainlendar provides standard pop-up message box reminders and event calendaring functionality in a Windows application, and is incorporated herein by reference. It will be clear to anyone with skill in the art that there are a number of straightforward ways to combine this application with the aforementioned SIPC phone to create a single shared codebase presenting the user with a phone with ReminderRing and a calendar program without ReminderRing.

With both codebases under one roof, a few modifications then suffice to integrate them enough to create a calendaring app with ReminderRing functionality. The Rainlendar architecture is modified by adding additional methods to the "CEntryEvent" object to set and retrieve a parameter which indicates the sound to be used to announce the reminder of that calendar event. In this implementation this is the equivalent of rr_username as employed in the modified wxCommunicator code described in FIG. 10 and implemented in a fashion equivalent to the existing Rainlendar CEntryEvent method GetBriefMessage and its text-setting counterpart approach. For example, these may be called 'GetAudibleReminderFromEvent' and 'setAdibleReminderToEvent'. They are then evoked during calendar event creation by user interface driven options which allow the user to select if he wants a calendar event to be announced with an audible 'reminder' or not.

Figure 10:
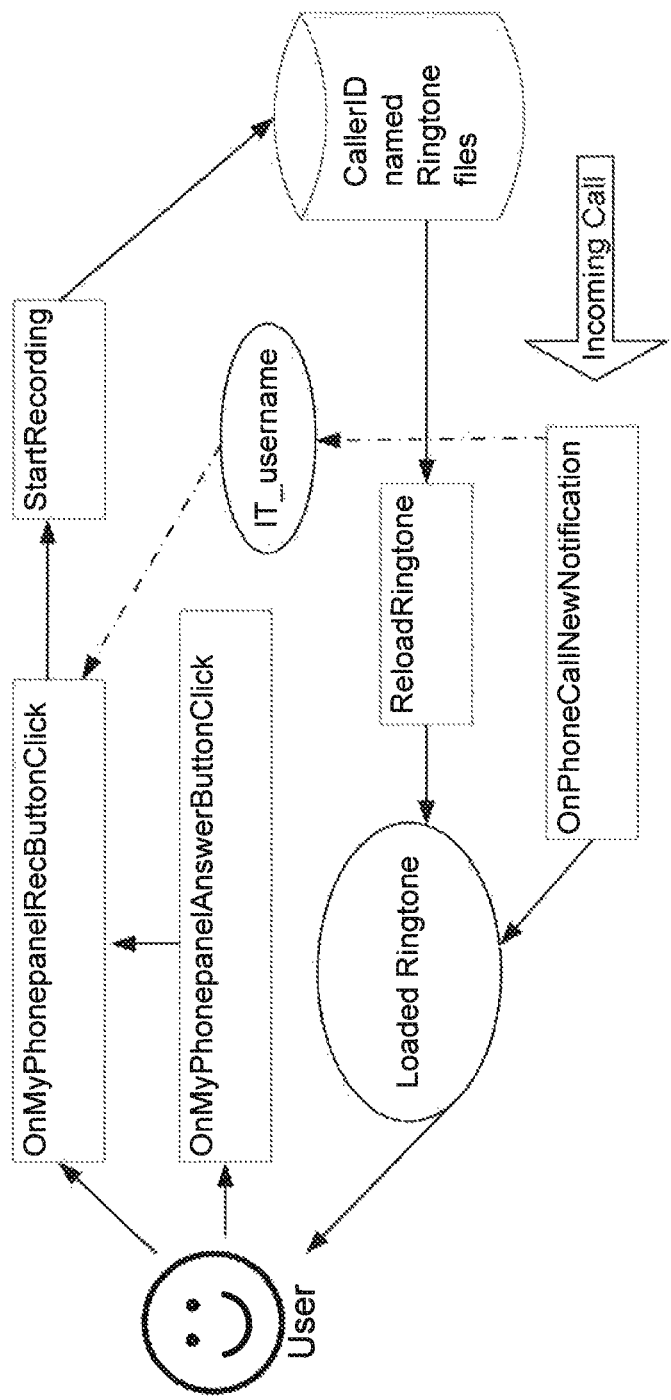
FIG. 10 is a block diagram showing the modified architecture of wxCommunicator in accordance with an embodiment of the present invention.

In this embodiment, illustrating this concept, the reminder sound may have been previously extracted from a phone conversation and stored in memory as previously disclosed (see FIG. 10). Multiple such reminders may also be stored in this fashion, and that a user could indicate which was to be used, or an automated system could, by additional means of voice recognition during a phone conversation or other voice interaction, determine the intention to create both the event and its text and/or audible label.

To trigger the event audible reminder, the Rainlendar code for CMessageWindow's GetTextFromEvent code, shown below, must be modified to extract from its CEntryEvent parameter its new 'event' variable by using the aforementioned GetAudibleReminderFromEvent just as it presently uses GetBriefMessage. A new parameter added to it, like the 'text' one it presently uses to return the result, can return the rr_username audible reminder generator. That reminder is then invoked by the caller, which may be supplemented with a text reminder on screen, using the same facilities as for a reminder ring. User settings may have the audible reminder generated be augmented by synthetic speech of the basic text as prolog, or not, as the user chooses. The existing code for CMessageWindow is show below:

```
void CMessageWindow::GetTextFromEvent(CEntryEvent*
event, CFileTime alarmTime, std::string& text)
{
    CFileTime today;
    today.SctToLocalTime( );
    event->GetBriefMessage(text, 0, true, true, &alarm-
        Time);
    if (alarmTime.IsValid( ) && !event->IsAllDayEvent( ))
    {
        int diff=alarmTime.GetAsSeconds( )-today.GetAsSec-
            onds( );
        diff/=60;
        char buffer[MAX_LINE_LENGTH];
        if (diff>=0)
        {
            sprintf(buffer, CCalendarWindow::c_Language.Get-
                String("General", 21), diff); // Due in . . .
        }
        else
        {
            sprintf(buffer, CCalendarWindow::c_Language.Get-
                String("General", 25), -diff); // . . . overdue
        }
        text+=buffer;
    }
}
```

An implementation of it with the modifications described above is shown below, with the modifications:

```
void CMessageWindow:: GetAudibleReminderFromEvent
(CEntryEvent* event, CFileTime alarmTime, std::string&
text, wxString& username_parameter_for_rr)
{
    CFileTime today;
    today.SetToLocalTime( );
    event->GetBriefMessage(text, 0, true, true, &alarm-
Time);
    event->GetBriefMessage(text, 0, true, true, &username_
parameter_for_rr);
    if (alarmTime.IsValid( ) && !event->IsAllDayEvent( ))
    {
        int diff=alarmTime.GetAsSeconds( )-today.GetAsSec-
            onds( );
        diff/=60;
        char buffer[MAX_LINE_LENGTH];
        if (diff>=0)
        {
            sprintf(buffer,  CCalendarWindow::c_Language.Get-
                String("General", 21), diff); //Due in . . .
        }
```

```
    else
    {
      sprintf(buffer,    CCalendarWindow::c_Language.Get-
          String("General", 25), -diff); // . . . overdue
    }
    text+=buffer;
    }
}
```

Figure 11:
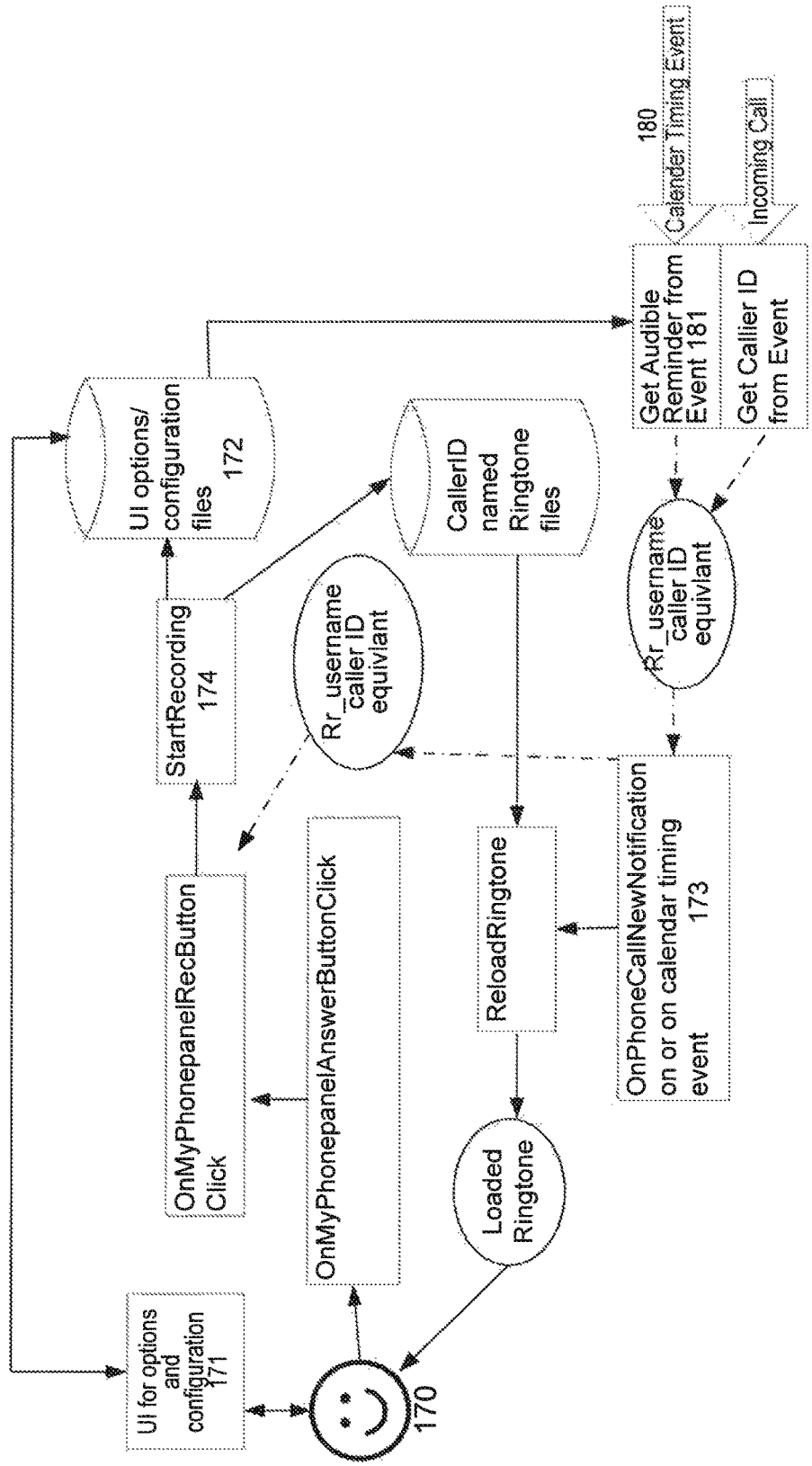
FIG. 11 is a block diagram showing the modified architecture of the wxCommunicator implementing Rainlendar in accordance with an embodiment of the present invention.
Figure 12:
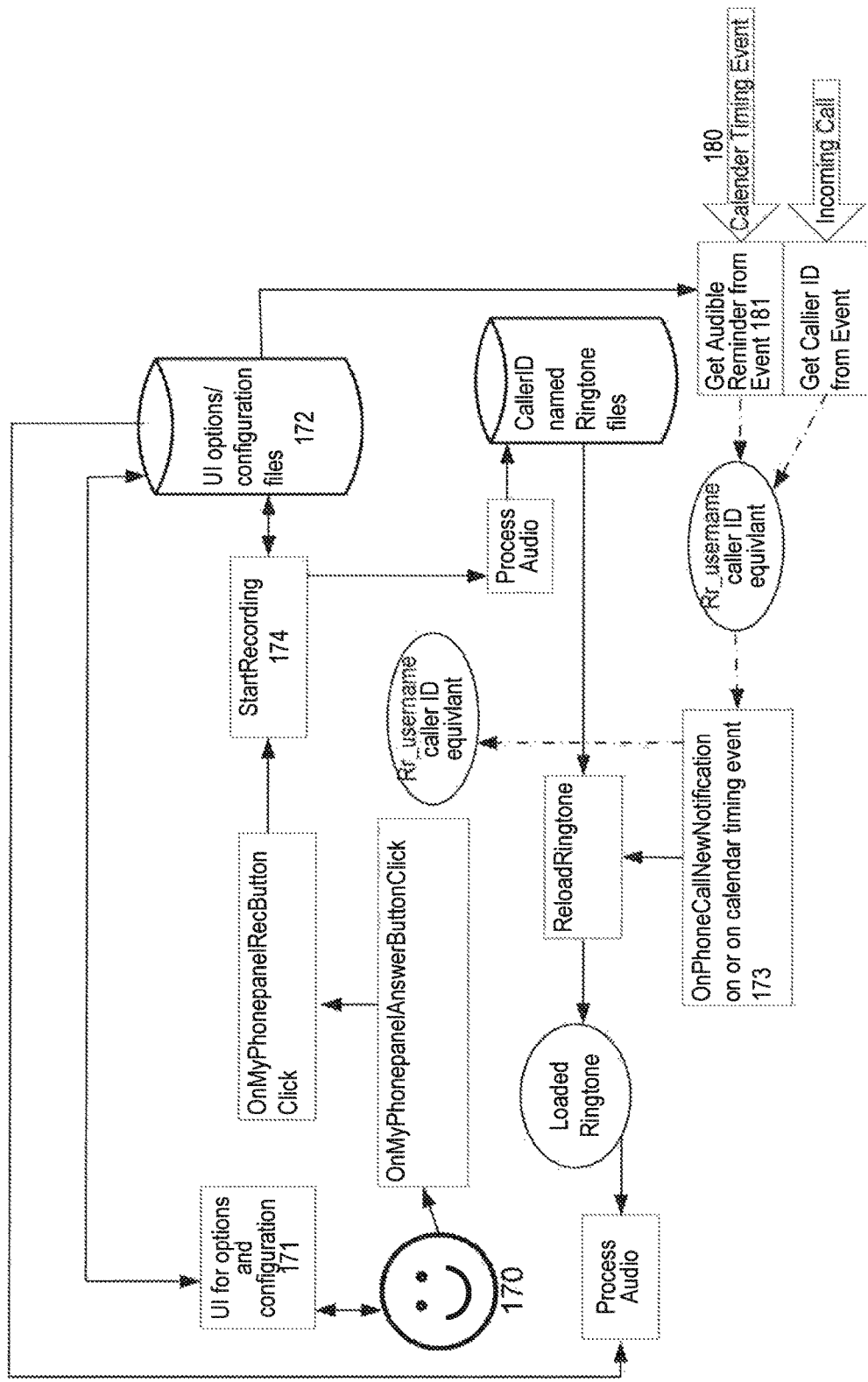
FIG. 12 is a block diagram showing the modified architecture of the wxCommunicator implementing Rainlendar in accordance with an embodiment of the present invention.

As shown in FIG. 11, the above described code modifications enable one to make a calendaring application with a reminder ring, conveyed in one or more ways, such as in an audible signal related to the event. The basic combination of the phone and calendar systems described above is shown in FIGS. 11 and 12. FIG. 12 is similar to FIG. 11, with the addition of the calendaring reminders as reactions to timing events, and a user interface ("UI") 171 for the user 170 to indicate what events are to be used for which calendar reminder.

The relationship between the calendar timing events 180 and the UI 171 is at its simplest a manual indication of a chosen ringtone for each calendar reminder. As shown in FIG. 12, the UI code 171 presents options for the storage of information in the UI Options/Configurations files 172 as shown. That store also is loaded by the recording code which is resident in the module labeled 174 so that it contains the information related to what recordings are available as reminder rings and how they originated. This information is then available to the Calendar Timing Event 180 handling functionality, including the function GetAudibleReminderFromEvent 181.

Continuing with FIG. 12, more sophisticated user options are accommodated. The reminder ring for annunciating a calendar event may be taken from the last telephone conversation with an intended attendee at a meeting, from user selection during or immediately after a conversation with anyone, attendee or not, from a voice message left by the requestor of the meeting who indicated his request by voice or tones in response to mechanical prompts, by a computer program dealing with email or other textual or programmatic arrangements to request and confirm appointments, or by means of voice recognition of a request for or confirmation of a meeting, among others.

There are many other methods previously known in the art that can equivalently be complemented by these techniques. For example, rather than with a relatively simple personal calendaring system like Rainlendar, the ReminderRing system can be utilized equivalently within the context of a more elaborate systems, ranging up to those integrated with full enterprise-level project management systems. In such cases ReminderRing annunciations can be linked to ongoing events beyond time and appointment rescheduling triggers, to encompass dynamically varying task assignments; and can be acquired at events related to the task assignment or its subsequent modification. For instance, a worker could hear her supervisor's voice from the last staff meeting, conducted by internet-based conferencing under the auspices of the project management system, reminding her that a task assigned then was coming due, or that a resource needed for it had now become available, either using the ReminderRing in the context of a ring, as a separate event or any other manner that would provide utility. Conversely, the project management system could let the boss know that a task was tracking on or had gone off schedule, using the voice of a employee whose work was related to that task, perhaps acquired during a prior conversation concerning it or during an updating of the task status system by him, and with possibly other sounds and natural or synthetic speech, in annunciation. Thus, in such an enterprise-level system, or its equivalent in a diffused cooperative endeavor such as a volunteer political campaign or an open source development project, the ReminderRing assignments could be made indirectly, on the basis of conversations, meetings and telecommunication other than those with the user.

Methods known in the art to provide the project management functionality for the application of the present invention in that expanded but equivalent context include a variety of open-source packages such as eGroupware, the source code of which is known in the art and hereby incorporated by reference.

Additional discussion of these modes of operation follows. Continuing to examine FIG. 12, where the selection of what is used as the reminder ring is manipulated by the UI code 171, shown above User 170. The selected ReminderRing input and the configuration options are stored in the UI Options/Configurations files 172, as shown.

That store also is loaded by the recording code present in StartRecording 174, so that it contains the information regarding what recordings are available as reminder rings and how they originated. User 170's selected options can activate the modified StartRecording 174 code. To reflect multiple channels of activation, FIG. 12's communication path between StartRecording 174 and UI options/configuration files 172 is now two-way.

Further, FIG. 12 explicitly indicates other processing of the audio files, as has been mentioned above and previously referred to in a number of sections of this document. For example, a playback of a reminder ring could be compressed, either as 'chipmunk-speak', or with frequency adjustments, to make its words play faster. Or in an appointment calendaring function, particularly one with a snooze alarm, a synthetic or prerecorded voice could be appended to the reminder ring to communicate the time remaining.

The provision of such audio processing and reprocessing, and others as appropriate to the utilization of ReminderRing technology, can be performed by many means known in the art. For example, the Praat and/or Sphinx open source audio processing packages in whole or in part may be merged with source code of ReminderRing as desired, or instantiated inside a console-style shell, such as with anonymous pipes on platforms like a Microsoft Windows computer. The source files for both Praat and Sphinx are known in the art and hereby incorporated by reference.

This invention further provides a personal private caller ID system to unify multiple modes and channels of telecommunication by the user, helping the user keep the modes and channels and their priorities in order as the users are interrupted by time while simultaneously aiding in resolving these multiple modes and channels of communication for the implementation of reminder rings. The multiple modes and channels of communication may include phones, email, instant messaging services ("IM"), social networking applications, social network participations such as game moves or dating requests, voicemail and sound, graphics and video, among many others. As more and more modes of communication are placed on or utilized by the Internet, they may be directly and/or modularly added to the overall ReminderRing system and method. As those transmissions are increasingly facilitated over the Internet, much of their unification for users can proceed via identification of the IP address of the other party or parties, often in the role of 'caller'. That IP address, and standard caller ID, together with the name or names associated with the caller, their handle(s) on IM, email address(es), among others, is managed in the Private Mapping Database 183 which maintains a party's identity. This mapping, and the overall ReminderRing system, allows the user access to pertinent voice and image recordings which will jog their memory or otherwise relationally stimulate them, for instance as reminder rings or forms of mnemonic assistance. These could occur in a wide range of other contexts such as in alarms, appliances, search engines and so-called 'lifestreaming' platforms devoted to reconstituting and presenting in one place disaggregated online personas which are otherwise distributed across various sites, blogs and private records.

This private system of counterparty identity representation, as embodied in the Private ID Mapping Database files 183, may overlap or integrate with more public data storage in which information disclosed by participants or discovered by research can be accessed by the individual user, such as with public mapping databases 176. This will let an individual be able to function much as companies today engaged in telemarketing customer relationship management systems do, by utilizing both their own and purchased databases, both for other humans or systems and, turning the table on the companies, representing and managing one's contacts and relationships with companies.

For example, a user negotiating a home loan might obtain through purchase, public database or company disclosure, an annotated "reverse phone lookup list" that would enable the user to specify to the ReminderRing system that any calls from any originating numbers at a particular mortgage company would be identified, accepted and annunciated using a ReminderRing from the last call from any of them or the cell phone number of the agent the user had been primarily dealing with. This helps remind the user of what task he is dealing with before, and choose whether, he picks up the phone. It is like being prompted to help maintain or return to a "train of thought", or in this case, a "train of communication".

Such a reverse lookup on any mode, whether phone call, IP address or other, can also serve to enable more intelligent filtering of incoming calls, routing them to voicemail systems or other destinations. ReminderRings can be used in this context to announce that the call has been filtered or, while audibly or otherwise reviewing a set of voicemails or uncompleted attempts to reach the user, as a prompt to the user for further instructions on the disposition.

Conversely, the user might wish to manage her outgoing call contact target companies with such a Mapping Database 183. Beyond the basic reasons cited above, another example would be to expedite reaching a human being behind the phone tree at a large company. Business services such as Bringo/NoPhoneTrees.com and GetHuman.com already exist to provide general data to do this on the web. A Wall Street Journal article on May 6, 2007, entitled "Get a Human On the Line" told how "Bringo's site then navigates the company's phone tree, calling you back when it connects to a person or when the call is placed in queue for an employee." As an example of this, for self operation, NoPhoneTrees.com tells its user that to reach a human being at United Airlines she must dial the 800 number but then press nearly a dozen touchtone codes in the proper order and with particular pauses between them. With ReminderRing's Mapping Database 183, this sort of facility for the user can be internalized to a cell phone or other communication device, based on both publically acquired and/or individually known data, then annunciated when connected using a ReminderRing from the last communication stream with that company.

This unification and management function will improve productivity and alleviate frustration.

Figure 13:
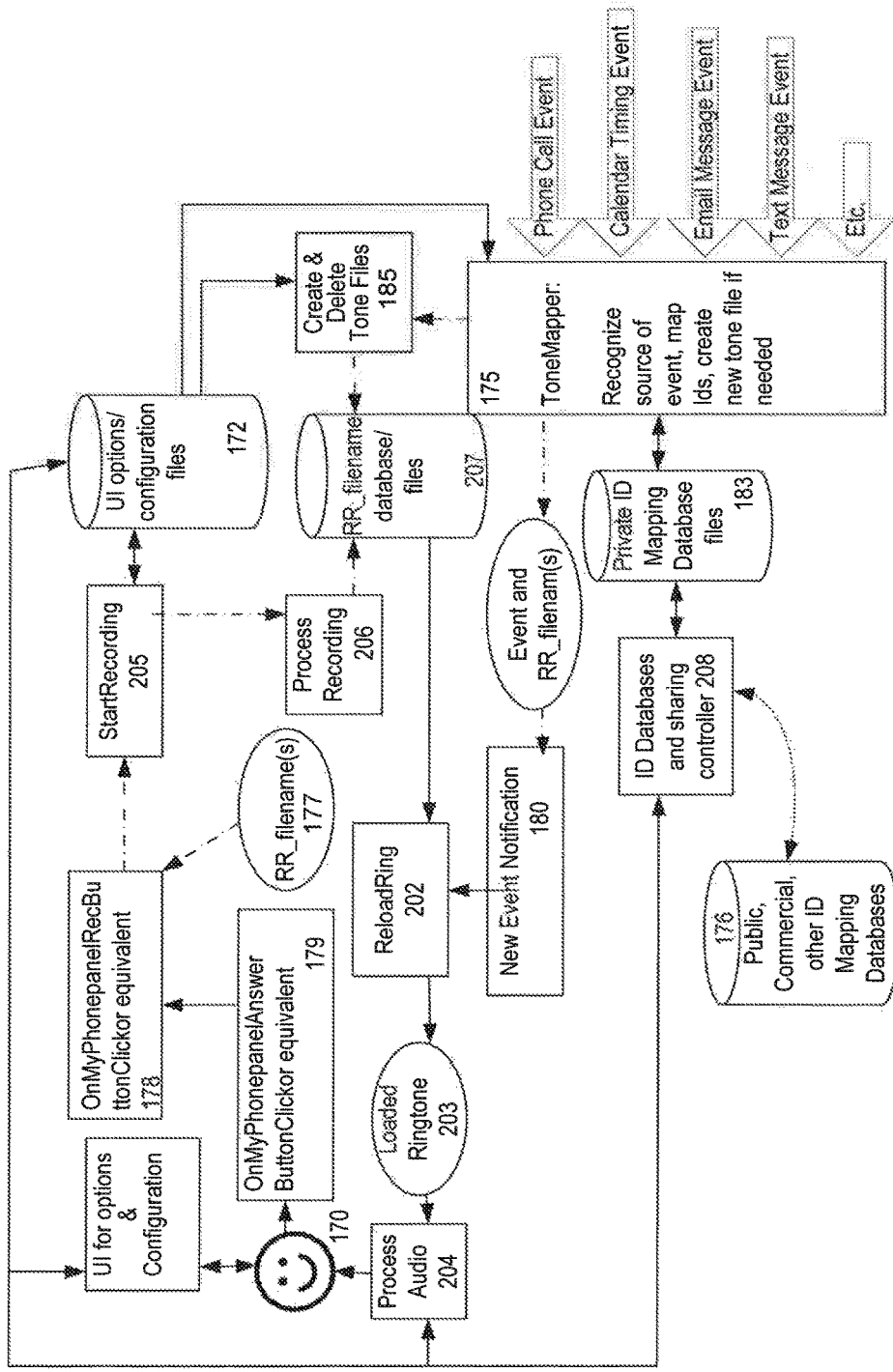
FIG. 13 is a block diagram showing the modified architecture of the wxCommunicator implementing Rainlendar and further configured to accommodate additional modes of communication.

FIG. 13 shows another overall diagram of an embodiment of the current invention. A calendar timing event 180 is added to the phone call reminder ring, which both are further supplemented by many other communications possibilities, only some of which are shown. The potential incoming events are handled by a "ToneMapper" 175, rather than each communication method individually. ToneMapper 175 is connected to a Private ID Mapping Database 183 which maps the callerID equivalents associated with incoming communication events to an rr_username equivalent identification dubbed RR_filename 177 which is part of one or more RR_key_ID 184 designators. The RR_key_ID 184 attempts to identify an individual person regardless of the method of communication they use, or did use, to keep in sync the reminder rings with all communication modes in accordance with the UI options and configuration files 172. ReminderRing tone or other files may be generated as the result of directives from the ToneMapper 175, instead of or in addition to recordings from prior conversations; for example, the reminder ring may be generated by means of speech synthesis (i.e., text to speech) from text sent in other modes, such as email, voice samples or parametric derivations thereof stored in the UI options/configurations files 172 to make them in some semblance of that person's voice. Means for text to speech are well known in the art. For example, for this implementation, an open source program such as Festival may be implemented to perform text to speech functions. Festival contains support for many integrated functions including adjustable voices, which could serve as the basis of generating a voice like that of the particular person whom an audio reminder ring represented, even to the eventual point of using prior conversation sounds from him to create a text to speech voice resembling his. Source code sufficient for one skilled in the art to be able to utilize Festival in this fashion for the text to speech component of this functionality is known in the art and incorporated herein by reference.

Additionally, the user 170's ID Mapping Database 183 may be partially or fully loaded from, or shared out to, other ID Mapping Databases 176, whether public, private or commercially available, that is, being created and provided for all the basic mechanisms of commerce such as advertising, sales and other distribution mechanisms as may suit various products and services associated with businesses or individual endeavors in a context relating to that commerce. This invention is amenable to supporting a "business ecosystem" of sources of such information, commercial vendors, nonprofit groups, social networking services, and other organizations, which gather and disseminate such data to augment the private database a user himself will accumulate. For example, a business might furnish an ID Mapping Database to its employees, just as many now hand out a printed list of personnel and their various contact info. These outside (that is, external) ID Mapping Databases 176 are shown at the bottom of FIG. 13, with a dotted line designating that they may be accessed via many means, such as Internet, static media like cartridges or flash drives or CD-ROMs, or pre-loaded in a handheld phone for release upon payment. These may only cover one, or a few, possible communications modes; some can be seen as similar to the mailing lists that business now buy to reach out in junk mail, email, and telemarketing (solicitation and advertising of products and services over the phone) except that they are being utilized by the user 170 instead, to restrict or better manage the communications coming at and from her (the user 170 using the ID Mapping Databases 176).

To enable the user 170 to control what, if any, outside ID Mapping Databases 176 he may wish to utilize, and deal with the parameters of how to do that, the User Interface options and Configuration 171 data is shown storing and providing access to such parameters.

Adjunct to accommodating multiple reminder rings for each caller or other communicating person, in FIG. 13, for clarity of teaching this invention the "rr_username", parameter is now relabeled "RR_filename" 177, though its function and use remain similar to the more limited embodiments previously discussed: to designate the data needed to produce the reminder ring for it. In general, this would be a sound file, although it could take other forms, for instance with or as a visual indicator such as text or video, the possibility and means of which have been previously discussed in this disclosure.

The OnMyPhonepanelRecButtonClicked 178 and OnMyPhonepanelAnswerButtonClick 179 functions are not limited to phone conversations. Likewise, the New Event Notification 180 handles all types of communication events. All the communication means indicated so far, and many more, are handled through functionality equivalent to that disclosed for phone and calendar, and often shared with it in a number of the modules shown. Non-audible indications may be incorporated, as they often are already in systems featuring blinking icons for calls waiting, or flashing menu bars for email arrivals; nothing in this invention precludes its integration with such established means, or others that may arise, even so far as direct neural interfaces.

It will also be apparent to one skilled in the art that simple extensions into further areas will furnish additional beneficial features by being incorporated within a ReminderRing overall context, such as private callers, or semi- or fully automated choice of which mechanism to communicate with a person using, or security features to protect against spoofing.

Looking now at FIG. 14A and FIG. 14B which form, an example individual database record structure for the Private ID Mapping Database 183 is shown. The utilized database can be any database, such as the relational database MySQL, or in custom code written for data storage purposes and/or for a specialized platform or enhanced performance.

RR_key_ID 184, which has been discussed earlier is, in essence, the primary internal identifier for a 'person', which in some implementations, as mentioned, could also be a set of people or some other constructed abstraction. A RR_key_ID 184 is assigned to each new person through the user interface 171 and/or, optionally, automatically through ToneMapper 175. For example, some default settings may require the user 170 to designate each person individually and request reminder rings for each; the opposite default would be to utilize a reminder ring automatically for all calls; many possibilities clearly lie between these two extremes. Review and potential deletion of RR_key_IDs 184 can be accomplished through the UI and ID Databases and sharing controller 208.

Next, the Private ID Mapping Database 183 includes standard name and address fields, to accommodate a full appointment system if one is embedded with this embodiment, such as Rainlendar, or any other personal information management and display system that is supplemented with the ReminderRing system. Other fields commonly found in such calendar and contact management systems can be accommodated in this fashion as well. FIG. 14A and FIG. 14B combined give examples of alternate snail mail addresses, notes, and business card images, among other items. Additional data about a person or company, such as that often kept by sales organizations, which could facilitate automated or rules-driven ReminderRing options, may be added to this "other" category.

Further, the RR_filenames 177 that govern reminder rings are shown next, at a "person" or RR_key_ID level 184. A simpler implementation could rely solely on a single RR_key_ID 184.

Figure 15:
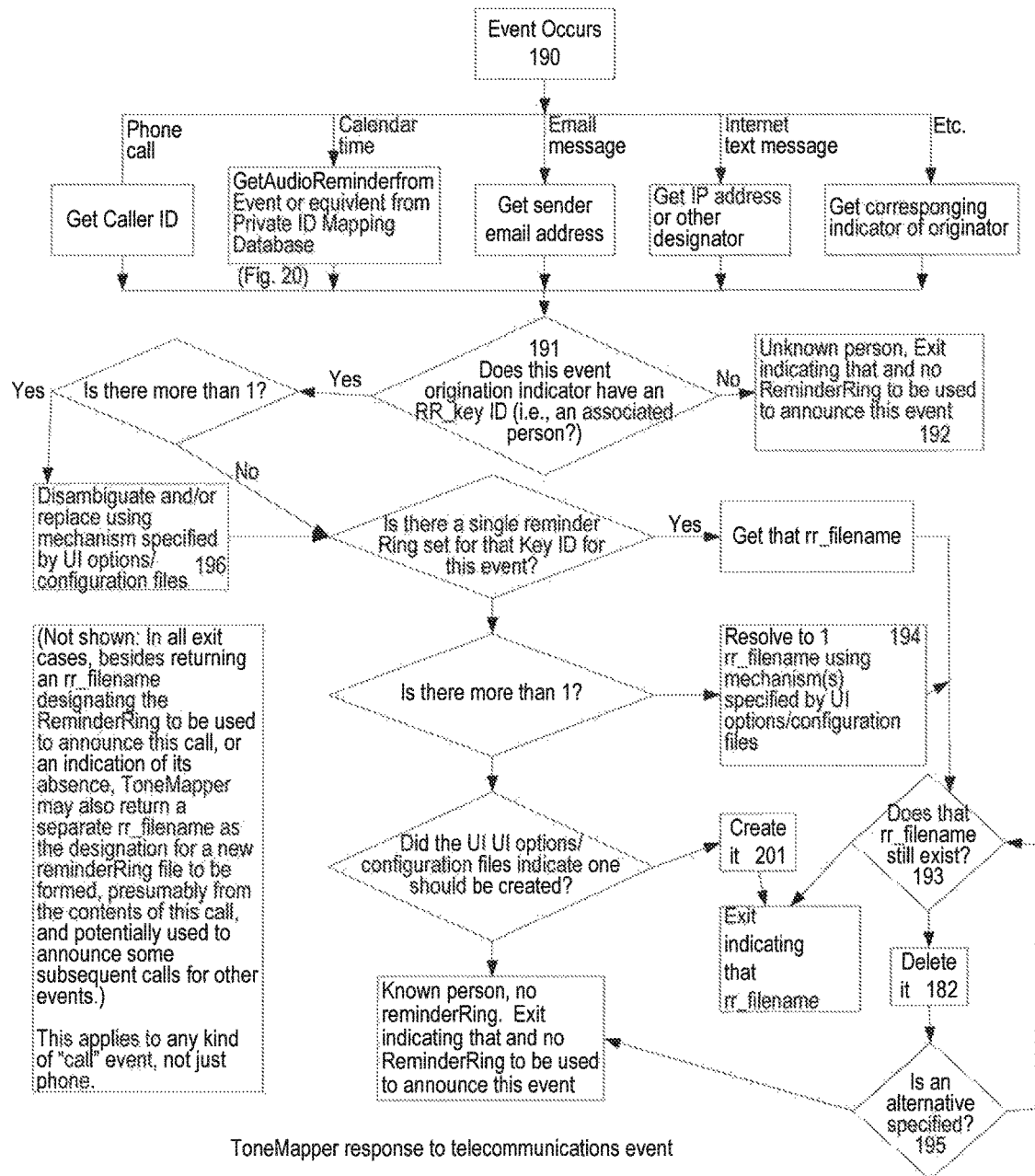
FIG. 15 is a flow diagram illustrating the function of the tone mapping component utilized by embodiments of the current invention.

For each new phone call or equivalent, where an RR_filename 177 already exists, ToneMapper 175 will relay that RR_filename 177 and rename it something else which is used as the reminder ring for that call; but ToneMapper 175 will also create an additional RR_filename 177 which will generally be used to record a part of the current call and then become the reminder ring for a subsequent call or other events. Both the new RR_filename 177 and the old RR_filename 177 are kept in the data field. If the current call was incomplete, or too short, or otherwise failed one of the criteria for creating the new RR_filename 177, then that new RR_filename, along with its related files and data, will be deleted 182 by ToneMapper 175 at the next call event. At that time, as shown in FIG. 15, ToneMapper 175 seeks an alternative 195, which is generally the old RR_filename 177 for the reminder ring.

All RR_filename 177 fields generally include a date and time, in order to facilitate advanced rules-based options, for instance randomizing or cycling through or choosing an alternate reminder ring based on the time of day or other information. Other rules may depend upon sensory data, such as amount of ambient light, or geographic location, possibly obtained via geospatial sensors or mapping. The rules are generally set to specified defaults which may be altered by the user 170, using the UI 171.

Private ID Mapping Database 183 further contains data for various types of communications and other possible ReminderRing trigger events: the first such label and its set of fields, labeled Phone, consist of phone numbers and caller ids that are identified with this person record. Note that one person can have many phones, and one phone can be shared by many people; this is the case with all the communications origination indicators stored in this database. Alongside each phone number can be a whole additional set of RR_filenames 177, as multiple alternates for all cases with that number. The next section is Calendar which includes date-times instead of telecommunications origination indicators. Additional information may be present, including, for example, data to support a full personal information management system.

After the Calendar section in Private ID Mapping Database 183 is field "Email". Besides the RR_filenames 177 as above, this set of "Email" fields introduces two additional concepts. One is flags and other data that indicates and informs possible construction of RR_filenames 177. The flags are shown for this first text-based email communications because text-to-speech conversion may be applicable; however, construction from sound may also be configured. Generally, this construction, be it text-to-speech or from sound, proceeds as usual to make a reminder ring of the previous 'call'. For example, the subject line of an email may be specified to be speech-synthesized to make a reminder ring for the arrival of the next email, or for all subsequent rings from that person. Construction could result in a reminder ring that repeats some part of the person's message as a reminder ring, for example, the subject line twice to convey urgency.

Further, flags may indicate pre-annunciation, described in more detail later in this disclosure, in which case a ring is 'pushed' through to a phone, and ring with a short speech sound or other indicator sent from the caller.

The second concept introduced in the "Email" section is for additional data fields to guard against spoofing (the sending of messages with false addresses of origin). While spoofing can be a problem for any type of transmission, and fields can be included for it in any communications mode, it is particularly prevalent and easy to spoof email.

The next category for Private ID Mapping Database 183 is "Text", as shown in FIG. 14A and FIG. 14B. Text is an example for text-based systems such as instant messaging, short message service texting and chat, in simple text or audio or through social networking groups or even virtual worlds, such as but not limited to Sony's Playstation "Home" or "Blizzard's World of Warcraft". Here items such as alias and avatar names, in combination with IP addresses and more elaborate forms of validation based on biometric factors such as voiceprints, can be combined. The simplest would use IP addresses, which is the specific example shown further in this disclosure. Not only other modes of communication, but combinations thereof can be covered; for example, using speech recognition to parse telephone discussions of appointments, then adding sounds from them directly to the calendaring function as reminders.

Additional field sets are given as examples, which may lie inside or outside an RR_key_ID 184 record. Disambiguation guidance is such an example. Disambiguation guidance—data, defaults and options selected by the user to resolve cases of multiple persons at a single origination address, for instance, sharing a phone. For example, see the examples that follow.

Another additional Private ID Mapping Database 183 section may include "Sharing." The present invention establishes a platform which will support a "business ecosystem" as James Moore defined it in Harvard Business Review in 1993, that is, a system of interacting entities engaging with one another and the user as an economic community supported by a foundation of interacting organizations and individuals—the organisms of the business world. This economic community produces goods and services of value to customers, who are themselves members of the ecosystem. The member organizations can include suppliers, sales lead producers, advertisers, distributors' competitors, and other stakeholders. This business ecosystem may include add-ons including many types of shared reminder rings and their underlying data for lists of origination addresses, and for the user to allow limited or unlimited sharing of his own data with friends, family, social networking groups, and commercial and nonprofit entities. For example, businesses may have ReminderRing databases that include employees' various phone numbers and email addresses, similar to, for example, those some employers hand out to new employees now. Other datasets may be sold on CD-Rom or cartridges or for download, or any other data transmission system. Some may have security mechanisms. The means for this sharing to occur will require support within this database, in these fields. Other possibilities of sharing include importing existing contacts databases.

Another additional Private ID Mapping Database 183 section may be "Hurdles" or other necessary requirements. Users may set thresholds and methods to govern various methods used by the present invention. For example, they might specify a minimum volume, or length of call, needed to produce from it a subsequent reminder ring.

Though throughout this description RR_key_ID 184 is indicated to correspond to a 'person', that designation is for ease of teaching; clearly the actual 'person' could be assigned to be more than one (a couple, or family, or classroom, or other group) or a corporation, or government agency, or a nonhuman entity such as an automated bank or brokerage or alarm system, or even a working or companion animal given limited telecommunication means for its owner's convenience in caretaking, for example.

Furthermore, this relatively flat data storage paradigm could be augmented by means known in the art to furnish contact filtering, priorities, stranger contact management, nested person records (for instance, a company with several people in it), or relationships, among others, as part of a more elaborate instantiation of this invention, or in combination with separate means that would be interfaced with.

Shown in FIG. 15 is ToneMapper 175. ToneMapper 175 in the current embodiment, works with phone calls, calendar appointments times, text messages, email, and many other communications media. On the arrival of one of the communications media e.g., when the new event occurs 190, the identification for instance, the caller ID for a phone call, or the IP address for an internet-based transmission such as a peer-to-peer message or other IM-style communication, or an alias or other identifier used in a chat program, or the account used for text or other messages in a subscription social networking service, such as Facebook or Twitter, or a URL from a blog, news or RSS feed, is ascertained if possible. Then the Private ID Mapping Database 183 and possibly its public and other adjuncts in other storage 176, including possibly the web, are queried 191 to determine if this indicator of the originator of this telecomm message is known, that is, if there is an RR_key_ID 184 for it. If there is not a RR_key_ID 184 for the communication, including if there was no conveyed indicator, for example a phone call with no caller ID, ToneMapper 175 passes on no RR_filename 177, it is a unknown person 192; with no associated person, no special annunciation is indicated, however, the user 170 may add the unknown person to their Private ID Mapping Database 183.

If a RR_key_ID 184 is determined, that RR_key_ID 184 should be mapped to the appropriate RR_filename 177. If there is more than one RR_key_ID 184, for instance for a caller ID or IP address believed to be shared by more than one person, disambiguation 196 of the multiple RR_filenames 177 proceeds by whatever process was made available to and selected by the user; if there are many possibilities for the disambiguation 196 process, the UI options/configuration files 172 will be the primary data source for that process, though some reference to the Private ID Mapping Database 183 may also be involved, and through it even some reference to Public, commercial or other ID Mapping Databases 176 may be obtained.

For illustration so far take for example, a young woman user 170 may have designated that any calls coming from a particular home phone number be annunciated using a snippet of conversation from the last communication with her teenage boyfriend who lives at that home, even if their last conversation had been via an internet-based voice chat utility. A user 170 may have access to rules that specified replacement of a RR_key_ID 184, instead of disambiguation, perhaps temporarily; for instance, to keep the peace during every weekday lunch hour which the young woman often shares with a friendly rival for that boyfriend's attentions, our user might choose settings so that, during that time of day only, her boyfriend's voice snippet from their last conversation would be overridden by his sister's on contacts from all media.

Options also exist where multiple reminder rings may designated for a single RR_key_ID 184, i.e., more than one for a person, although person can mean non-human too, as noted elsewhere. Indeed, there could be separate ReminderRings for each medium, designated by different rules in the UI 171, so that our young friend can hear a snippet from her boyfriend's voice in her last conversation when he calls on the phone, but a different one when he texts her. In this eventuality, each time it is invoked, ToneMapper 175 will proceed to examine and then resolve one RR_filename 177 from among the possibilities 194, again referencing their description as stored in the UI options/configuration files 172 and optionally supported by other data in the Private ID Mapping Database files 183, arriving at a single RR_filename 177.

This RR_filename 177, whether resolved from out of many or a single RR_filename 177, is then checked to make sure it still exists 193, and has not been deleted or failed to be constructed. If it exists, it is passed on from ToneMapper 178 as shown in the lower box labeled "Exit indicating that RR_filename".

Another course of execution may occur in which there is an RR_key_ID 184 but no RR_filename 177. If so specified, a RR_filename 177 is created 201 and ToneMapper 175 exits indicated the newly created RR_filename 177. This could represent situations such as where a prior text message is to be speech synthesized, such as where no voice recordings exist, but where a flexible speech synthesizer can create a useful personalization. A reason to create the reminder ring instantaneously instead of at a previous time would be memory constraints on the storage of speech compared to text.

Another possibility worth noting in this context is the case in which a user wants to have an incoming caller be able to speak and/or transmit from pre-recorded voicings a sound to be used as the ring. This push-ring, or pre-annunciation mode, is particularly valuable when enabled among a platform of phones installed using the present invention. For this, the actual connection of the phone, in most platform architectures can occur in a preliminary module, where a recording would prompt for a short sound bit, for example a two second segment, then 'answering' would result in letting the connection proceed to the user. This protocol is examined in more detail in FIG. 17.

Users with many calls could benefit from prioritizing through this means, and this method could also furnish benefit in the case of annunciations where significant information can be delivered in a short 'ring', the equivalent of subject-line only emails, such as for notices of schedule changes for appointments and project management type 'reminder' annunciations.

Incorporated into systems where tracking and chivvying of task accomplishments is essential, such as medical compliance and dynamic interdependent roll-outs, this facility may also be integrated with security measures, in particular, those established to control which ReminderRing will used in announcing which 'calls'. These modes of operation and their applications are further discussed later in this document.

Continuing meanwhile to examine the ToneMapper 175 functionality, whether in these or other cases ToneMapper 175 calls upon functionality which exists outside ToneMapper 175 itself. In particular, such functionality is shown in FIG. 13 as "Create a Tone File" 185. Using the data and new RR_filename 177 sent it by ToneMapper 175 and the UI options 171 chosen by the user 170, "Create a Tone File" 185 creates the reminder ring sound needed in such cases and stores it in the RR_filename database 207.

Note that ToneMapper 175 originates all RR_filename 177 identifiers. In a simple phone-only embodiment, RR_key_ID 184 could be simply assigned as a derivative of the caller ID, as was disclosed at length previously in descriptions of more basic embodiments. But in a more elaborate embodiment with demands such as the potential for multiple persons sharing a single caller ID, and having other means of communication beyond audio-only phones, and having the capacity for maintaining a reminder ring used from a prior call despite the occurrence of a new call or calls in the meantime (that is, not overwriting the prior reminder ring, for example in the case of a very short connection, or in the case of an often-called situation where the user does not want the ReminderRing to change constantly, but does want it to change occasionally, say, monthly, or upon some call-length or content threshold), it is better to build out a more flexible system architecture. As shown in FIG. 13, this is accomplished by mainly limiting a 'circuit' of RR_filename 177 assignment and handling to a small core of the functional components of the system, with ToneMapper 175 playing a central role.

When a call or an equivalent communications event occurs, ToneMapper 175 assigns an RR_filename 177, verifying it is not duplicating any other RR_filename 177. ToneMapper 175 then enters that RR_filename 177 into the Private ID Mapping Database 183, optionally creates the reminder ring sound (see FIG. 15), and then sends the RR_filename 177 to New Event Notification 180. In each such occurrence ToneMapper 175 is sending up to two RR_filenames 177 to New Event Notification 180 wherein one is used to designate the reminder ring to be used for the current communication even; the other the reminder ring to be formed from the contents of this communication event, and potentially used to announce some subsequent events.

Assuming two RR_filenames 177 are specified on this communication event, as described above, and now tracking both of them in our continuing commentary, the New Event Notification 180 component then loads 203 the sound related to the first RR_filename 177 and the communication device processes that audio 204, playing it. The New Event Notification 180 component also passes the new RR_filename 177 on to OnMyPhonePanelRecButtonClicked 178 or its equivalent, which hands it off to StartRecording 205 and its adjunct process recording component 206 for possible acquisition of another sound to be stored under this new RR_filename 177. Thus, a new RR_filename 177 is assigned and filled with content, ready to be used in another round.

Beyond that primary course of execution, RR_filenames 177 are also passed for informational, cataloging, and housekeeping functions. When one is successfully filled with content the UI options/configuration file 172 is updated to so indicate, so the user 170 can view and manage by hand if desired, or diagnostics can be run, or sharing programs can utilize that information. Also, when Public databases 176 are used to import sounds, the ID databases and sharing controller 208 updates both the UI options/configuration files 172 and the Private ID Database files 183, along the lines shown in FIG. 13. When a new RR_filename 177 is not filled, such as when a call is too short for a threshold set by the user 170, or otherwise fails to satisfy the set hurdles, ToneMapper 175 detects this before exiting and will use the former or other alternate RR_filename 177 previously stored, if there is one. The same operation applies if a previously shared RR_filename 177 from a Public 176, Private 183, or other database has been removed. In all these cases, the RR_filename 177 is then deleted by ToneMapper 175, with appropriate housekeeping including its storage being recycled as appropriate.

Besides the event handling role of ToneMapper 175, it may also respond to changes in the Private ID Mapping Database 183 and Public, Commercial, other ID Mapping Database 176, wherein said Database 183 and Database 176 are connected via ID Databases and sharing controller 208, as shown in FIG. 13. In some platforms and implementations, particularly multi-core or chip-based ones, interrupt-driven synchronous capacity may make this a particularly desirable mode of operation.

ToneMapper 175 may also be accessed by outgoing phone calls or other communications; these, not shown specifically in the accompanying Figs., because they are a simpler case and are treated similar to an incoming call, by internally generating a call event for ToneMapper 175 to process, except that no RR_filename 177 needs to be provided. Alternatively, outgoing calls also can be provided with an RR_filename 177, which is used to make the 'ringing' indicator sound to the user 170 while the target's phone is ringing. This reminds the user 170 while it rings of the last conversation and whom he is calling. Furthermore, if it is known that the target also has a device implementing this invention, the phones can be synchronized through the pre-annunciation system previously mentioned, or by Public and other ID Mapping Databases 176, so that the user 170 can hear the same sound his target person is hearing as a 'ringer'. This can serve to remind them both of a prior conversation. It will be clear to one of skill in the art that this design requires no further inventive insight to be extended to accommodate that.

In general, flexibility exists in this design for performance optimization by several methods, including using an RR_filename 177 with a large enough capacity to store a sound itself, and to eliminate or reduce the urgency of some of the mentioned steps; the disclosure of this preferred embodiment is to facilitate teaching of the general invention, not to be prejudicial with respect to any particular implementation. Likewise, often throughout this disclosure, for the sake of clarity ReminderRings will be referred to as sounds, though there are other possibilities, as has been mentioned previously. Further, a "call" may be stated but may be easily substituted by another communication event, such as a calendar timing event, or an email, among others.

For an example of the function of the current invention, the following example is provided. First, a user 170 can access the user interface module 171 to import his Microsoft Outlook application's contacts and set a simple constant reminder ring. The Microsoft Outlook application's contacts are then stored in the Private Mapping ID Database 183. The user 170 then calls a friend to discuss his new ReminderRing system while selecting the OnMyPhonepanelRecButton-Clicked 178 which activates start recording 205. As previously disclosed, when the user 170 makes the call his friend, two RR_filenames 177 are created. The first RR_filename 177 is checked against the ID Databases and sharing controller 208, which connects databases 183 or 176, for a corresponding RR_key_ID 184 which in turn accesses Tone-Mapper 175. Because (let us assume) the user has just imported his friend's contact information, there is no currently associated RR_filename 177 and, as such, the ring he hears when calling his friend is generic. When the user 170 terminates the conversation with his friend, process recording 206 is called which processes all or a segment of the audio sample of the conversation. This sample is then stored in memory and the associated RR_filename 177 is stored in RR_filename 177 database/files 207.

Continuing with this example, suppose that a few minutes later, he hears the ReminderRing voice of a friend, taken from the last phone call with her, announcing the arrival of an email from her. This occurs because the incoming event of an email message entered ToneMapper 175 which, as shown in FIG. 15, resolved the appropriate reminder ring that was set using the UI 171 which set the appropriate UI options and configuration files 172. Because the user set a general reminder ring, ToneMapper 175 resolved to play the previously stored RR_filename 177 associated with the friend's RR_key_ID 184.

Presenting now another example of the present invention, a handset with display currently used to show caller IDs at annunciation time could be repurposed to also or instead show ReminderRings of prior text messages or emails from the other party, or scrollable excerpts thereof, both at annunciation time and during the call under user or programmatic control.

Presenting now another example of the present invention, a ReminderRing equipped smart phone equipped with a GPS or other location-finding device may be integrated into location-based management of assets and personnel resources for needs ranging from disaster management to interactive entertainment. For instance, a man walking around an urban setting for social entertainment might have his phone occasionally produce a mix of the already-existing reminder rings of all his acquaintances within a mile of him with the volume of each proportional to their distance from him at that moment, and display their locations on a map, or ring him with a single one when he is within a threshold of 1 block of him. Or imagine, a woman managing the public resources for handling a fast-moving disaster with frequent interruptions of her telecommunications conversations with field assets might set a reminder ring to concatenate the rescue team number and last GPS location designation to the reminder ring of the sound of the last conversation, while highlighting it on a map display with text derived from that speech. Or, a multiplayer conflict simulation game played outside with cell phones could allow reminder rings from nearby players only, simulating some fog of war by making it more difficult to manage communications with those further away.

Presenting now another example of this invention integrated into different contexts, presume a user dealing with the fallout from an identity theft, and further that she is using a ReminderRing enhanced phone and a subscription database for it developed by a third party to deal with situations or occurrences of identity theft and provided to her by her insurance company as part of its coverage of this event. As she conducts conversations with dozens of credit card companies and various representatives of each, she sets ReminderRing using a sounds extracted from the initial conversation she had with that agency, so that whoever at that company calls her back, if the originating number was in the database provided her by the insurance company, she will hear it ring with the name of the company and a reminder of the last call; thus, evincing the utility of the Mapping Database 183 and its associated components 208 and 176 in contextualizing that communication for her.

Presenting now another example of the utility of this invention integrated into different contexts, presume a medical treatment or health maintenance system in which a physician's assistant converses with her patients as follow-up to confirm, explain and enhance compliance with a prescribed treatment program or exercise regimen; and that as part of the insurance company or other payer's program provisions the ReminderRing to be used for her calls on the patient's phone is under her control. After a phone call in which she ascertains that the patient has obtained the appropriate medication, she finds a way to clarify the instructions which the patient reacts well on the phone, promising to perform his duty in the program. After the call, the ReminderRing system, having analyzed the conversation for patterns of speech, prosody and wording, presents her with several potential samples. She chooses one in which her voice is heard cheerily cajoling the patient who then replies "OK, I promise", and in which the pause between has been reduced by audio processing. Setting this sound snippet of their combined vocalizations as a ReminderRing that will be used for subsequent calls to, and perhaps from or concerning, him, she sets up follow-ups at intervals corresponding to the patient's treatment scheduled. The very annunciation of the call will then remind the patient of his compliance commitment, and make for a more efficient follow-up monitoring program potentially maintaining the originally established rapport even as it may be conducted by other personnel assets. In addition, when the patient or other personnel call the monitoring physician's assistant, she will have an instant reminder of the prior conversation, in audio and/or text display as she prefers, to use in composing her thoughts, again, a boon to efficiency and efficacy.

In environments ranging from white collar health management organizations to independent living by the mentally impaired, to third-world doctor-in-a-phone settings, these sorts of medical applications will enhance the potential for the mobile phone to remind people to get vaccinations, take medicine, or undergo HIV tests.

Presenting now another example of this invention integrated into different contexts, presume a business meeting of a diverse, globally-dispersed team representing various corporate and contractor resources, conducted virtually with web-based meeting tools, in which various tasks are discussed and assigned by the project manager, who operates a project management software system to retain snippets of those conversations and associate them with particular tasks. Weekly reminders can then be set by her for the individual, using their own voices in the meeting referencing the tasks rather than the more generic ones in the project template. When a particular task is completed early, or lags, the adjustments can be noted by the project management software system, and calls initiated to connect the project manager with individuals to inform them of the changed priorities on their own tasks. Those calls can be annunciated with reminder rings associated with those tasks, modified with text-to-speech notices from the system, giving immediate and attention-getting notice to the parties of the basic context of the change order, and when both the parties are reached and connected, each will have been grounded in their memory of the meeting discussion before proceeding to conversation regarding more detailed examination of that task and its implications. This furnishes greater efficiency by contextualizing the associated communications for the participants.

As was described during the discussion of FIG. 12, in order to initiate such calls, and to furnish enterprise-style communications enhancement in organizational settings such as those described above, the ReminderRing system will operate in a mode where the reminder ring is selected, not by the party subsequently called or his own ReminderRing facilities, but by another person or person(s) who will call him, or a third party, or an automated system. A more explicit overview of such a system is presented in FIG. 16.

Figure 16:
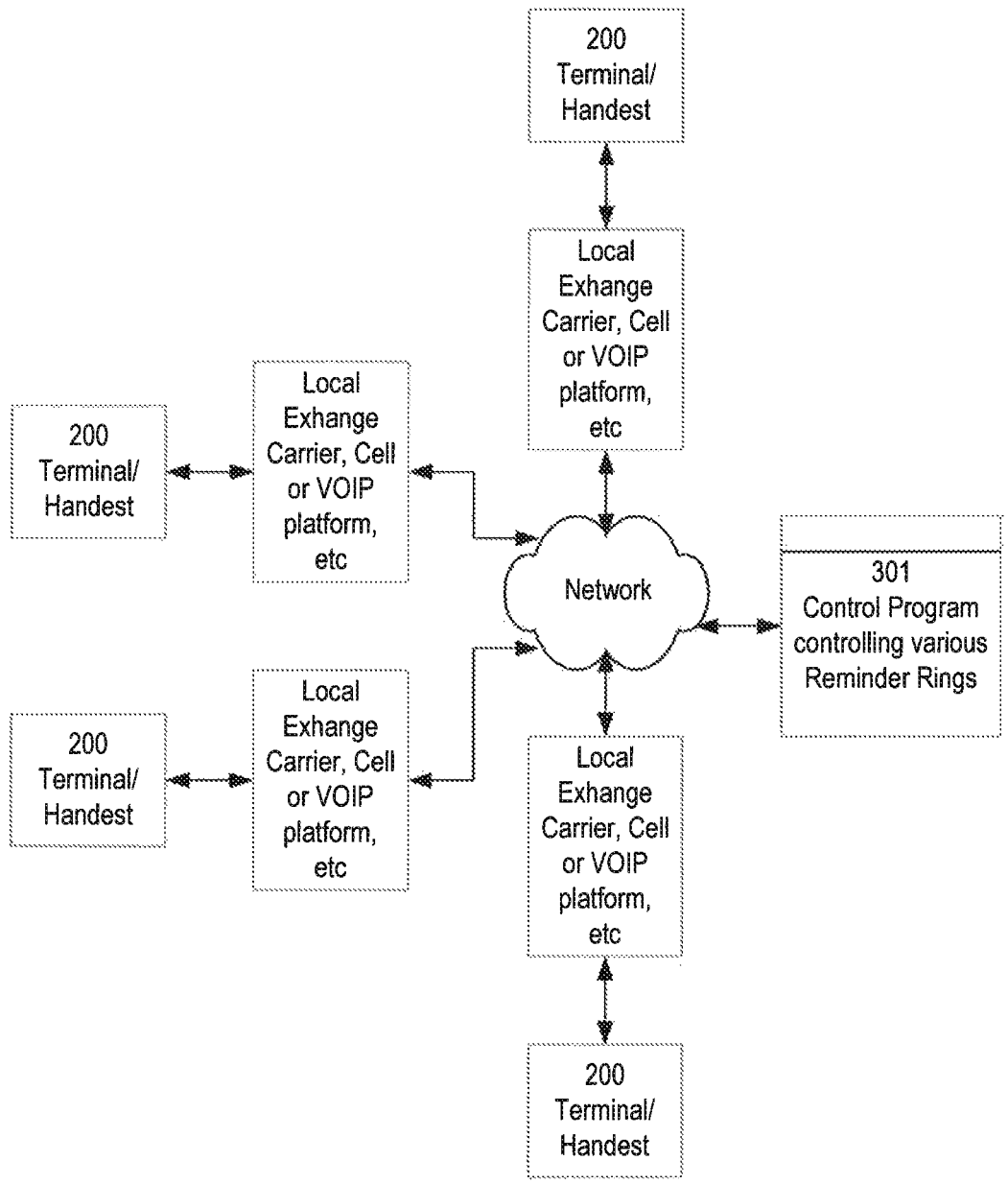
FIG. 16 is a block diagram illustrating an embodiment of the current invention configured for use by a control program device.

FIG. 16 shows multiple ReminderRing equipped telecommunications devices 200, or virtual devices simulated in software to provide individual workstation services, connected through a network, such as the internet or a telephone or cellular system, each telecommunications device 200 able to deal with incoming calls as usual and with basic ReminderRing capacity. In addition, a control program device 901 is shown connected. For example, the control program device 901 could be the aforementioned project management system. Each of the individual devices 200—employed is the term phone, without prejudice, though the fact that they many take various forms has been previously noted—may be set to give permission to a controller allow control of the ReminderRing(s) used by that individual device 200 to set the annunciation for some or all callers. The identity of any such controller is first provided by the user 170, or an authority such as an IT department or the manufacturer, OEM, or carrier, who prepares that device for the user 170. Subsequent contacts with indication of that RR_key_ID 184, for example by means of a caller ID or IP address, will provide for ReminderRing 'push' loading from the controller, as was previously disclosed in the discussion above, particularly regarding FIG. 12.

Figure 17:
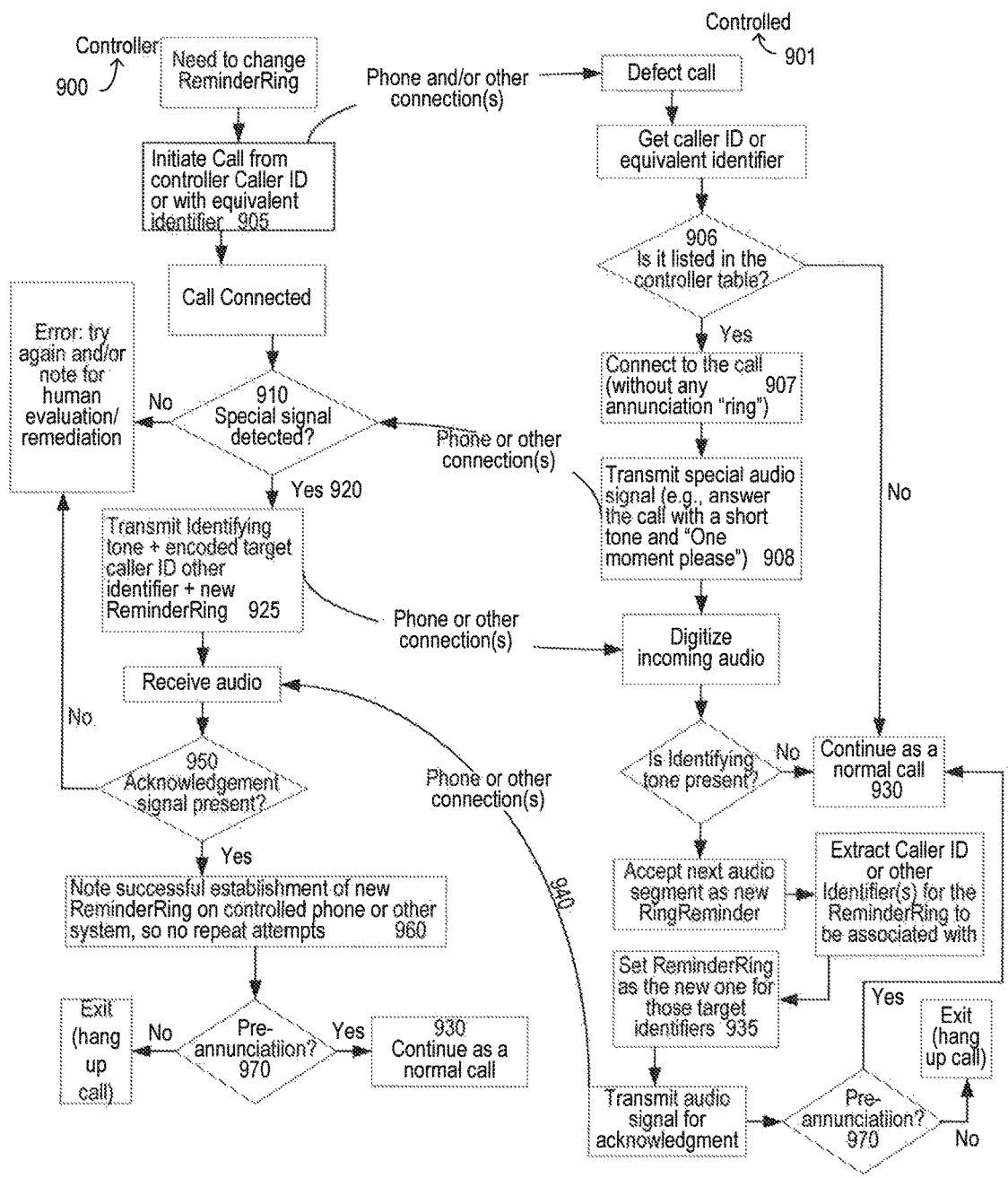
FIG. 17 is a flow diagram illustrating a portion of the current invention allowing for push functionality.

FIG. 17, visualizing this process in further detail, lays out the protocol between the controller 900 (as controller program device 301) and controlled ReminderRing device 901 (as terminal 200), with the controller 900 portrayed on the left, the controlled 901 on the right. Note that in a degenerate case they could both be software simulations encompassed in a single networked system, and in that or others many of these communications could proceed more directly, for instance, on the Internet. As a preferred example, though, in the FIG. 17 telecommunications transmissions between the Controller 900 and Controlled Unit 901 are shown with arrowed arcs. The controlled 901 has already been set to recognize communication from the controller 900, as per the above mechanism(s). FIG. 17 illustrates an attempt to 'push' one or more ReminderRings to the controlled 901. This 'push' may be simply to set up the sounds (and/or other annunciation modes) to be used as later ReminderRings, or it may be for its variant, pre-annunciation, as described previously above, in which case the new reminder ring will be produced, also, and a normal telecommunications conversation 930, such as a phone call, will proceed immediately after. Either or both may be initiated by a non-human controller mechanism, for instance, a programmed voicemail system attempting to deliver high priority messages by using its status as a controller 900 of the ReminderRing in pre-annunciation mode, or an advertising message as an "Ad Ring" form of notification initiated by a business or other entity doing marketing or other promotion, or a social network 'director' program presenting options that people together or keep them apart, as described further later in this document.

Examining, then, FIG. 17 starting in the upper left, there is the controller 900, in response to its perceived need, first initiates a call 905 to the controlled 901, which identifies it through the use of a field in the RR_key_ID 184 keyed Private ID Mapping Database 183; alternately, for considerations of resources or security, a separate controller table may be kept solely for this purpose. Test 906 is performed to determine if RR_key_ID 184 exists in this table. If RR_key_ID 184 does not exist, the Controlled 400 proceeds as a normal call. If RR_key_ID 184 does exist, the Controlled 901 unit does not need to annunciate (though it may be set to give indication to the user, or other systems, for example if he wishes that for his own information, or for security considerations) and then proceeds to connect to the 'call' 907 itself without annunciation to its user 170. The controlled 901 unit then transmits an arranged recognizable signal 908, for instance a short tone at a particular frequency followed by the recorded or synthesized words (in the audio case) "one moment, please". This is done in case the call is not a 'push', but rather an actual call from a human associated with this same RR_key_ID 184, such as a caller ID. Back at the controller 900, detection of this tone and/or spoken phrase 910 or other signal mode next occurs, and another such identifier is immediately transmitted 925, framing the new reminder ring plus also encoding any additional data needed, such as in the event multiple reminder rings are to be set, and/or for different RR_key_IDs 184 than that from which the Controller 900 initiated its call. Clearly once this communication channel is established, current means known in the art suffice for this and even more complex exchanges of more complex information between the devices 200 (or, as controlled, 901), including indications of pre-annunciation, tracking and security provisions, which may have been set by or for the user through the UI options and Configurations 171 functionality in FIG. 13, or in other ways such as by the manufacturer or enterprise IT authorities, if so desired in embodiments of the present invention.

Having, then, at a minimum, extracted the new ReminderRing(s) from the communication presented by the Controller 900, the Controlled Unit 901 proceeds to set 935 the ReminderRing as the new ReminderRing for the target identifier(s) into its RR_filename database file(s) 207. Controlled 901 then informs 940 the Controller 900, again by a pre-set signal, such as a short tone, that it has successfully completed its task of accepting new ReminderRing(s). Controller 900 detects this acknowledgement 950 and notes its success 960. The Controlled 901 and Controller 900 then individually check 970 if an indication of pre-annunciation was set. If pre-annunciation was set, both parties proceed as if it were a normal call, with the new ReminderRing being played for the Controlled 901 Unit's user 170 by the Controller 900 Unit if it has a human user 170.

Figure 18:
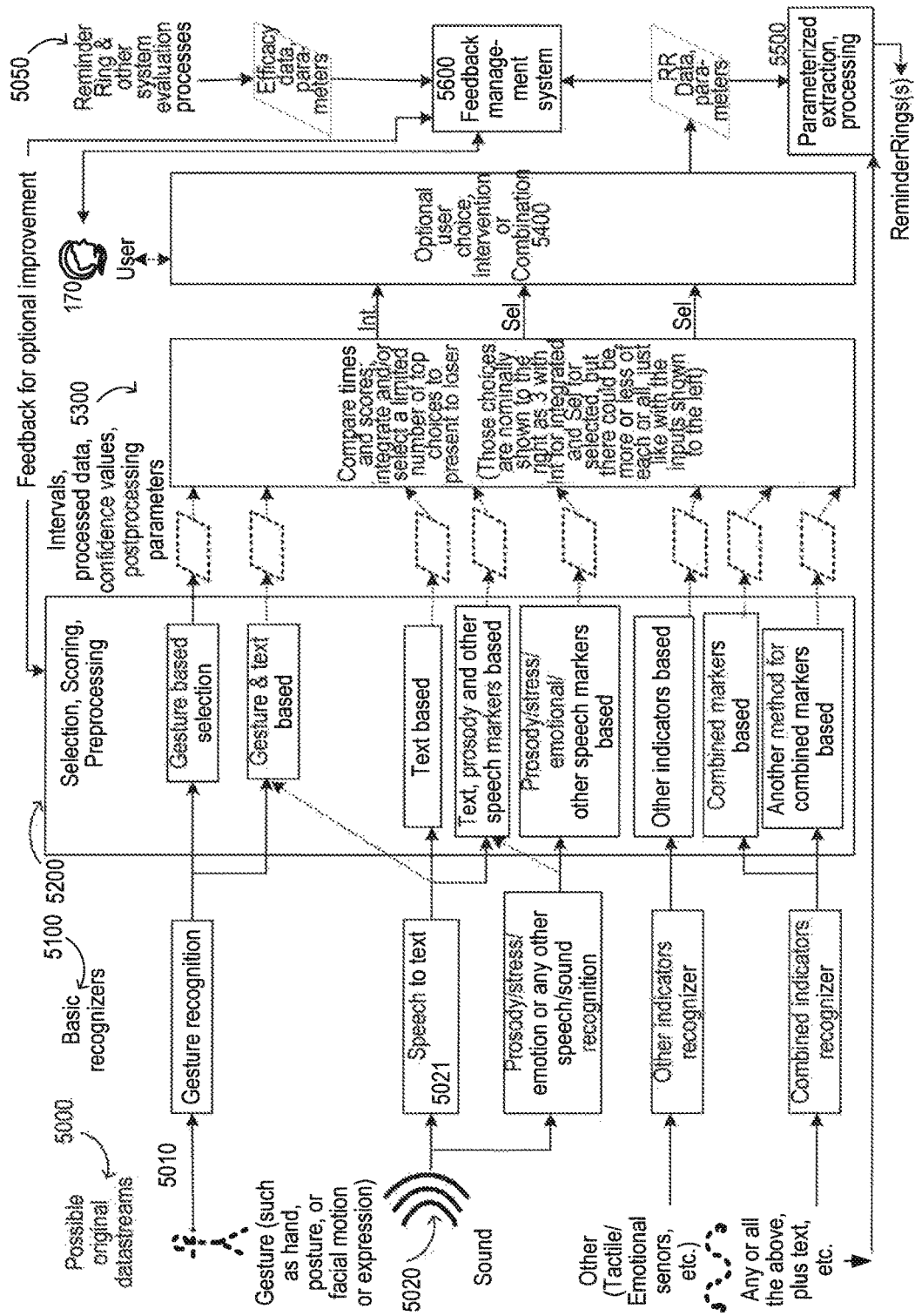
FIG. 18 is a flow diagram illustrating examples of the ReminderRing extraction process.

This disclosure has previously given a variety of examples for how the sound, or other ReminderRings, such as text display or video, could be selected for extraction out of a communications conversation, and how the ReminderRing could be subsequently processed to improve its effectiveness. FIG. 18 illustrates an example of integrating several such various ReminderRings into a common system for effecting such ultimate ReminderRing, with provision made for simultaneous ReminderRing application and for the overall ReminderRing system to evolve into greater efficacy through competition, external data provision, and contextual feedback mechanisms.

FIG. 18 is organized starting on the left with a column 5000 depicting data streams of various possible source and triggering inputs for ReminderRings. Column 5100 matches each source datastream with one or more initial processes that digitize and perform feature recognition on each datastream. These processed and/or feature-recognized streams are then output to Column 5200 which consists of the next stage of processes, each of which takes one or more of the preceding Column 5100's outputs and creates a proposed ReminderRing from it, with additional data, such as a confidence score. This proposed ReminderRing is then output into Comparator/integrator 5300, which may present a more limited number of choices of ReminderRings to the user 170 or automatically chooses one itself. Evaluation 5050 of the outcome of the chosen ReminderRing provides feedback to improve the ReminderRing.

Continuing with FIG. 18 observe once again that though our preferred descriptions for brevity and contextual ease often reference audio and phone-transmitted speech, ReminderRings can be based on a great variety of other data sources, a few of which are listed here in the leftmost column under the more general groupings of Gesture, Sound, and Other (also for brevity and clarity in this explication, these are often treated as simple individual streams, where in fact they can comprise multiple streams such as two persons both speaking in a phone conversation; or multiple participants, human and simulated persons, in a virtual conference) Gesture 5010 encompasses matters ranging from video transmissions with hand motion and facial recognition to multipoint touch screens—for instance, swiping a biometric sensor with a motion to indicate that no ReminderRing should be extracted from the remainder of a conversation. Sounds may not just be speech, but other recognizable signals—for instance, snapping one's fingers to denote the beginning of a ReminderRing. Other sensors may obtain information about people's emotional states or intent from polygraph-style readouts or brain waves, or the location or motion of the device, such as with the accelerometer in an Apple iPhone smart phone, and could similarly serve in a ReminderRing context. Sensors of all the types mentioned above are currently known in the art and it is anticipated in this disclosure that their functionalities will find expression in common platforms, such as smart phones, very usefully addressable by the present invention.

To address Gestures 5010 will most immediately require basic recognition processes, such as feature extraction, be applied to the communications conversation and other potential data streams associated with it. Examples of such basic recognition processing units are shown in FIG. 18 Column 5100 labeled "Basic Recognizers". The first item given is gesture recognition. Such gesture recognizers can process an image stream like video to find anything from simple hand motions to sign languages, from posture changes such as head nodding, to facial recognition of a wink, to denote the start of a ReminderRing. Methods for facial and hand gesture recognition are well known in the art, and the open source code packages HBP and Handvu are known in the art and herein incorporated by reference. Gesture recognition can also include such things as motions made by hand on a touch sensitive surface, such as a smart phone touch screen implementing a self capacitance screen containing sensing circuits and electrodes, or pushing virtual buttons with a cursor controlled by a mouse. Gestures can be either observable or non-evident to another participant in the conversation or outside it, for instance by arranging for motions by a particular hand or finger which normally are made by another, or otherwise fall outside a usual biometric range.

Continuing in FIG. 18, next is basic recognition for sound 5020. Here, by way of example, any of the data streams from Column 5000 can have multiple independent recognizers applied to it. In this case implemented is one recognizer for speech to text, another representing the possibilities of both more general sound recognition (for example, like any other signal, the tongue-clicking sound sometimes written 'tsk' or 'tch', the latter of which is traditionally used by English speakers to signal horses, because it is so distinctive and easily recognizable as outside the normal English language, can be repurposed to signal the beginning and/or end of a ReminderRing sampling interval) and more specific ones for detection of speech features that convey meaning beyond text, such as sarcasm, stress, emotion, or even for environmental implications, like differentiating when a user is in a car, office or restaurant, which could serve as an indicator of suitability of a particular part of a conversation for serving as a ReminderRing. Methods for both speech to text and for extracting other information from sounds, including speech sounds, are generally known in the art, with the previously mentioned Praat and Sphinx code serving as an example thereof, and more advanced facilities are available commercially and well known in the art. It is also anticipated that such methods and their availability will continue to advance and such advancements can be incorporated into and built upon for ReminderRing, and that these and other recognizable signals can be set up as explicit cues of user intention, that is, as commands for such things as beginning or ending a sample, or to denote the opposite, that is, that an adjacent interval of sound is not to be used in a sample. Such cues may or may not be evident to the other participant members of a conversation; they may be explicitly trained like "1 tongue click" to start recording a sample, "2 tongue clicks" to stop, or could be non-oral sounds such as of tapping a finger). Next is a basic recognizer applied to other sensors: examples would include wearable computers that sensed brain waves or somatic indicators of emotion, or a GPS unit that enabled ReminderRings to be influenced by location. Finally, noted at the bottom of the column is a basic recognizer which may perform best by having direct access to inputs from more than one of the original datastreams, such as for doing speech to text with a lipreading facial recognition assist in difficult audio environments.

Column 5200 of FIG. 18 illustrates modules which take the input datastreams of Column 5100 and processes them to select, extract, preprocess and score potential ReminderRings. Each of these modules takes in the output from one or more basic recognizers, identifies and analyzes them, and on that basis specifies a potential ReminderRing, as well as a self-evaluation score reflecting the degree of confidence it has in that judgement. That confidence score could range from a simple binary indicator of "found it" vs "didn't find it" to an elaborate matrix evaluation function; for an example, the confidence score is taken as a single scalar quantity, which could be normalized, of course, to produce a number from 0 to 10, where 10 designates a seemingly 'perfect' ReminderRing had been found or derived, while zero meant the process could not determine any item of relevance so it performed a semi-random guess at what to use as the ReminderRing for the next call. Examples of these are arranged to indicate that some, like the top Gesture-based selection, may rely solely on a single basic recognizer. Another, like gesture and text based selection, might rely on two, for example, looking at both text and gesture transcripts of the conversation to relate them in a case where a single command gesture initiates a sequence of voice-delivered command instructions, only one of which is to the ReminderRing system. Next could be a text-only analyzer which may simply trigger ReminderRing by the words "ReminderRing this sentence:" followed by the sentence the user wants as a ReminderRing (another example for this will be given in FIG. 20). Following could be where both text and other speech markers are used; an example would be to use the last loud and questioning sentence in a conversation as the subsequent ReminderRing. An example for a prosody/stress/emotional/other speech markers based module, using sound without text, is given in more detail in FIG. 21.

Next down is the other indicators based module. An example of its application might involve the GPS locator on a phone. The potential for the use of GPS or other location-determining inputs with ReminderRing has been previously mentioned. So in a simple example, this module could be used to select a ReminderRing from when the user was geospatially closest to another person. More complex versions could find useful application in interactive games played while moving around, or in social networking applications, or to facilitate office workers' communications and meetings in a large building. Finally, below, are two combinations items, which illustrates the potential to incorporate any number of more elaborate ReminderRing selection or construction mechanisms to use multiple basic recognizer inputs.

Additional information may be made available to the basic recognizers of Column 5100 or subsequent processors such as the modules of 5200 that enable the subsequent processors to access a system of identification and memory of who is talking so as to vary parameters and adjust to individual habits of communications, languages, and contexts.

Continuing, in Column 5250 of FIG. 18, there are outputs from the modules of 5200, each providing data specifying its selection or derivation of a ReminderRing. This data could include, for example: a whole set of time intervals for the conversation; postprocessing parameters, for instance, telling how those were to be concatenated and smoothed; already processed data such as a speech recording formed by text-to-speech from instant messaged text; and confidence indicators as previously mentioned. For an example, a single interval is specified by a start time and a length in seconds, plus a positive number indicating confidence. These values are given as inputs to the comparator/integrator function 5300.

Comparator 5300 compares its inputs and selects one or more among them to use or seek user 170 consultation regarding, and/or it can integrate their recommendations. For example, in this preferred situation, a simple algorithm suffices for illustration: it examines all the timing intervals suggested. If there is any overlap among them, it selects the most overlapped area, that is, the part in time which has the most votes. If that is shorter than 5 seconds, it adds two seconds before and after, provided, however, that the ends of the conversation stream are not exceeded, of course. If there was overlap, this produces an 'Integrated' ReminderRing. It also examines the normalized confidence values. If one of the normalized confidence values is 8, 9 or 10, and no other is greater than 4, it selects the ReminderRing indicated by the highest one. Otherwise Comparator 5300 chooses the two having the highest confidence values, or three there was no 'Integrated' one produced. If there is any tie it picks from the tied ones at random. While more elaborate mechanisms may or could exist that can be implemented at this stage, particularly given the possibilities described above for more elaborate inputs, including processed sounds or other data, this mechanism suffices reasonably well, producing one or several outputs, shown nominally as three, which are passed to the next stage. This is shown by the arrows labeled Int. and Sel.; again, this is a nominal situation, and clearly more or less of each could be passed by a more elaborate or flexible Comparator/Integrator functionality.

Receiving these several inputs defining possible ReminderRings, a function 5400 presents the possible ReminderRings to the user 170 for her to choose among, either at the end of the call, or later, as subsequent function. Function 5400 can also allow the combination of ReminderRings through means such as concatenation or rotating and/or random usage. These modes provided by function 5400 can be user 170 selected, along with default conditions for use of a ReminderRing when the user 170 does not choose before the next call or other event invoking that ReminderRing occurs.

The resulting ReminderRing and related data, and/or possibly parameters defining its generation (for instance, at its simplest, the time interval instead of the actual sound) are passed to function 5500 that renders them into form suitable for the actual ReminderRing system as defined previously (presumably Tone File Creator 185 or its equivalent, though more elaborate embodiments of the methodology examined in FIG. 18 may be better implemented in an architecture for ReminderRings that is built out in a somewhat less hierarchical fashion than that particular preferred embodiment presented in FIG. 13). The ReminderRing and related data are also passed to a Feedback Management System 5600.

Feedback Management System 5600 gauges the effectiveness of the selected ReminderRing by a variety of means, which may, but need not, include user evaluation, efficacy judged externally (for example, through customer surveys, project reporting metrics, medical compliance measurements, and call-answering frequencies, among others) and the results used for adjustment and of the Scoring and Selection modules of Column 5200 to produce better future results. Feedback Management System 5600 may use interactive parametric adjustments by the user 170, or techniques known in the art such as artificial intelligence, artificial evolution and neural networks. As an example, the previously mentioned Praat open source software program source code Feedforward Neural Network learning and classification functionalities may serve as a basis for performing neural network functions within this Feedback Management System 5600.

Figure 19:
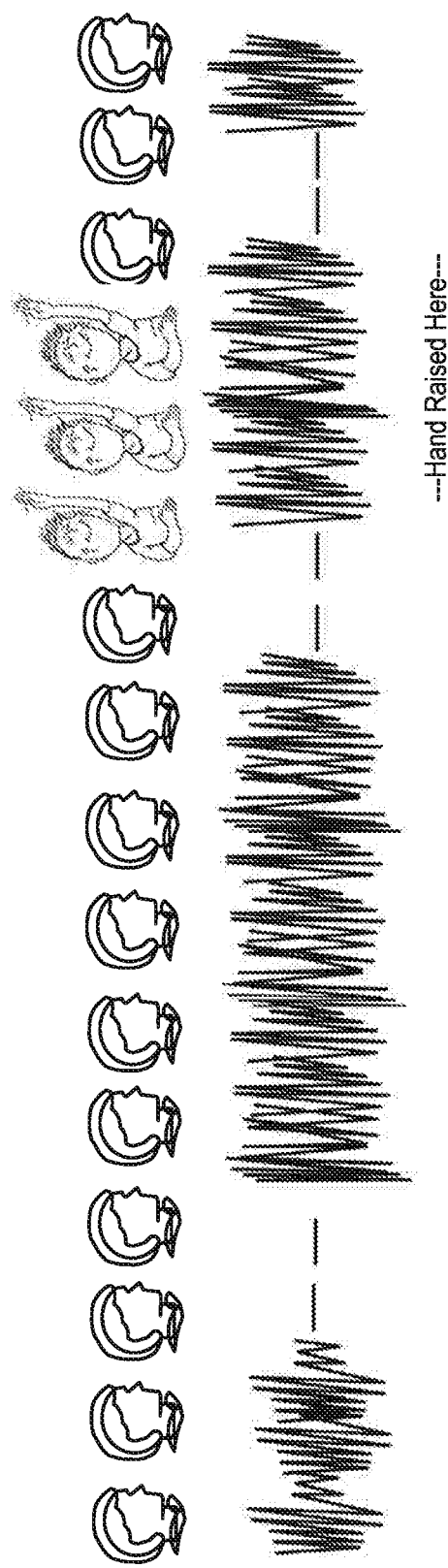
FIG. 19 is a diagram of an embodiment of the invention depicting gesture recognition.

Turning now to FIG. 19, a straightforward illustrative example of a gesture-based selection of a ReminderRing, is set forth, demonstrating the process of generating a ReminderRing described in FIG. 18, focusing on the gestures recognizer of Column 5400 of FIG. 18 and the gesture-based and gesture and text based modules of Column 5200 of FIG. 18. In FIG. 19, an example gesture of raising a hand, generally recognized by the Handvu system, is made during the part of a conversation the user 170 wants recorded as a ReminderRing. Representations of parts of the audio and video streams are shown, for teaching and illustrative purposes only (i.e., they are not to scale). The hand raise or another gesture could also be arranged to be a signal made before or after the desired ReminderRing sound, instead of during, of course, and by either the user or the counterparty. To disambiguate repeated gestures and create a confidence score, a simple example working method is that if the gesture was repeated, the last one is allowed, but with one less on confidence score for each repeated gesture, to a minimum score of three, in order to reduce the impact of malfunction-driven false positives. Thus, in the present embodiment, a disciplined user who only raises his hand once can expect it to generate a ten-score and have high probability of being used as the ReminderRing.

Figure 20:
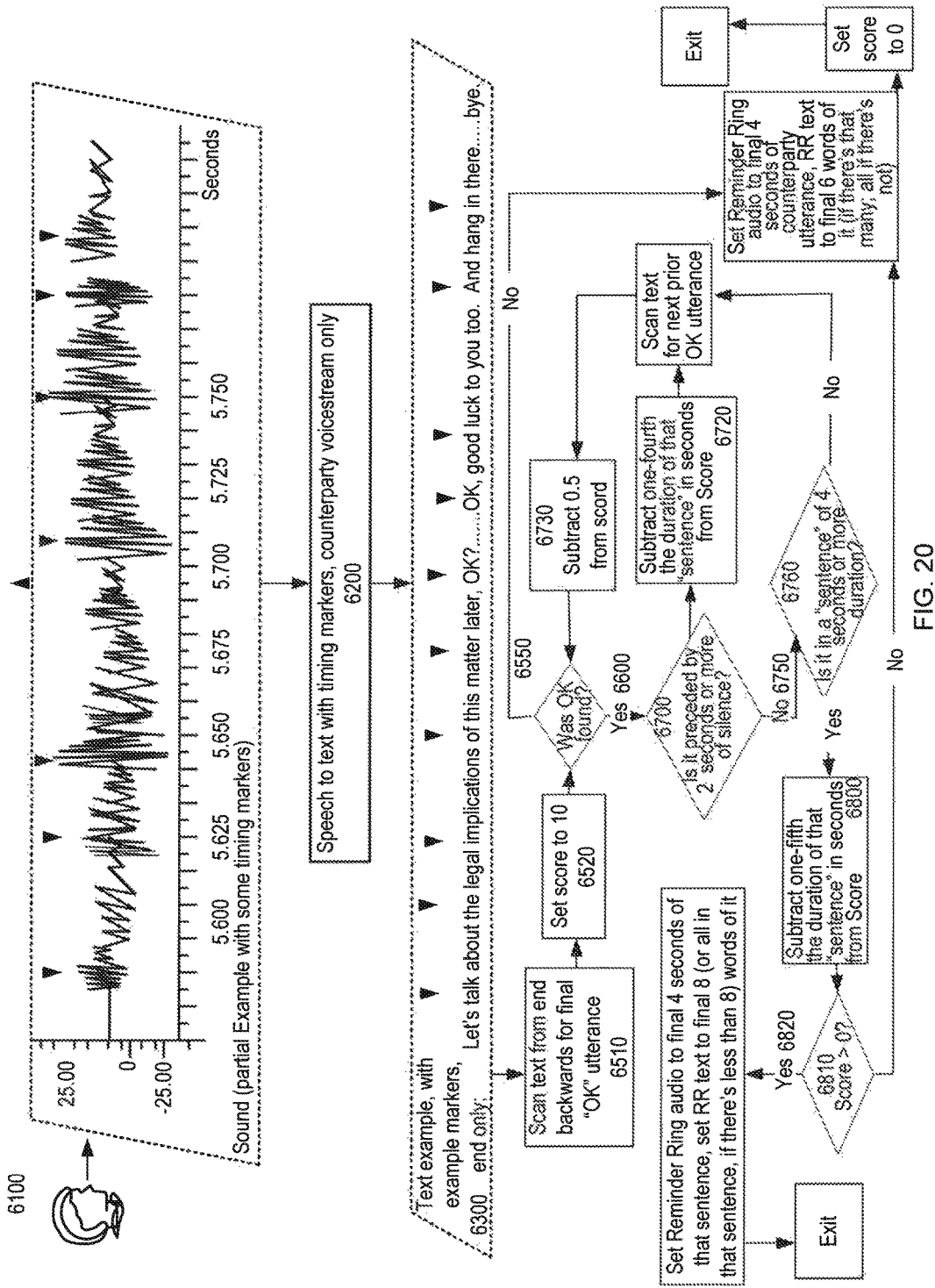
FIG. 20 is a flow diagram illustration of an example of speech to text based extraction.

Turning now to FIG. 20, illustrated is an example of text from a speech-to-text recognition system, which is employed for using sound itself to select an audio ReminderRing, (corresponding to elements of FIG. 18 as labeled: Sound 5020, Speech to text 5021, Text based 5022). In this example, only the counterparty's (the person, represented at upper left, with whom the ReminderRing system user 170 is having a conversation) portion of the audio stream is shown and used. That conterparty's data is digitized 6100 and speech recognition software, using either commercial packages and/or built on the speech recognition, formant analysis and interval and time point labeling methods shown in the attached source code for the Praat and Sphinx systems, or any equivalent thereof, and generates 6200 a text transcript 6300 from the speech, with timing marks indicating its relationship to the original sound stream. This formatted transcript 6300 may take the form of a separate table of times and corresponding character indices, or be imbedded in the text as tags, for instance as in HTML, or in the sound or video stream as SMPT timecodes are. Additionally, long pauses in the speech stream (often while the other person is talking) can be indicated; for case of understanding, in the example here these are shown with dots proportional to the time they cover. The dots exampled here in text transcript 6300 divide the text stream into a number of "sentences", a word used in this example not in its syntactic sense but rather as a term for parts of one side of the conversation which are separated by pauses of one second or more.

An example ReminderRing Text Processing Method 6500 is shown for processing the text transcript 6300 in FIG. 20. ReminderRing Text Processing Method 6500 often works well for English speakers, some in particular (which the Feedback Management System 5600 of an adaptive ReminderRing system will improve toward favoring with higher confidence scores). In this example, one could say these folks are 'OK' people: they seem to habitually use the word 'OK' in a way that enables finding good ReminderRings in their calls. First the text is scanned 6510, word by word, from the end, looking for the common English word "OK", and setting 6520 the confidence Score to ten as an initial default. If there is no 'OK' found 6550, set the ReminderRing audio to the final four seconds spoken by the counterparty, and the ReminderRing text (which may be displayed as annunciation with or instead of the ReminderRing audio) to the final six words the counterparty said (of course if there's less than six words or less than four seconds sound, just use as much as there is); set the score to zero and exit. If 'OK' is found 6600 the ReminderRing Text Processing Method 6500 proceeds.

In the example given, an 'OK' is found just before the words "good luck". Next, using the timing indicators, check if it was preceded by two or more seconds of silence 6700 (from the counterparty; presumably the user was speaking then). If so, it is rejected 6710: subtract one-fourth the duration of the current sentence (in this example, the one with this 'OK' in it) and scan again moving forward (toward earlier times) in the transcript and when an 'OK' is again found or the scan terminates unsuccessfully, subtract 0.5 from the score 6730. When an 'OK' without two or more seconds before it is found 6750, make sure it is in a "sentence" of four or more seconds duration 6760; otherwise, it is another reject, and as in the first time through the example shown here) loop back to look for another 'OK', applying just the 0.5 score decrease 6730 this time. Having finally found an acceptable 'OK' (in this case, the one just after "matter later") in a "sentence" lasting four or more seconds, and which also has less than two seconds of silence before it, subtract one-fifth the duration of that "sentence" in seconds from Score 6800. If Score is less than zero 6810 now, give up on 'OK', set the ReminderRing as if there was none found and exit. If Score is still greater 6820 than zero, it's an 'OK' success: set the ReminderRing audio to the final four seconds of that 'OK' sentence, the ReminderRing text to its last eight words (or less if it does not have that many) and exit.

As is the usual case for such processes, the specific numeric values used in this example of FIG. 20 can be tuned for improvement by a variety of methods, including FIG. 18 extraction system's Feedback Management System 5600 to improve its match to the language usage, speech habits and situations of individuals, groups or their functions (e.g., at work, as a parent, etc.).

Figure 21:
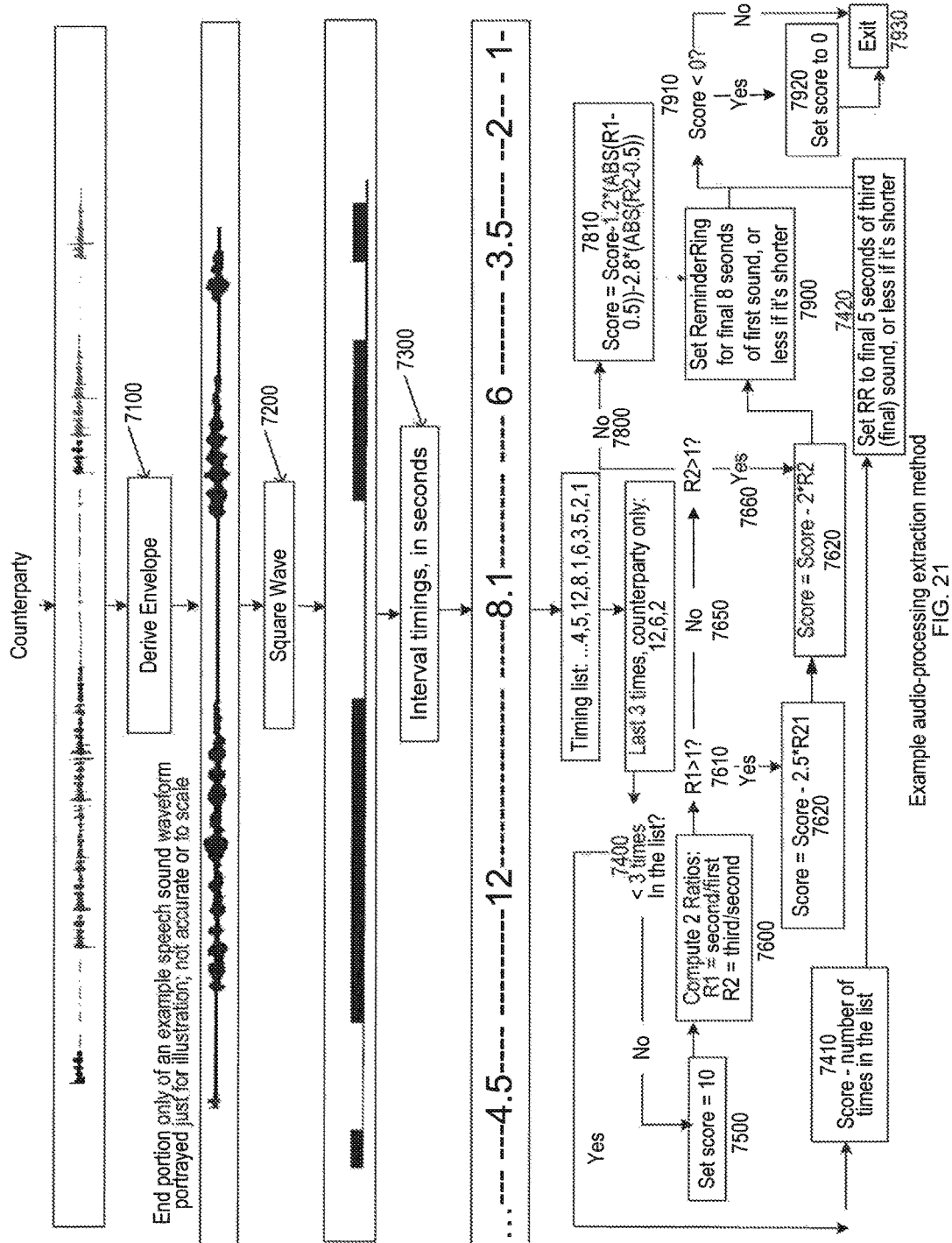
FIG. 21 is a flow diagram illustration of an example of audio processing extraction.

Turning now to FIG. 21, an example is used focusing on using sound alone, without a speech to text system, to select a ReminderRing. This corresponds to the items in Column 5200 of FIG. 18, both with labels beginning with the word 'prosody', and will be subject to the same tailoring and means of improvement noted above. It is built on the observation that American English phone conversations tend to taper off with a couple courtesy utterances, with the final matter most useful as a ReminderRing occurring just before them. Again, for this example, focus is only on the counterparty side of a conversation, with the remainder equivalent to intervals of silence. First, by means known in the art, such as one based on the audio processing source code in the previously mentioned Praat open source code, an envelope is derived 7100 from the voice stream preparatory to converting it to a square wave 7200 that yields a list of timing intervals by length corresponding to the counterparty's utterances and silences 7300; only the lengths of the last three utterances by the counterparty are used in this recipe. If the conversation was so short he did not even speak three times 7400, set the Score to the number of times he did 7410, and the ReminderRing to the final five or less seconds of the final sound 7420, then check the score (though this is not necessary) and exit. But if there are three, set the Score 7500 to ten, and compute 7600 ratios R1, the second divided by the first, and R2, the third divided by the second. Check R1 first 7610: if it is greater than one (that is, if the seconds of the three sound times was greater than the first) that is not optimal, since it does not fit the tapering off pattern: decrease 7620 the score by two point five times R1, then again 7630 by two times R2. If R1 was not greater than one 7650, test R2: if it is greater than one 7660 (that is, if the third and last of the three sounds was greater than the second) that is not optimal, since it does not fit the tapering off pattern; just decrease 7620 the score by two times R2. If 7800 R2 was not greater than one, decrease 7810 the score by one point two times the absolute value of (R1—zero point five), and then decrease it by two point eight times the absolute value of (R2—zero point five). In any of those cases, after decreasing the Score, set 7900 the ReminderRing to the final eight seconds of the first sound, or all of it if it is shorter than eight seconds. If 7910 the score has become negative, set 7920 it to zero, then exit 7930.

The preceding examples all rely on the processing of telecommunicated conversations to provide utility in an apparatus capable of storing those samples and applying computer code so as to influence subsequent operations in a complex fashion. An additional embodiment showing the utility of conversational processing will now be described called TalkSocial. As an aid to its description an integrated use case narrative will be based on a smartphone—a small, connected device with significant computational capacity and telecommunications ability—with additional applications present which rely on or extend the benefits of conversational data processing.

In this use case for TalkSocial, to be examined in more detail subsequently, a young man finds a restaurant meal and social life using TalkSocial on a pleasant evening in an unfamiliar urban environment. He uses a variety of functionalities: For instance, shaking a TalkSocial equipped SmartPhone (which action can be detected on an accelerometer-equipped smartphone by means known in the art, as can position and orientation on those equipped with sensors for that purpose) and pointing it at a strip mall down the street, for instance, while saying "Pizza", can trigger a coupon or other offer from a restaurant there. If the user doesn't like that instance of potential 'social' interaction and/or knows someone who does, the user may forward it with his voice on it, for a friend to shake or for it to interrupt him, with a 'call' from him. Then, the user, can shake again for another offer. Shaking is used to color the narrative; a button or other mechanism would also work.

The point of this example is that additional prior communications of the user can influence the result. The telecommunications stream of his prior verbal communication has had keywords or other samples extracted, examined and used for content or contextualized communication, according to means described previously: for example, his girlfriend or mother's voice perhaps for persuasion, or directions and related remarks like "walking distance".

Depending on his settings, if and how he is notified will depend on his communications, location, and prior behaviors, and the social graph—e.g., whether other friends are in the area; plus whether other offers exist, or other businesses, for instance, rise to the occasion as it looks like a party is coalescing.

This example shows how the present invention is able to function in an integrated mode. For instance, it could be used with, or to produce, 'augmented reality' displays based on where it is pointed, with arrows or looking 'thru' with camera, to show what the social suggestion is and the offer applies to, and how to get there.

A user's voice or words transcribed and associated, such as those of a friend or celebrity, could have been just recorded and forwarded along with a "social recommendation"/coupon. Examples ranging from "Pizza!", peer meme voicing, mom's voice, girlfriend, persuasion reminders, directions with simplified "walking distance" or with ads placements within the communications, such as "turn left at the McDonalds," to complex scripts sufficient for turn by turn directions, can be played or played back with or without modification for contextualization. Reaching further afield in social interaction, they could include cueing, such as for management, instruction, playacting, job interviews, etc.

Besides that, contextualizing sounds can be played back to the business, for instance, which produced the ad. With augmented reality views, the user can point at a physical location of a building, and critique it or request coupons, etc. That critique is not only communicated back to the business, but contextualized with data about who and where you were, plus the business is enabled in the future to contextualize its further communications with the user.

Those businesses are also enabled to contextualize their communications in general, and to offer targeted and limited promotions, with limitations of number and time, for example.

Additionally, this can help the user contextualize his own communication, to be relayed later as voice 'background' or annunciations in conjunction with coupons or other chivvying when targets are near.

Looking now at a particular scenario which serves to demonstrate the combined utility of a number of the modes of action of this invention, we examine FIG. 22. On a street in front of a set of commercial establishments, a smartphone and TalkSocial user is looking for food, good deals and interesting company by means of old friends or new. Though he can see some signage on one building that proclaims it "Pizza Palace", this scenario assumes he's not that familiar with this locale, and is unable to see that there's a "Pizazz Pizza" sign almost next door (maybe a tree is covering part of it), and certainly doesn't know about Luigi's little Italian place in back, let alone that they serve pizza too.

So to start he points his phone at the set of buildings, or otherwise indicates them as a target or has them as a default through proximity, and shakes it to initiate TalkSocial. From his prior behavior the system knows he usually eats at that time of day; from speech recognition of conversations on the phone the software knows that he often uses the word "pizza" in conversation close to that time; and that no phone-mediated meal transactions have occurred, nor has he been at any locations in the last few hours. A set of these types of indicators can each be programmed in or more elaborately evolved; user designation or even crowdsourced creation mechanisms can be deployed, through means known in the art or evident equivalencies and extensions thereof.

Note that syntactic analysis is unnecessary for simple utility in performance; imperfect word extraction of a limited vocabulary will suffice, though more elaborate AI can be introduced and applied as platforms allow.

Alternatively, whether the user points at the buildings or otherwise indicates the direction, he could simply say "pizza" or a simple question regarding it, such as "Where's a good place nearby for pizza?"

In this example scenario, TalkSocial now, as illustrated in FIG. 22, shows him a limited-edition coupon for half off a pineapple pizza at Luigi's, and how far it is, with an optional map and TBT display. An assumption for this example use case narrative that that is a good deal, but it doesn't appeal to him, since, say, pineapple isn't his favorite, and he's looking for company too and won't eat a whole one; but that he remembers a friend who loves pineapple, and the coupon says it's good for the whole weekend and can be forwarded; he does so to that friend, adding a voiced annotative remark on the order of "Pineapple pie! Remember? Never again for me, but here's some for you!" This message and the coupon may then be delivered to his friend—depending on settings—thus using his knowledge of his friend's likes to target the coupon.

Next, in FIG. 23, automatically or upon shaking again, a new offer is displayed. This time it's a 50-cents off anchovies Friday coupon from the Pizza Palace chain. Our user reacts negatively again—and decides to let the vendor, and his application, know about his displeasure by choosing a means of feedback and speaking his mind: "No! Anchovies, yuck! And so cheap it's not worth my time to look at it. Some palace!" This feedback can then be delivered by a variety of methods to the merchant, depending on settings—at their expense, quickly or slowly, as voice or speech-recognized text, etc. For example, the recording can be stored in the smartphone, then relayed over the internet as email with attached sampled voice. This and other methods to relay the feedback, and maintain a database for the advertising offers, will be apparent to one skilled in the art.

Continuing this example scenario, a third shake brings up an offer far more interesting to our user. In it Pizzazz Pizza proposes our user take the 5th seat to help fill their large table for 7, and share the free pitchers of beer they are throwing in if the table's filled in the next 10 minutes. Being more elaborate, this offer is augmented with a recorded sound describing it, which our user allows his phone to voice through its speaker, either by immediate or prior option selection, or default setting. He navigates by manipulating his smartphone, in ways known in the art by manual or voice means, to see some information about the other folks at the table so far. One is a casual friend he's connected with on a social network, another is a friend of hers. The other two responded to the coupon like he did. Looking to recruit additional folks, he selects a general rebroadcast of the coupon to his friends within the distance possible to arrive by then; many of them may have allowed their devices to accept a push message with audio from him, as has been described earlier, so he could add a "10 minutes" shout of his own. The friends hear notification rings with the advertising message as relayed with our without that "10 minutes" modification.

As a next step in the example, the user then issues a confirmation of his intent to accept, and uses the turn-by-turn directions then displayed to begin walking toward the restaurant, while also noting on the display the positions of others in his extended social network of "friends of friends".

As a further example of the utility of advertising rings, in this case next he hears an incoming communication from the Pizza Palace. He'd almost forgotten about them, but the ringtone announcing it, presuming he opted in for one previously or by default, for instance at the time of providing his feedback message, includes a snatch of his feedback audio "anchovies, yuck!" followed by "pepperoni, mmm . . . ." He chuckles and accepts a display showing and hearing a new offer: "This is Pizza Palace. We're sorry you don't like anchovies, how about a free slice we've cooked up with some spicy new pepperoni instead? It's piping hot and so nearby—stop in and grab one with no obligation." Holding his phone screen horizontally as he walks, he sees it flash an arrow to his left, and show the storefront. Glancing in that direction, he recognizes the store. For that matter, he can see the Pizzazz Pizza sign now, too.

At this point the user may either turn aside, enter the pizza palace, and show his confirmation screen, a method known in the art, for the free slice; or he continues on his way. Or maybe both, if fast enough and not further distracted by merchants or friends who know his wants and have this invention to help target their fulfillment. If chooses to continue to Pizzazz Pizza in time, and gets there in time, he shows them the confirmation screen and joins the group at the table, which is now full. Introductions and how they got there are immediate conversation starters, with one of the diners turning out to be a regular who is leading an attendance and recruitment contest, and helped initiate the offer.

This example further illustrates the utility of a smartphone the operations of which are enhanced to address the needs of its user because it is "listening in" to conversational exchanges and able to modify its subsequent operation as a result. In addition, it shows the utility of an advertising ring, a pushed notification, provided by means disclosed previously, and in particular of the ability to craft benefit structures depending on interaction via the means disclosed in the present invention.

Additionally, though the above example focuses on user-initiated interactions, it will be apparent to one skilled in the art who has reviewed the above that a "social director" program might apply the same principles to initiate contact with the user, for example through Advertising Rings, in contrast to the user-initiated or business-initiated teachings of the prior figures. That 'social director' functionality could reside in independent computer or hybrid intelligence which initiates suggestions to the users in consideration of their wants and needs. Inputs to it could include a vast variety of lifestream data from people or other entities (for instance, phone calls or always-on recordings with transcription or keywords extracted, timestamps, place stamps), the extant social network graph (nodes, connectors, types of them), the user preferences (passive friending parameters, etc.). The outputs are calls, texts, emails with suggestions and referrals. An example of the result of such mediation initiated by an event-driven software intelligence, consider two groups both attending a ball game on a particular night but who usually don't, who apparently have friends in common, and bought enough seats the last couple years that there would be potential economic benefit to communication with each other about splitting a larger admission or add-on package.

The utility of the present invention is manifold, with numerous types of applications. Another important area of application is discovery, particularly as it pertains to using the tastes of social groups similar to oneself to guide one's further exploration of places. This could be explicit, as in the TalkSocial embodiment scenario, above, or implicit (for instance, from the words a user uses words in phone calls) or ambiently acquired by an always-on or automatically-on phone (for instance, triggered by GPS or stillness at a waypoint others have also paused at), could trigger suggestions of further discovery of places people who behaved (including talked) like the user also frequented. This could range from simple Bayesian inference to semantically understanding conversation, and from vendor-neutral search to paid per visit ad placements.

Applications also exist in games, dating, friending, etc. There the message could be an audio, text, image (photo of self or others or item), a barcode, etc. It could be used to make offers on items or even conduct online negotiations at point of purchase. The offers could include monetary considerations such as discounts or bonuses, non-monetary ones such as status enhancements like displayable badges, competitive situations where virtual points are awarded toward a winning scenario, or any combination thereof.

Games and instructional media could involve "levels" to which a smartphone rose after hearing a particular word or phrase in the communications stream; those levels could result in being able to visualize other items in an AR world. For instance, an AR language learning application might involve showing questions about items viewed through the phone, such as furniture and household tools, which could be labeled with bar codes by the user or automatically recognized by programming, or crowdsourced for identification; correct answers identifying simple objects would trigger the next level of difficulty.

In another direct application, the speed of stating a recognizable answer to a question could trigger the next, enabling a race with a great many more participants because content is downloaded first. In a less direct fashion, rather than a word, an image might be recognized, or a sound; the latter would enable audio treasure and scavenger hunts, with clues exposed on phone only after finding the correct sound. GPS could be used along with that. As a nominal use case, the "game" can simply be one like the Groucho Marx "You Bet Your Life" television show's say-the-secret-word paradigm, with each word potentially being sponsored, such as a brand name or series thereof with levels as described above, where progression through those levels is triggered by the processing of conversation, thus influencing subsequent operations of the communication device to respond consistent with the trigger for each next level.

Augmented Reality (AR) components for such games can project images into the map which depended on the mode of the phone corresponding to a level attained through communications stream recognitions. For instance, a treasure hunt style game might set searchers after a transmission of a pie of a real billboard, a musical tune being played in a retail lobby, a mention of a brand name in a phone call, an image of a particular assigned competitor (or assigned teammate), or a knocking-together with their phone, in the game, and a 'shot' of a AR image superimposed on a building. This would allow players in multiple cities to pursue equivalent goals. Serious games could include military and disaster simulations or real-time organizational challenges, with AR showing the extent of flooding or other transportation route interdiction.

As has been noted previously, though notifications in examples and cases such as advertising ringtones, or "ad rings", have been described for convenience and clarity as simple audio ringers, they could also be composed of other or additional modes of communication, including text, visual, or other sensory communication modes, apart or in combinations such as video.

Figure 24:
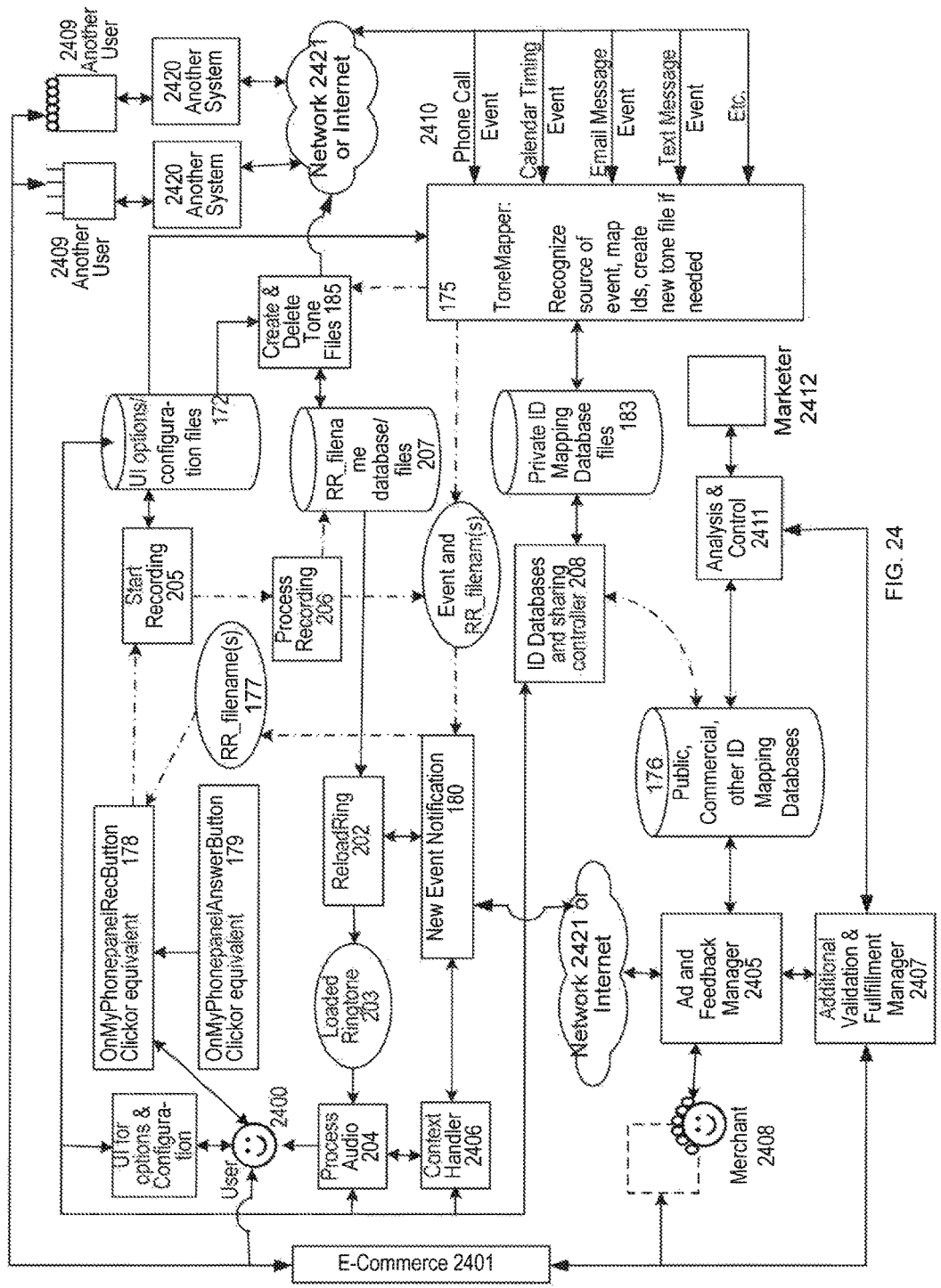
FIG. 24 is a block diagram showing the modified architecture of the wxCommunicator implementing mechanisms and commercial functionality for a number of applications including advanced forms of interactive commerce.

Turning now to FIG. 24, a system with a set of mechanisms which will enable the functions referred to in the above scenario are disclosed. This is done by describing additions and modifications to the prior FIG. 13. Though as a preferred embodiment it is based on wxCommunicator, it will be apparent to one skilled in the art that equivalent means, such as those described previously, will also suffice to support embodiment of this portion of the present invention.

In one particular scenario described above, a coupon or other offer is presented to the User 2400, and later redeemed through e-commerce and validation means known in the art. The interaction of those means with the user and merchant are shown as the "e-commerce" block 2401.

The contextually-targeted delivery of the advertising proceeds as follows. User 2400 interacts with UI component 2403 to set the system into that mode, the configuration of which with options is stored in files 172. Then as the user conducts conversation or equivalent communication activities, the StartRecording module 205 and then Process Recording module 206 place all or processed portions of the conversation into files 207, plus pass along the associated Event and RR_filenames 2404, which are extended to support this activity with associated data beyond the standard ReminderRing. New Event Notification module 180 receives this information, using it and cached prior contextual placement information, if any is present, to specify ad placement for Context Handler 2406. It also relays these and associated data via internet or other communications medium 2421 to Ad and Feedback Manager (AFM) 2405.

The AFM 2405 software programming, preferably based within a framework such as is commonly employed for operational websites and SaaS advertising management programs to control, track and communicate, reviews and extends the contextual placements and returns them via internet or other communications medium 2421 to New Event Notification module 180. They and/or the extended version are passed on to Context Handler 2406, which may also utilize separate data access and/or loading through the previously described ID Databases and sharing controller 208, which has access to Databases in 176, again via internet or other standard communication means; as mentioned previously, they may be accessed via many means, not only Internet or wireless telecommunications, but even via static media like cartridges or flash drives or CD-ROMs, or could even have been pre-loaded in a handheld phone for release upon payment. This multi-tiered design provides failover placements in situations of network timing issues which are sufficient in an advertising medium, and tracking data for the actual placements can be reported to the merchant by AFM 2405.

The returned placements events are sent to New Event Notification module 160, mediating the playback of samples and/or modification or replacement as instructed by AFM

2405 to fulfill the campaign conducted by Merchant 2408; a marketing campaign with advertising, as was given as a previous example, would be an example. Most advertising data resides in the commercial portion of databases 176, as loaded and managed therein by AFM 2405, though some aspects such as public service announcements or public broadcast media sponsorships are also applicable. Mechanisms for validation and fulfillment of any offers and other commerce mechanisms associated with advertising such as coupons, or the audio equivalent thereof, which are beyond the scope of selected e-commerce package 2401, are handled within Additional Validation and Fulfillment Module (AVFM) 2407, with its needed access to databases 176 as informed by AFM 2405.

Tracing through more details of this process starting from the Merchant's point of view, a relatively simple Ad Ring is implemented in this system as follows: A Merchant 2408, in this case the owner of Pizazz Pizza, interacts with a website front end or equivalent user interface, such as a handheld mobile app (or even a pure voice-driven agency such as SIRI, now owned by Apple and provided as an iPhone functionality, or others like it) which is presented by the Ad and Feedback Manager (AFM) 2405. She chooses an audio or other promotion for her business, for instance by selecting among already created ones, synthetic voicing of a text she enters, recording her own voice, or using a previously recorded conversational sample taken by a ReminderRing system of her own, which she found particularly natural and compelling, such as a moment she told a friend "Time for Pizza? Try some Pizazz!"; or any combination of the above, with additional processing or text and images, video, and other multimodal components added and/or transferred by means known in the art for moving files around and submitting them.

Ad and Feedback Manager (AFM) 2405 stores that sample and/or a form of resource locator index for it in database(s) 176. It then prompts her for additional information concerning her targeted context, that is, when and where she'd like the ad to run, and additional options such as the amount she is bidding for placement. The methods for managing ads in this way are known in the art—take, for example, the Google Adwords facility, and its competitors associated with other search engines such as Bing—and various aspects of such functions are even available as separate off-the-shelf components for use by $3^{rd}$ party developers.

Whether acquired through these kinds of means, or others such as purely verbal interactions utilizing speech recognition, these contextual targeting parameters are also stored in database(s) 176. She then gives payment information such as a credit card to Ad and Feedback Manager 2405, which it checks and registers using the e-commerce system 2401.

Meanwhile, a User 2400 has configured his system to accept Ad Rings, either by interacting with UI 2403, or perhaps by obtaining a phone which has this facility built in, for instance to defray the cost of purchase or operation; such phones could even be offered free, or Users might even be paid, in cash or promotional offers or material, to use such a phone with an Ad Ring facility, that is, an "Ad Phone". The Ad Phone could provide other services such as described herein, or others. The ads could be delivered occasionally during a conversation, in intervals or overlaying it as background chatter, sounds or music; or when one is not occurring; or in the interval after 'dialing' a number, while waiting for a connection or answer; or as an "Ad dial tone" while dialing a number, or as an "Ad Ring" notification ringtone audible to the user and other others in his vicinity. As with ReminderRings, beyond the audio being described herein as one embodiment the ads could constitute other modalities such as text, images, video, motion such as vibration, and others, or any combination thereof.

In this case, consider for a continued example the User 2400 configured a smartphone to accept Ad Rings, by interacting with UI 2403. It stores this information in UI files 172, which is accessible to ToneMapper 175 as shown. By this means when an incoming call occurs, Phone Call Event 2410, ToneMapper 175 detects the Ad Ring configuration, communicating this as part of Event 2404 to New Event Notification component 180. In communication with AFM 2405, over internet or other networks, it determines if an appropriate ad is available, considering available contextual information such as location, demographics of the user plus likely surrounding people within earshot, social networks participation, and the ad targeting configured by Merchant 2408.

If a targeted ad is found appropriate on these bases, New Event Notification component 180 is able to obtain the data required to render it directly from Ad and Feedback Manager 2405. If this occurs within an appropriate interval to enable a ringtone without unacceptable delay, that data is provided to Context Handler 2406 for incorporation into the ringtone by Process Audio component 204, replacing entirely the default ringtone fetched through the LoadedRingtone module 203 (as described previously) or merely modifying it, depending on configuration options.

If the interval is projected by computational processing in New Event Notification 180 to result in an unacceptable delay in rendering the ringtone for the User 2400—a simple test of this in a standard smartphone found to be of utility is to timestamp the Event 2404 and have the New Event Notification component 180 allow 350 milliseconds delay until the completed arrival of all data from AFM 2405 (though the potential for application of more sophisticated extrapolation methodology to this task will be apparent to one skilled in the art) then presentation of the Ad Ring is aborted by New Event Notification 180, allowing Process Audio component 204 to render the default ringtone delivered to it by LoadedRingtone module 203 as usual. Optionally, upon arrival the Ad Ring can be buffered in storage available to New Event Notification component 180, then presented as all or part of the notification ringtone for the subsequent call, thus avoiding the delay on a subsequent ring with looser or no contextual targeting of the ad, and return of parameters detailing the actual context under which it was presented communicated back to AFM 2405.

Continuing now to describe the further function in the Ad Feedback case described in the TalkingSocial scenario above, if the User 2400 has configured his smartphone for this via UI 2403, the delivery of feedback such as the "Anchovies, yuck!" utterance to the Pizza Palace merchant in that scenario is accomplished as follows. After hearing or viewing the ad upon which he wishes to deliver feedback, User 2400 indicates his desire by a specific action such as a pressing a button—for instance, the Rec button previously described and implemented in wxCommunicator, or equivalent means including recognizable verbal or gestural cues, as was discussed previously. UI 2403 can either pass parameters to prime OnMyPhonePanelRecButtonClicked 178 to produce a recording outside a conversation, or the system could be set always enabled to do so, as in the code fragment below (in conjunction with a new routine to set up a dummy phone call record in variable dCall defined to serve this purpose) as shown:

```
void        MyPhonePanel::OnMyphonepanelRecbutton-
Clicked(wxCommandEvent& event)
{
  m_RecButton→SetValue(!m_RecButton→GetValue( ));
  PhoneCall* pCall=GetSelectedPhoneCall( );
  PhoneCall*
      dCall=GetDummyPhoneCallForOutsideRecording( );
  if (pCall)
  {
    if(!pCall→m_bIsSoundBeingRecorded)
    {
      // mod for reminder-ring
      //   SipXTapiProxy::getInstance(   )→StartRecording
         (pCall);
         SipXTapiProxy::getInstance(    )→StartRecording
            (pCall, rr_username);
    }
    else
    {
      SipXTapiProxy::getInstance(    )→StopRecording
         (pCall);
    }
  }else {
    if(!dCall→m_bIsSoundBeingRecorded)
    {// mod for audio message recording for forwarding or
      feedback
      SipXTapiProxy::getInstance( )→StartRecording(dCall,
         rr_username);
    }
    else
    {
      SipXTapiProxy::getInstance(    )→StopRecording
         (dCall);
    }
  }
}
```

Figure 25:
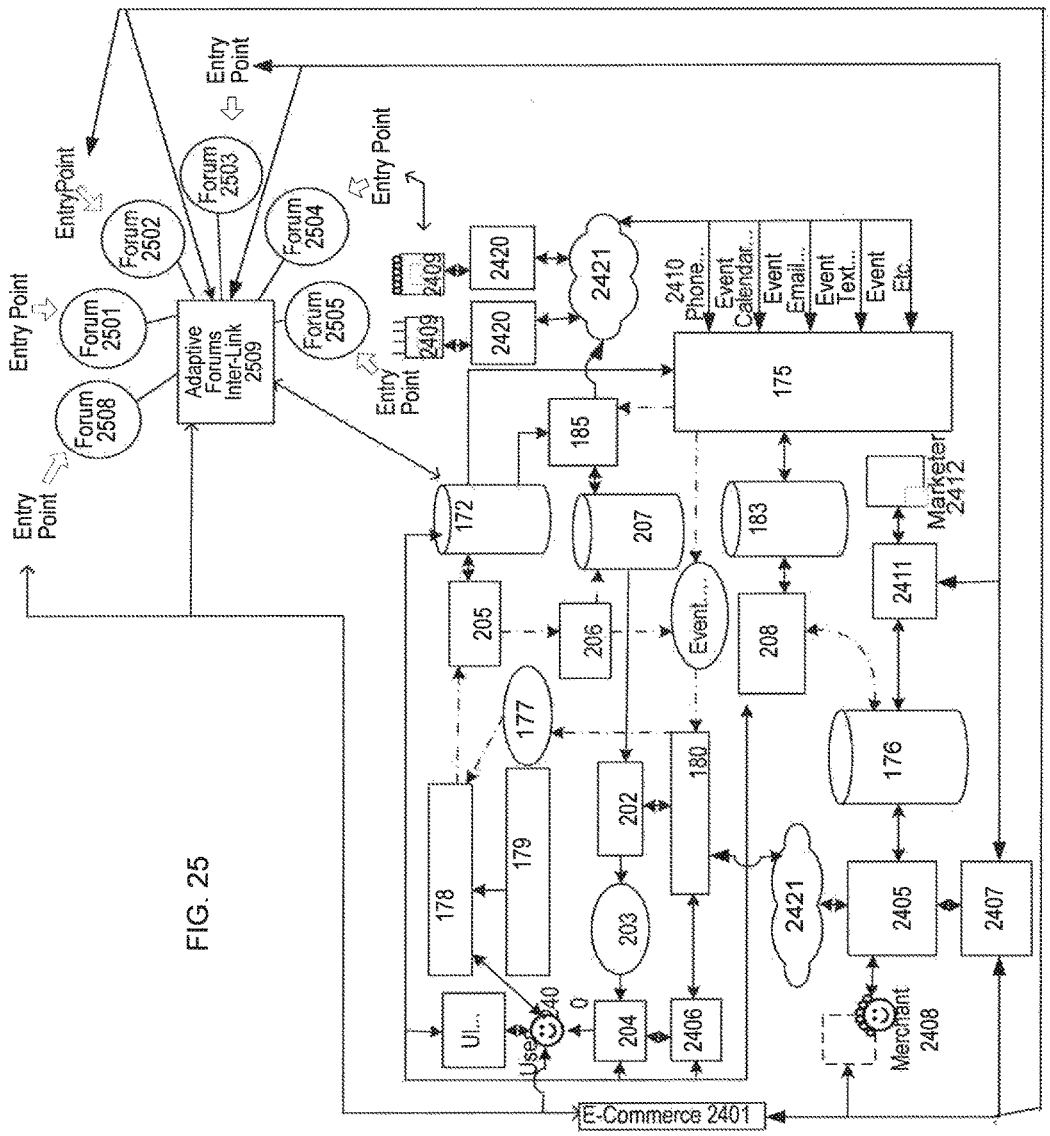
FIG. 25 is a block diagram showing the modified architecture of the wxCommunicator implementing mechanisms and commercial functionality for a number of applications including advanced forms of interactive commerce and interwoven conversation incorporating aspects of adaptive forums telecommunications.

This will provide for Start Recording 205, and subsequent flow as disclosed previously for ReminderRing proper, with ProcessRecording 206 storing the sample in Database 207 to be relayed to AFM 2405. This connection can be accomplished in a number of ways, but a modification of Create & Delete Tone Files module 185 to communicate over internet to AFM 2405, as is known in the art using web services, or to it via other network connection and protocol such as a dedicated telecommunications channel, has been found to provide more general utility in application, and will be assumed as the preferred means for the remainder of this document. For clarity in the diagram this connection is depicted in FIG. 25 by multiple cloud images, which though drawn separately for clarity, represent network connectivity in general, not necessarily separate networks. AFM 2405 then stores the recording, or a processed sample thereof, and other authorized information, which can range from anonymized demographics and context parameters for statistical reporting one to full ID enabling continued individual communication or other use of the tagged data, such as archiving and examination by individual or groups, in Database(s) 176, for presentation on an on-demand or priority basis to Merchant 2408, and potential follow-up.

Besides the merchant these mechanisms also enable features which bring another user, or many more, represented by 2409, into the picture. As was described previously, pass-along advertising, augmented by samples from conversation, processed as described for notification purposes in ReminderRings, can be pushed or otherwise relayed to another user, for instance the friend mentioned in the prior example. That e-commerce implementation comprises means known in the art for e-commerce 2401 and connecting the user, another user merchant and another user as needed for fulfillment. A variety of such services and developer APIs are offered by companies such as Amazon, Kiva, Ebay/Paypal, Square, Google, MobilePayUSA, Foursquare and many others, which provide coupon delivery, check-in, customer recognition, fulfillment and other standard ecommerce and mobile commerce processes. These further enable the present invention to build upon its contextual and conversation processing core to deliver the forms of novel commercial utility disclosed herein.

Each of these other users 2409 has access to a communication system 2420 sufficient for participation at the level needed; for simplicity, 2420 is labeled and described herein as a full additional system such as that which surrounds the original user, though many applications will not require that full level of functionality. These systems communicate with each other through events, such as Phone Call Event 2410, as well as through more direct addition and creation of tone files by Create & Delete Tone Files module 165, in either case via internet or other communications medium.

That phone call event 2410 may be a Push type such as was disclosed in commentary herein regarding FIG. 17, in order to implement functionality such as the targeted forwarding mechanism described above in the TalkSocial scenario. Following that TalkSocial Push case as an example, in it, the user relayed an ad along with an attached annotation which could be presented as a notification to another user who had a phone configured that way: an "Ad Forward" function. That transmission and presentation method has been previously described in disclosure associated with FIG. 17. To initiate, one User 2400 interacts with UI 2403. At the end of ProcessAudio 204 flow, or as provided otherwise in that component, the user's action selecting Ad Forward with Annotation is detected, via OnMyPhonePanelRecButton-Clicked 178 as was described for the Ad Feedback case, or a separate button or equivalent means dedicated to Ad Forward if both it and Ad Feedback function are present simultaneously. This will produce a recording in the manner previously described for Ad Feedback, through Start Recording 205, and subsequent flow as disclosed previously for ReminderRing proper, with ProcessRecording 206 storing the sample in Database 207. When the Push call is initiated by User 2400, triggering a Phone Call Event 2410 on the other user's corresponding system 2420, the Create & Delete Tone Files modules 185 of the two systems also connect via network to transmit the Ad Forward information.

It will be apparent to one skilled in the art that additional, equivalent modes of operation, for example, pass-along ads which have targeting, or expiration times, such as the shared table special described in the prior scenario above, can readily be implemented as well within this system. One such further commercial application is next described within it whose utility is to address the need of advertisers that want to monitor and/or generate word of mouth about products or services.

That filling this need is of utility is evidenced, for example, by the many companies that make a business of trying to measure if people are paying attention to a particular product, ranging from clipping services to social media analytic product vendors and market research consultants. But these address text-based publications and social communications, but not voice phone calls. The present invention as exemplified through the system of FIG. 25 is readily adaptable to this purpose of monitoring, given its connection through communication networks as just described for the Ad Forwarding with Annotation example, and can be further applied and integrated with features that generate that word of mouth Key to this application is purposing Process Recording component 206 to sample not for later use as Annunciations, but for monitoring of conversation. button press, speech or other sound, gesture or signal, set in UI 2403 or as standard configuration by a manufacturer, and operating to denote the sample, as was described in prior commentary on FIG. 18 for the purpose of ReminderRing annunciations, is repurposed in this case to delineate not the sample for an annunciation, but instead or additionally for examination of conversation.

Mechanism for archiving in Database(s) 176 and examination of such samples from conversation were described previously, as was the application of speech recognition means to those the samples. The capacity of computational examinations of the samples stored in Database(s) 176 to yield metrics such as statistics on how often a product name is mentioned is thus readily addressable by an analysis program, as part of AFM 2405 accessed by Merchant 2408, or by a separate software front end Analysis and Control module 2411 utilized by an analyst, researcher such as a marketer, or other type of person accessing the data, designated for simplicity as Marketer 2412. Such measurements of occurrence and analysis of context are known in the art and of utility at even a basic level, with their limitations by several factors each addressable for improvement with tradeoffs.

For example, speech recognition limitations can be addressed by using human review of all or just the more difficult cases, and can be accomplished through crowdsourcing using products such as Amazon's Mechanical Turk. Limits of the number of people allowing their conversations to be monitored in this way can be addressed by commercial offers of rewards for participation, such as have been utilized by other market research firms, such as the Nielson Company. In the case of smartphones those rewards can include free or use or ownership of the phone itself, with or without additional advertising, or even cash incentives, as mentioned previously.

Beyond monitoring, providing and packaging of such information and measurement by companies for purposes such as providing market research insights & data, the same mechanisms can be used to address the incentivizing of conversation, making it possible to buy reliable word of mouth advertising. The business case of utility and need for this is exemplified in the text mode by paid bloggers and social media users, with companies such as Izea having been among the pioneers of this approach with offerings such as Sponsored Tweets and SocialSpark for sponsored blog posts. Equivalent offers made to the user of FIG. 25, their enrollment through a web site and E-commerce means 2401, provides the equivalent functionality to Marketer 2412 through Analysis and Control module 2411.

The present invention, by enabling the use and application of conversation and context in telecommunications, brings and extends this new utility further in that the tracked and archived conversational speech can be linked to the individuals making and taking the calls, not only incenting one or more User 2400 to say particular utterances during conversations on their smartphones, and recognizing when they do, but also possibly to whom, if that is Other Users 2409 of the system.

Further functionality can be obtained by giving the speaker an indication of satisfying the incented behavior, that is, providing an onscreen flag or lamp that lights when the targeted utterance is detected in conversation, that is, the targeted sound has been detected in a voicestream. Speech recognition means for this purpose in real-time can be backstopped by crowdsourced applications or spot-checked or statistically audited among the archived samples by the Marketer 2412, his customers or an independent third-party, using Analysis and Control Module 2411.

Besides conversation itself, a smartphone app can also recognize when an action is taken by the talker, or the person being talked to, such as downloading another app, or going to a location or going there with a friend, or scanning a barcode, or taking a picture of a product. Companies like Izea again, with its WeReward program, and LockerZ, have demonstrated the utility and business case for incenting, monitoring and rewarding such behaviors as produced by more standard advertising means. The present invention enables equivalent tracking and incentives mechanisms to these now known in the art to be applied, monitored and fulfilled as prompted by conversation, and the initiator of such conversation to be rewarded as well for producing the effect.

In particular, this sort of service finds application where the product is ephemeral and quick dispersion of word of mouth is urgent. Possibilities such as movies, games, and pop culture meme-driven product vendors, bands, perhaps with a ringtone music tie-in, are all clear uses. As was described previously, sound recognition need not be limited to speech, for instance, music could also be recognized and Users 2400 incented and tracked in playing it during conversations with friends of particular demographics.

Political, educational and therapeutic applications also exist. Examples of the range of utility cases spans such things as: a person could be receive money for a personal endorsement of show, a product for encouraging people who then try a free sample, a discount for letting a friend know movie times, a reward for propagating a meme such as a brand slogan, a ringtone for playing a band's song in the background while telling another fan of an upcoming local concert, a backstage pass for using that ringtone and taking calls to discuss them in a popular club venue, virtual goods for correlated online purchases by someone in a gaming social network they called and told about a new feature, extra credit for talking about a homework topic with another student; an indication of compliance for discussing an item of prescribed group therapy, a picture with a political candidate for mentioning her name to a number of people who subsequently attended a rally, and many more. The present invention discloses the technology to provide these and other cases of utility by breaking through the barriers that have prevented such contextual conversation-processing in telecommunication.

The present invention can be combined with other techniques of conversational processing for social purposes, and extended to realize additional utility beyond other existing means. Turning now to FIG. 25, we see a case in which the adaptive forums mechanisms for conversation, known in the art from the disclosure in U.S. Pat. No. 7,424,516, and included here by reference, and subsequently cited as Leeds 516, are synergistically added as part of an embodiment that realizes new functionality.

That figure shows how such adaptive, interwoven conversation threads may be implemented. In it, elements of Leeds 516 FIG. 1 are particularly shown in the top right, specifically an Adaptive Forums Inter-Link equivalent 2509, with additional means providing access to UI options/configuration files 172, as well as E-commerce 2401, which can be mediated by Forum infrastructure, as is known in the art, or bypass it as disclosed in FIG. 24; for clarity the latter alternative is not explicitly presented in FIG. 25. Likewise, for clarity and consistency with the schematic representation in Leeds, the Forum entry points do not show the reverse side of their arrows, though in the former case and the disclosure of Leeds 516 they do provide 2-way communication, a case of which is shown in the next figure, 26.

In FIG. 25, Marketer 2412 may also access Forums through Analysis and Control mechanisms 2411 (for instance for maintaining analytics or operating means of influence), or directly, as may Merchant(s) 2408 or eCommerce means 2401. Forums may implement gateway and implementation mechanisms, for instance via escape and control code sequences and passwords, or provision may be made for connection of these functional roles directly to the Forum Interlinking mechanism 2509. This provides means for Marketing functions, from relatively direct advertising which utilizes conversation to guide targeting and messaging, to more elaborate constructs that include more intricate analysis of the social graph and contextual placements and notifications such as those previously described in examples like the pizza shopping scenarios.

These Forums, designated here nominally as most of the numbers from 2501 through 2508, in similarity to the equivalent single numeral designations in Leeds 516 FIG. 1, may also be designed to function with the conversation occurring in verbal, text, video and/or other modalities of conversational communication, either natively or through bridging mechanisms such as speech-to text modules, means for construction of which were previously referenced and discussed in this application. Forums may consist or include posts, chat or other messaging forms, having diverse attributes such as being permanently retained, or ephemeral such as in Snapchat.

Forum equivalents may also be embedded within other social networking mechanisms, for instance, Facebook or LinkedIn Groups. Regardless of such instantiation, cues can be designated to annotate conversations to provide novel contextual notifications based on conversations in this milieu as in those described earlier for games, advertising, friendship introductions, dating, other matchmaking, and other applications, including incentivized participation.

It will be apparent to one of ordinary skill in the art that this form of Adaptive Forums is able to provide an additional dimension of utility in those contextual conversation processing applications previously described. For instance, the "social director" functionalities previously described as providing computer control of online social interactions based on more general conversation processing, can be tailored to consider conversations on Forums as evidence of compatibility, probability of attendance, and arranging backups for scheduled social events. As mentioned previously, these could range from dating, to helping to fill a table at a restaurant, to more elaborate novel social meet-ups of larger groups sharing interests or dispersed roles in games or social designs. For example, a softball team needs a set of players willing and able to undertake covering particular positions; psychological designs, or heuristic insight or evolution through feedback of software-defined equivalents of good party invitation artistry, can produce pioneering equivalents in a "social director" functional module.

This "social director" functionality can be applied in a voiced, text, video or mix of these and other modes of conversational telecommunication. Their presentation may include functionality as described previously, or as is known in the art from prior work such as that disclosed in Leeds 516, or in other ways not foreseen therein.

Figure 26:
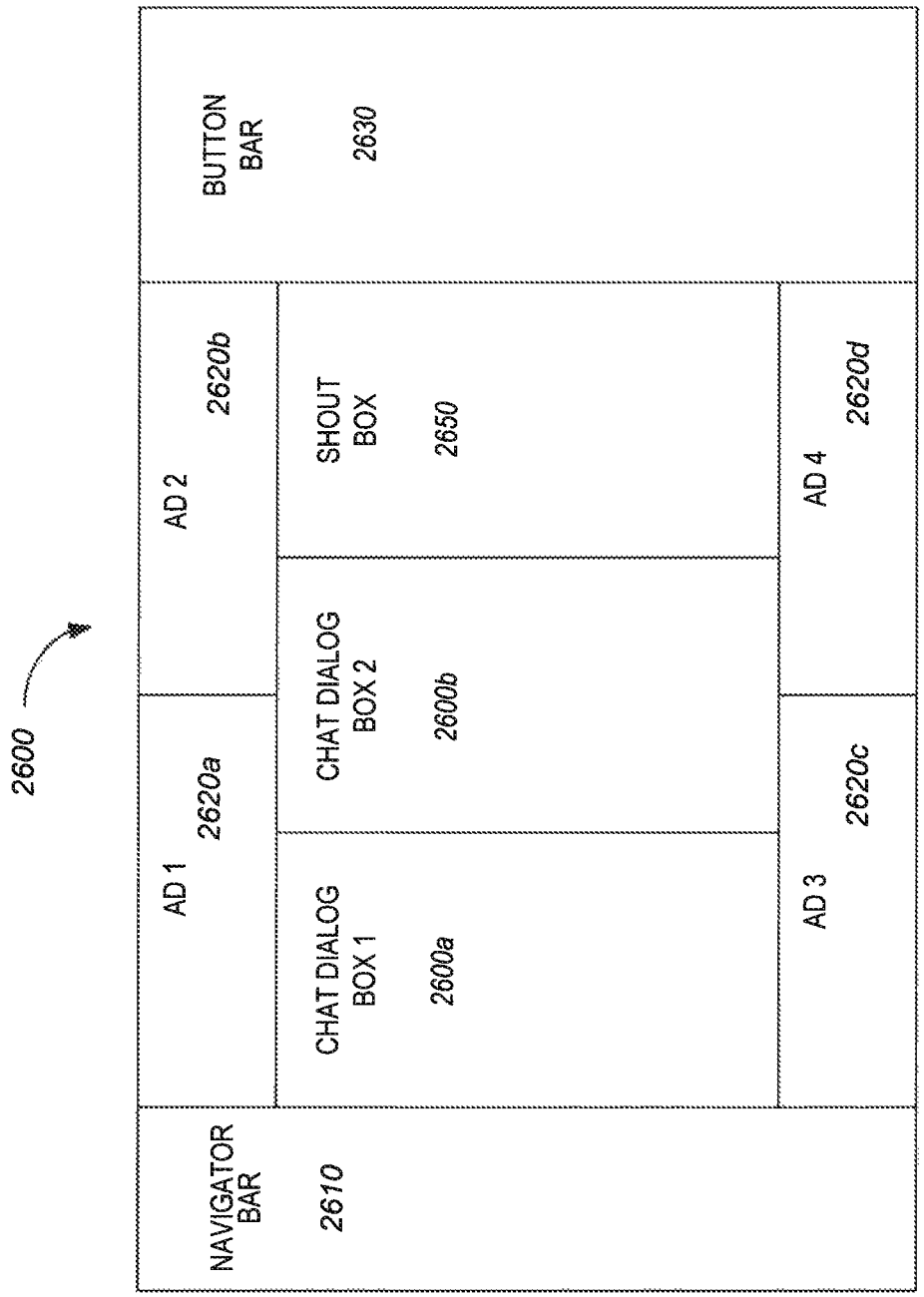
FIG. 26 is a schematic diagram of a screen layout of an embodiment of an exemplary, tailored chat room for interwoven conversation using adaptive forums telecommunications.

Delving further into the utility of computer control of online social interactions based on conversation processing, a set of such preferred embodiments is presented. To begin with, FIG. 26 shows an extension of basic Leeds 516 adaptive forums technology. In this example a form-specific screen such as that shown in FIG. 4 of Leeds 516 can be extended and enhanced by aspects of the present invention to yield a preferred embodiment which is exemplified by the forum-specific screen 2600 in FIG. 26 of the current application. This internet website screen 2600 has the usual adaptive forums style chat dialog boxes 2600a and 2600b, each associated with a separate chat session of its respective independent chat forums, adaptively linked as taught in Leeds 516; A navigator bar 2641 provides a user, such as 2420, 2400, or one accessing in a special use role such as Marketer 2412, with a means to interact with the server computer (for example, the equivalent of 60 in Leeds 516) to modify the viewing environment, select other chat forums, and control other functions. Ads 2601 through 2604 are used as advertisement fields (2620a, 2620b, 2620c, and 2620d, respectively).

The advertisement fields may randomly or sequentially display various advertisements, as is well known in the art. Sequential changes of displayed advertisements may be controlled according to words and phrases entered in a chat session or uttered in verbal or equivalent conversation according to personal information on the user and ad targeting guidance stored in cookies and other forms such as database 176 and manager module 2405. A button bar 2630 provides the user with a means to interactively select a manner of how to display or otherwise access data on the user's browser, smart phone or other user-interfaced device.

Although the depicted embodiment shows two chat dialog boxes (2600a and 2600b), any number of chat dialog boxes, or their audio or video equivalents, may be open concurrently, enabling a user to participate in several chat forums simultaneously. As is known in the art, the sizing of the boxes is variable and may be adjustable by the user, automatically shaped to equally share the available screen space, or equivalently configurable in addressing acoustic, video or other modalities of conversation, and implemented using techniques such as drop down menus, function keys, or other common practices in the art. The chat dialog boxes 2600a and 2600b can use the "post-and-wait" chat method, the "scrolling text" chat method, or others, independently of one another.

Personal information may be obtained, stored, updated and saved for future access and processing by means known in the art and disclosed and/or referenced elsewhere herein. Information in header fields such as described in Leeds 516 may guide the disposition and utilization of chat messages among forums, or their equivalent, or push notifications based on them.

Chat messages, identified by headers as is known in the art and can be based on Leeds 516, besides being distributed among chats can also be identified by the user or 'social director' mechanism as Shouts, to be tracked in all or a hierarchically configurable subset of multiple conversations, including access/display in one or more Shout Box 2650. This enables the Shout stream delivered to a Box to be customized to a user's interests, including from his or her profile, other internal data, or external social media means explicit or implicit (for instance in prior behavior), including sites visited, profiles, and content of posts/chats, to create a "wall" of intermingled shouts and posts. These conversational snippets are thus rewoven in a way that provides utility to the user, marketers, and analytic inference for other purposes. FIG. 27 shows an example of a Shout Box displaying a simple case of adaptive forums text conversation.

The tailoring of this and other conversations' adaption can thus include following a person or interest, as on Twitter and other social media which provide subscription to user broadcasts, but beyond those prior opt-ins the present invention provides for pushed conversations, all without intermediary recommending of friends and other social matchmaking. This has little analog in the natural world; though some mechanisms like 'overhearing' and joining conversations in a crowded room such as a party are similar, this means of pushing conversations together, contextualizing and weaving them along with sponsored content, is only provided by the present invention, enabled through the use of telecommunications. In particular, it provides for conversations to be routed among interested parties, for whom actionable information will be available, enabling kindling of conversation, nurturing of discussion, and instant communication. It is thus of more utility than simply replacing the overhearing mechanism in which humans "prick up their ears" to matters touched upon in background conversations that catch their attention or they subconsciously notice.

Particularly when actionable for alertness or alarm, this is an innovation in the present invention. It enables the present invention's 'social director' style of applications to be means for a portal instead of just as a matchmaker; for instance, providing a place where large organizations of people can talk at the same time, in asynchronous conversation streams.

In a business context, those can be corporations or other sets of people. In a commercial context, the incentivizing ('sponsoring') of conversation, as mentioned earlier, can be enhanced to vary by the number and/or targeted quality of conversations entered.

In a free-ranging adaptive conversational situation, examples of two general categories of interests for the algorithm can include a matrix of interests, for example, categories (art, sports, history . . . ), locations, times (60 s, 20 s, WWI, Pleistocene), people, products, services, etc.

The methodology for balancing such interests and other factors, and determining into which conversations to place a user of the system, can employ a variety of mechanisms known in the art, aggregated into best fit weighting algorithms and tuned using explicit (e.g., user input to set profile data in configuration storage 172) or implicit (participation, including response to embedded advertising such as sponsored conversation), analogous to the weighting mechanisms described in FIG. 18 to illustrate examples of the ReminderRing extraction process. These could include Bayesian, Markov methods, using averages, root mean squared average, inverse set, QBE, User-weighted, or a variety of random and semi-random methods that may be practical whether to induce a small amount noise in a user feedback loop, or because users enjoy the randomness for its own sake with the feeling of luckiness. Each method can work for different purposes; for example, for many users Markov chains may excel at leveraging interests and participation in conversation. With feedback as known in the art and as applied analogously in the description of FIG. 18, these techniques find utility in a variety of fields.

Among those, one market in particular in which this computer control of online social interactions based on conversation processing enables a new level of capability is the Singles market, addressing many of the robust and growing set of over 100 million unmarried people, who are 18 and older, in America alone, at the time of this application. Addressed by a diverse collection of dating, matchmaking, and other sites, the opportunities to apply this technology are clearly able to transcend current means of crafting matches based on a limited set of, customarily, a few dozen dimensions of compatibility, by extracting and invoking a near-infinite scale of possibilities for placing the user amid multiple conversations that are found heuristically favorable, plus tracking engagement quality, quantity, and apparent outcomes amid the conversation streams of people chatting or arranging social occasions with each other.

This and other presently described embodiments of the current invention may be implemented in software, hardware, or a combination of both. Furthermore, control mechanisms, programs or data storage contemplated in any or all of the presently described embodiments of the invention may reside wholly or partially on or otherwise utilize networked CPUs, servers, "cloud" or array storage and the like.

Information as herein shown and described in detail is fully capable of attaining the above-described object of the invention, the presently preferred embodiments of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural, electrical, and functional equivalents to the elements of the above-described preferred embodiment and additional embodiments that are known to those of ordinary skill in the art are expressly incorporated herein by reference and are intended to be encompassed by the present claims. Further, the examples and data contained herein are for illustration purposes only and in no way shall limit this present invention.

Moreover, it is not necessary for a device or method to address each and every problem sought to be solved by the present invention for it to be encompassed by the present claims. Furthermore, no element, component or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed:

1. A method of marketing by means of tracked incented conversation between two participants one of whom is the conveyor and the other is the recipient, based on contextual processing of the conversation, comprising the steps of:
   presenting an offer from a marketer to the conveyor participant of the tracked incented conversation specifying a target sound or utterance associated with the offer;
   marketing to the recipient participant of the tracked incented conversation by transmitting the target sound or utterance associated with the offer from the conveyor to the recipient participant in the tracked incented conversation;
   tracking the incented conversation to identify and verify when the target sound or utterance associated with the offer is matched in the conversation; and
   archiving samples of the incented conversation as verification of the marketing from the conveyor to the recipient for examination by the marketer.

2. The method of claim 1, wherein the tracking includes additional data regarding at least one participant in a conversation to whom at least one particular utterance was addressed.

3. The method of claim 1, wherein the tracked telecommunication device provides an indication to the user that the targeted sound or utterance has been detected in a conversational voice stream.

4. The method of claim 1, wherein said tracking includes additional data as indication of at least one additional incented actions by at least one participant of said conversations.

5. The method of claim 4, wherein said indication of incented actions is an indication of compliance with a medical treatment or health maintenance system.

6. The method of claim 5, wherein said incentive is evidence of compliance with a medical treatment or health maintenance system.

7. The method of claim 1, wherein the tracked conversation includes a music placement.

8. The method of claim 7, wherein the incentive to the user or incentive message to the device includes, as foreground or background audio, a ringtone associated with the music placement.

9. The method of claim 1, further including the steps:
rewarding the conveyor for transmitting the incentive message to the recipient; and
rewarding the conveyor directly using the incentive in the incentive message.

10. The method of claim 1, wherein there is a plurality of recipients each of whom may receive the conveyed incentive message from the conveyor.

11. The method of claim 1, wherein a telecommunication device can be tracked to determine the target sound, utterance, or textual pattern of the conversation.

* * * * *

UNITED STATES PATENT AND TRADEMARK OFFICE
CERTIFICATE OF CORRECTION

PATENT NO. : 10,375,236 B1
APPLICATION NO. : 15/374082
DATED : August 6, 2019
INVENTOR(S) : Richard Leeds et al.

It is certified that error appears in the above-identified patent and that said Letters Patent is hereby corrected as shown below:

In the Specification

Column 3, end of Line 14; delete "[Pretty".
Column 3, delete all of Line 15, Line 16, and Line 17.
Column 3, Line 18; delete "Matt]".
Column 13, add extra line after Line 46; and add --};--.
Column 38, Line 11; delete "case" and replace with --ease--.
Column 45, Line 67; delete "others" and replace with --users--.
Column 49, Line 3; add a --.-- at the end of the line.
Column 49, Line 6; delete "button" and replace with --Button--.

Signed and Sealed this
Tenth Day of December, 2019

Andrei Iancu
*Director of the United States Patent and Trademark Office*